United States Patent
Smith et al.

(10) Patent No.: US 11,833,676 B2
(45) Date of Patent: Dec. 5, 2023

(54) COMBINING SENSOR OUTPUT DATA TO PREVENT UNSAFE OPERATION OF AN EXOSKELETON

(71) Applicant: Sarcos Corp., Salt Lake City, UT (US)

(72) Inventors: Fraser M. Smith, Salt Lake City, UT (US); Marc X. Olivier, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 310 days.

(21) Appl. No.: 17/114,457

(22) Filed: Dec. 7, 2020

(65) Prior Publication Data
US 2022/0176546 A1    Jun. 9, 2022

(51) Int. Cl.
*B25J 19/00* (2006.01)
*B25J 9/00* (2006.01)
*B25J 9/16* (2006.01)
*B25J 13/08* (2006.01)

(52) U.S. Cl.
CPC .......... *B25J 9/0006* (2013.01); *B25J 9/1653* (2013.01); *B25J 9/1674* (2013.01); *B25J 13/085* (2013.01)

(58) Field of Classification Search
CPC ...... B25J 9/0006; B25J 9/1653; B25J 9/1674; B25J 13/085; G05B 2219/40305; G05B 2219/42329; G05B 2219/40204; G05B 2219/31294
USPC ....................................................... 700/245
See application file for complete search history.

(56) References Cited

U.S. PATENT DOCUMENTS

| | | | |
|---|---|---|---|
| 1,880,138 A | 9/1932 | Franz | |
| 2,850,189 A | 9/1958 | Leroy | |
| 2,981,198 A | 4/1961 | Nettel | |
| 3,171,549 A | 3/1965 | Orloff | |
| 3,280,991 A | 10/1966 | Melton et al. | |

(Continued)

FOREIGN PATENT DOCUMENTS

| | | |
|---|---|---|
| CN | 101214653 A | 7/2008 |
| CN | 101823517 A | 9/2010 |

(Continued)

OTHER PUBLICATIONS

Aghili et al., Sensing the torque in a robot's joints, www.memagazine.org/backissues/september98/features/torque/torque.html, 1998, pp. 1-9, The American Society of Mechanical Engineers.

(Continued)

*Primary Examiner* — Dalena Tran

(57) ABSTRACT

An exoskeleton operable to prevent unsafe operation can comprise a plurality of joint mechanisms and a plurality of sensors comprising configured to generate sensor output data associated with at least two joint mechanisms. The exoskeleton can comprise a controller configured to receive the sensor output data; combine the sensor output data; and determine whether the combination of the sensor output data from the first and second sensors satisfies an error condition in relation to at least one defined criterion. The existence of an error condition can be indicative of an anomalous operating state of the exoskeleton, such as a malfunction or an (impending) anomalous kinematic movement. The controller can also combine command signals to be transmitted to two or more joint mechanisms to determine another anomalous operating state to prevent unsafe operation. Associated software and methods are provided.

50 Claims, 17 Drawing Sheets

(56) References Cited

U.S. PATENT DOCUMENTS

| | | |
|---|---|---|
| 3,306,646 A | 2/1967 | Flora, Jr. |
| 3,358,678 A | 12/1967 | Kulstar |
| 3,449,008 A | 6/1969 | Colechia |
| 3,449,769 A | 6/1969 | Mizen |
| 3,535,711 A | 10/1970 | Fick |
| 3,759,563 A | 9/1973 | Kitamura |
| 3,858,468 A | 1/1975 | Pasbrig |
| 4,046,262 A | 9/1977 | Vykukal et al. |
| 4,179,233 A | 12/1979 | Bromell et al. |
| 4,200,596 A | 4/1980 | Iiyama et al. |
| 4,251,791 A | 2/1981 | Yanagisawa et al. |
| 4,367,891 A | 1/1983 | Wauer et al. |
| 4,398,110 A | 8/1983 | Flinchbaugh et al. |
| 4,483,407 A | 11/1984 | Iwamoto et al. |
| 4,561,686 A | 12/1985 | Atchley |
| 4,567,417 A | 1/1986 | Francois et al. |
| 4,575,297 A | 3/1986 | Richter |
| 4,591,944 A | 5/1986 | Gravel |
| 4,598,601 A | 7/1986 | Molaug |
| 4,603,896 A | 8/1986 | Vasseur et al. |
| 4,661,032 A | 4/1987 | Arai |
| 4,666,357 A | 5/1987 | Babbi |
| 4,723,353 A | 2/1988 | Monforte |
| 4,762,455 A | 8/1988 | Coughlan et al. |
| 4,768,143 A | 8/1988 | Lane et al. |
| 4,821,594 A | 4/1989 | Rosheim et al. |
| 4,834,443 A | 5/1989 | Crowder et al. |
| 4,853,874 A | 8/1989 | Iwamoto et al. |
| 4,883,400 A | 11/1989 | Kuban et al. |
| 4,884,720 A | 12/1989 | Whigham et al. |
| 4,915,437 A | 4/1990 | Cherry |
| 4,921,292 A | 5/1990 | Harwell et al. |
| 4,997,095 A | 3/1991 | Jones et al. |
| 5,004,391 A | 4/1991 | Burdea |
| 5,038,089 A | 8/1991 | Szakaly |
| 5,072,361 A | 12/1991 | Davis et al. |
| 5,080,682 A | 1/1992 | Schectman |
| 5,101,472 A | 3/1992 | Repperger |
| 5,105,367 A | 4/1992 | Tsuchihashi et al. |
| 5,117,814 A | 6/1992 | Luttrell et al. |
| 5,144,943 A | 9/1992 | Luttrell et al. |
| 5,172,951 A | 12/1992 | Jacobsen et al. |
| 5,230,147 A | 7/1993 | Asaoka et al. |
| 5,239,246 A | 8/1993 | Kim |
| 5,246,216 A | 9/1993 | Oberst |
| 5,280,981 A | 1/1994 | Schulz |
| 5,282,460 A | 2/1994 | Boldt |
| 5,328,224 A | 7/1994 | Jacobsen et al. |
| 5,336,982 A | 8/1994 | Backes |
| 5,389,849 A | 2/1995 | Asano et al. |
| 5,399,951 A | 3/1995 | Lavallee et al. |
| 5,402,690 A | 4/1995 | Sekiguchi et al. |
| 5,516,249 A | 5/1996 | Brimhall |
| 5,577,417 A | 11/1996 | Fournier |
| 5,577,902 A | 11/1996 | Todo et al. |
| 5,588,688 A | 12/1996 | Jacobsen et al. |
| 5,664,636 A | 9/1997 | Ikuma et al. |
| 5,704,945 A | 1/1998 | Wagner et al. |
| 5,762,390 A | 6/1998 | Gosselin et al. |
| 5,784,542 A | 7/1998 | Ohm et al. |
| 5,785,505 A | 7/1998 | Price |
| 5,797,615 A | 8/1998 | Murray |
| 5,845,540 A | 12/1998 | Rosheim |
| 5,865,770 A | 2/1999 | Schectman |
| 5,898,599 A | 4/1999 | Massie et al. |
| 5,912,658 A | 6/1999 | Bergamasco et al. |
| 5,949,686 A | 9/1999 | Yoshinada et al. |
| 5,957,981 A | 9/1999 | Gramnas |
| 5,961,476 A | 10/1999 | Betto et al. |
| 5,967,580 A | 10/1999 | Rosheim |
| 5,994,864 A | 11/1999 | Inoue et al. |
| 6,016,385 A | 1/2000 | Yee et al. |
| 6,170,162 B1 | 1/2001 | Jacobsen et al. |
| 6,202,013 B1 | 3/2001 | Anderson et al. |
| 6,272,924 B1 | 8/2001 | Jansen |
| 6,301,526 B1 | 10/2001 | Kim et al. |
| 6,338,605 B1 | 1/2002 | Halverson et al. |
| 6,340,065 B1 | 1/2002 | Harris |
| 6,360,166 B1 | 3/2002 | Alster |
| 6,394,731 B1 | 5/2002 | Konosu et al. |
| 6,425,865 B1 | 7/2002 | Salcudean et al. |
| 6,430,473 B1 | 8/2002 | Lee et al. |
| 6,435,794 B1 | 8/2002 | Springer |
| 6,507,163 B1 | 1/2003 | Allen |
| 6,508,058 B1 | 1/2003 | Seaverson |
| 6,554,342 B1 | 4/2003 | Burnett |
| 6,641,371 B2 | 11/2003 | Graziani et al. |
| 6,659,703 B1 | 12/2003 | Kirkley |
| 6,659,939 B2 | 12/2003 | Moll et al. |
| 6,663,154 B2 | 12/2003 | Pancheri |
| 6,714,839 B2 | 3/2004 | Salisbury, Jr. et al. |
| 6,740,125 B2 | 5/2004 | Mosler |
| 6,855,170 B2 | 2/2005 | Gramnas |
| 6,920,374 B2 | 7/2005 | Takenaka et al. |
| 7,168,748 B2 | 1/2007 | Townsend et al. |
| 7,319,919 B2 | 1/2008 | Takenaka et al. |
| 7,337,040 B2 | 2/2008 | Takenaka et al. |
| 7,379,789 B2 | 5/2008 | Takenaka et al. |
| 7,396,057 B2 | 7/2008 | Ye et al. |
| 7,405,531 B2 | 7/2008 | Khatib et al. |
| 7,409,882 B2 | 8/2008 | Massimo et al. |
| 7,410,338 B2 | 8/2008 | Schiele et al. |
| 7,509,905 B2 | 3/2009 | Jacobsen et al. |
| 7,628,766 B1 | 12/2009 | Kazerooni et al. |
| 7,783,384 B2 | 8/2010 | Kraft |
| 7,862,522 B1 | 1/2011 | Barclay et al. |
| 7,862,524 B2 | 1/2011 | Carignan et al. |
| 7,883,546 B2 | 2/2011 | Kazerooni et al. |
| 7,947,004 B2 | 5/2011 | Kazerooni et al. |
| 7,965,006 B2 | 6/2011 | Kang et al. |
| 8,024,071 B2 | 9/2011 | Komatsu et al. |
| 8,051,764 B2 | 11/2011 | Jacobsen et al. |
| 8,100,451 B2 | 1/2012 | Okuda et al. |
| 8,112,179 B2 | 2/2012 | Nakajima |
| 8,132,835 B2 | 3/2012 | Ban et al. |
| 8,151,401 B2 | 4/2012 | Cheyne |
| 8,182,010 B2 | 5/2012 | Lee et al. |
| 8,204,626 B2 | 6/2012 | Yoshiike et al. |
| 8,245,728 B2 | 8/2012 | Jacobsen et al. |
| 8,295,975 B2 | 10/2012 | Arimatsu et al. |
| 8,336,420 B2 | 12/2012 | Carter et al. |
| 8,375,982 B2 | 2/2013 | Gray, Jr. |
| 8,435,309 B2 | 5/2013 | Gilbert et al. |
| 8,452,447 B2 | 5/2013 | Nixon |
| 8,473,101 B2 | 6/2013 | Summer |
| 8,511,192 B2 | 8/2013 | Hirtt et al. |
| 8,516,918 B2 | 8/2013 | Jacobsen et al. |
| 8,529,582 B2 | 9/2013 | Devengenzo et al. |
| 8,534,728 B1 | 9/2013 | Bosscher et al. |
| 8,560,118 B2 | 10/2013 | Greer et al. |
| 8,640,723 B2 | 2/2014 | Jacobsen et al. |
| 8,667,643 B2 | 3/2014 | Simonelli et al. |
| 8,672,378 B2 | 3/2014 | Yamasaki et al. |
| 8,747,486 B2 | 6/2014 | Kawasaki et al. |
| 8,794,262 B2 | 8/2014 | Jacobsen et al. |
| 8,821,338 B2 | 9/2014 | Thorson |
| 8,849,457 B2 | 9/2014 | Jacobsen et al. |
| 8,870,967 B2 | 10/2014 | Herr et al. |
| 8,881,616 B2 | 11/2014 | Dize et al. |
| 8,888,864 B2 | 11/2014 | Iversen et al. |
| 8,892,258 B2 | 11/2014 | Jacobsen et al. |
| 8,920,517 B2 | 12/2014 | Smith et al. |
| 8,942,846 B2 | 1/2015 | Jacobsen et al. |
| 8,977,388 B2 | 3/2015 | Jacobsen et al. |
| 8,977,398 B2 | 3/2015 | Jacobsen et al. |
| 9,079,305 B2 | 7/2015 | Williamson et al. |
| 9,205,560 B1 | 12/2015 | Edsinger et al. |
| 9,295,604 B2 | 3/2016 | Zoss et al. |
| 9,314,921 B2 | 4/2016 | Jacobsen et al. |
| 9,329,587 B2 | 5/2016 | Fudaba et al. |
| 9,333,097 B2 | 5/2016 | Herr et al. |
| 9,346,165 B1 | 5/2016 | Metzger et al. |
| 9,446,510 B2 | 9/2016 | Vu et al. |
| 9,526,636 B2 | 12/2016 | Bedard et al. |

(56) References Cited

U.S. PATENT DOCUMENTS

| | | |
|---|---|---|
| 9,533,411 B2 | 1/2017 | Jacobsen et al. |
| 9,616,580 B2 | 4/2017 | Smith et al. |
| 9,618,937 B1 | 4/2017 | Blankespoor et al. |
| 9,643,323 B2 | 5/2017 | Nagatsuka et al. |
| 9,727,076 B2 | 8/2017 | Smith et al. |
| 9,789,603 B2 | 10/2017 | Jacobsen et al. |
| 9,862,090 B2 | 1/2018 | Kennedy et al. |
| 9,895,812 B2 | 2/2018 | Gonzalez et al. |
| 9,926,025 B1 | 3/2018 | Blankespoor et al. |
| 10,028,844 B2 | 7/2018 | Cheng et al. |
| 10,071,485 B2 | 9/2018 | Schiele et al. |
| 10,216,177 B2 | 2/2019 | Gildert et al. |
| 10,300,969 B1 | 5/2019 | Blankespoor et al. |
| 10,406,676 B2 | 9/2019 | Smith et al. |
| 10,512,583 B2 | 12/2019 | Smith |
| 10,518,404 B2 | 12/2019 | Barnes |
| 10,533,542 B2 | 1/2020 | Smith et al. |
| 10,561,564 B2 | 2/2020 | Lachappelle et al. |
| 10,566,914 B2 | 2/2020 | Fujita et al. |
| 10,609,896 B2 | 4/2020 | Kraaij et al. |
| 10,709,633 B2 | 7/2020 | Kazerooni et al. |
| 10,765,537 B2 | 9/2020 | Smith et al. |
| 10,828,767 B2 | 11/2020 | Smith et al. |
| 11,148,279 B1 | 10/2021 | Mooney et al. |
| 11,241,801 B2 | 2/2022 | Smith et al. |
| 2001/0033146 A1 | 10/2001 | Kato et al. |
| 2001/0043847 A1 | 11/2001 | Kramer |
| 2002/0075233 A1 | 6/2002 | White et al. |
| 2002/0094919 A1 | 7/2002 | Rennex et al. |
| 2003/0005896 A1 | 1/2003 | Jacobsen et al. |
| 2003/0060808 A1 | 3/2003 | Wilk |
| 2003/0146720 A1 | 8/2003 | Riwan et al. |
| 2003/0152452 A1 | 8/2003 | Hodgson |
| 2003/0223844 A1 | 12/2003 | Schiele et al. |
| 2004/0004362 A1 | 1/2004 | Love |
| 2004/0037681 A1 | 2/2004 | Marcotte |
| 2004/0102723 A1 | 5/2004 | Horst |
| 2004/0106881 A1 | 6/2004 | McBean et al. |
| 2004/0116836 A1 | 6/2004 | Kawai et al. |
| 2004/0246769 A1 | 12/2004 | Ido |
| 2004/0250644 A1 | 12/2004 | Gosselin et al. |
| 2005/0059908 A1 | 3/2005 | Bogert |
| 2005/0099386 A1 | 5/2005 | Kukita |
| 2005/0159850 A1 | 7/2005 | Melman |
| 2005/0166413 A1 | 8/2005 | Crampton |
| 2005/0193451 A1 | 9/2005 | Quistgaard et al. |
| 2005/0251110 A1 | 11/2005 | Nixon |
| 2006/0052732 A1 | 3/2006 | Shimada et al. |
| 2006/0064047 A1 | 3/2006 | Shimada et al. |
| 2006/0069449 A1 | 3/2006 | Bisbee, III et al. |
| 2006/0130594 A1 | 6/2006 | Ikeuchi |
| 2006/0149419 A1 | 7/2006 | Ogawa et al. |
| 2006/0184275 A1 | 8/2006 | Hosokawa et al. |
| 2006/0197049 A1 | 9/2006 | Hamada et al. |
| 2006/0245897 A1 | 11/2006 | Hariki et al. |
| 2006/0249315 A1 | 11/2006 | Herr et al. |
| 2007/0054777 A1 | 3/2007 | Kawai et al. |
| 2007/0056592 A1 | 3/2007 | Angold et al. |
| 2007/0105070 A1 | 5/2007 | Trawick |
| 2007/0123997 A1 | 5/2007 | Herr et al. |
| 2007/0129653 A1 | 6/2007 | Sugar et al. |
| 2008/0009771 A1* | 1/2008 | Perry .................. A61H 1/0281 600/587 |
| 2008/0023974 A1 | 1/2008 | Park et al. |
| 2008/0156363 A1 | 7/2008 | Ikeuchi et al. |
| 2008/0269027 A1 | 10/2008 | Chen |
| 2008/0271942 A1 | 11/2008 | Yamashita et al. |
| 2008/0281468 A1 | 11/2008 | Jacobsen et al. |
| 2009/0036815 A1 | 2/2009 | Ido |
| 2009/0038258 A1 | 2/2009 | Pivac et al. |
| 2009/0039579 A1 | 2/2009 | Clifford et al. |
| 2009/0149993 A1 | 6/2009 | Neki et al. |
| 2009/0199883 A1 | 8/2009 | Hiki |
| 2009/0210093 A1 | 8/2009 | Jacobsen et al. |
| 2009/0294238 A1 | 12/2009 | Gilmore |
| 2010/0050947 A1 | 3/2010 | Kortekaas |
| 2010/0089855 A1 | 4/2010 | Kjolseth |
| 2010/0094185 A1 | 4/2010 | Amundson et al. |
| 2010/0152630 A1 | 6/2010 | Matsuoka et al. |
| 2010/0198402 A1 | 8/2010 | Greer et al. |
| 2010/0234996 A1 | 9/2010 | Schreiber et al. |
| 2010/0241242 A1 | 9/2010 | Herr et al. |
| 2010/0295497 A1 | 11/2010 | Takamatsu |
| 2011/0010012 A1 | 1/2011 | Murayama et al. |
| 2011/0040216 A1 | 2/2011 | Herr et al. |
| 2011/0046781 A1 | 2/2011 | Summer |
| 2011/0066088 A1 | 3/2011 | Little et al. |
| 2011/0071677 A1 | 3/2011 | Stilman |
| 2011/0214524 A1 | 9/2011 | Jacobsen et al. |
| 2011/0219899 A1 | 9/2011 | Dize et al. |
| 2011/0264230 A1 | 10/2011 | Herr et al. |
| 2012/0000891 A1 | 1/2012 | Nakanishi et al. |
| 2012/0060322 A1 | 3/2012 | Simonelli et al. |
| 2012/0065902 A1 | 3/2012 | Nakajima |
| 2012/0073930 A1 | 3/2012 | Lansberry et al. |
| 2012/0137667 A1 | 6/2012 | Jacobsen et al. |
| 2012/0179075 A1 | 7/2012 | Perry et al. |
| 2012/0191245 A1 | 7/2012 | Fudaba et al. |
| 2012/0216671 A1 | 8/2012 | Gammon |
| 2012/0237319 A1 | 9/2012 | Jacobsen et al. |
| 2012/0259429 A1 | 10/2012 | Han et al. |
| 2012/0277901 A1 | 11/2012 | Jacobsen et al. |
| 2012/0277911 A1 | 11/2012 | Jacobsen et al. |
| 2012/0277915 A1 | 11/2012 | Jacobsen et al. |
| 2012/0328395 A1 | 12/2012 | Jacobsen et al. |
| 2013/0011220 A1 | 1/2013 | Jacobsen et al. |
| 2013/0013108 A1 | 1/2013 | Jacobsen et al. |
| 2013/0023803 A1 | 1/2013 | Hsu et al. |
| 2013/0033050 A1 | 2/2013 | Matsuoka et al. |
| 2013/0057001 A1 | 3/2013 | Tsai |
| 2013/0090580 A1 | 4/2013 | Hong et al. |
| 2013/0106127 A1 | 5/2013 | Lipson et al. |
| 2013/0106128 A1 | 5/2013 | Yamasaki et al. |
| 2013/0192406 A1 | 8/2013 | Godowski |
| 2013/0226048 A1 | 8/2013 | Unluhisarcikli et al. |
| 2013/0253385 A1 | 9/2013 | Goffer et al. |
| 2013/0296746 A1 | 11/2013 | Herr et al. |
| 2013/0302129 A1 | 11/2013 | Smith et al. |
| 2013/0306430 A1 | 11/2013 | Laffranchi et al. |
| 2013/0331744 A1 | 12/2013 | Kamon |
| 2013/0333368 A1 | 12/2013 | Durfee et al. |
| 2014/0067124 A1 | 3/2014 | Williamson et al. |
| 2014/0088728 A1 | 3/2014 | Herr |
| 2014/0100492 A1 | 4/2014 | Nagasaka |
| 2014/0190289 A1 | 7/2014 | Zhu |
| 2014/0195052 A1 | 7/2014 | Tsusaka et al. |
| 2015/0073595 A1 | 3/2015 | Fudaba et al. |
| 2015/0073596 A1 | 3/2015 | Fudaba et al. |
| 2015/0173929 A1 | 6/2015 | Kazerooni et al. |
| 2015/0209214 A1 | 7/2015 | Herr et al. |
| 2015/0217457 A1 | 8/2015 | Lipson et al. |
| 2015/0272749 A1 | 10/2015 | Amend, Jr. et al. |
| 2015/0278263 A1 | 10/2015 | Bowles et al. |
| 2015/0289995 A1 | 10/2015 | Wilkinson et al. |
| 2015/0321340 A1 | 11/2015 | Smith |
| 2015/0321342 A1 | 11/2015 | Smith et al. |
| 2016/0003268 A1 | 1/2016 | Shevchenko et al. |
| 2016/0114482 A1 | 4/2016 | Lessing et al. |
| 2016/0153508 A1 | 6/2016 | Battlogg |
| 2016/0279788 A1 | 9/2016 | Kanaoka et al. |
| 2016/0331556 A1 | 11/2016 | Wijesundara et al. |
| 2016/0331572 A1 | 11/2016 | Popovic et al. |
| 2016/0332302 A1 | 11/2016 | Bingham et al. |
| 2016/0332305 A1 | 11/2016 | Gonzalez et al. |
| 2016/0332312 A1 | 11/2016 | Song et al. |
| 2017/0050310 A1 | 2/2017 | Kanaoka |
| 2017/0119132 A1 | 5/2017 | Pruess et al. |
| 2017/0326737 A1* | 11/2017 | Martin .................. B25J 18/025 |
| 2018/0126548 A1 | 5/2018 | Sugito et al. |
| 2018/0133905 A1 | 5/2018 | Smith et al. |
| 2018/0133906 A1 | 5/2018 | Smith et al. |
| 2018/0193172 A1 | 7/2018 | Smith et al. |
| 2018/0193999 A1 | 7/2018 | Jacobsen et al. |
| 2018/0194000 A1 | 7/2018 | Smith et al. |

(56) References Cited

U.S. PATENT DOCUMENTS

| | | |
|---|---|---|
| 2018/0221237 A1 | 8/2018 | Swift et al. |
| 2018/0290309 A1 | 10/2018 | Becker et al. |
| 2018/0298976 A1 | 10/2018 | Battlogg |
| 2019/0022853 A1 | 1/2019 | Kim et al. |
| 2019/0105777 A1* | 4/2019 | Dalley ............... B25J 9/1615 |
| 2019/0138423 A1 | 5/2019 | Agerstam et al. |
| 2019/0176320 A1 | 6/2019 | Smith et al. |
| 2019/0184576 A1 | 6/2019 | Smith et al. |
| 2020/0001450 A1 | 1/2020 | Smith et al. |
| 2020/0164523 A1 | 5/2020 | Hallock et al. |
| 2020/0281803 A1 | 9/2020 | Teng et al. |
| 2020/0312109 A1* | 10/2020 | Shionozaki ........... G08B 21/02 |
| 2020/0346009 A1 | 11/2020 | Murray et al. |
| 2020/0368094 A1 | 11/2020 | Yoshimi et al. |
| 2020/0405417 A1* | 12/2020 | Shelton, IV ......... B25J 9/1664 |
| 2021/0023693 A1 | 1/2021 | Berger et al. |
| 2021/0039269 A1 | 2/2021 | Son |
| 2021/0059780 A1 | 3/2021 | Sutherland et al. |
| 2021/0369536 A1 | 12/2021 | Mooney et al. |
| 2021/0378903 A1 | 12/2021 | Mooney et al. |
| 2023/0023083 A1 | 1/2023 | Shelton, Iv et al. |

FOREIGN PATENT DOCUMENTS

| | | |
|---|---|---|
| CN | 101486191 B | 11/2012 |
| CN | 103610524 A | 3/2014 |
| CN | 203495949 U | 3/2014 |
| CN | 103802907 A | 5/2014 |
| CN | 203752160 U | 8/2014 |
| CN | 104843484 A | 8/2015 |
| CN | 105411813 A | 3/2016 |
| CN | 205250544 U | 5/2016 |
| CN | 105818143 A | 8/2016 |
| CN | 105856190 A | 8/2016 |
| CN | 107471203 A | 12/2017 |
| CN | 108081303 A | 5/2018 |
| CN | 111267992 A | 6/2020 |
| CN | 111616914 A | 9/2020 |
| DE | 102004029513 B3 | 9/2005 |
| DE | 102010029088 A1 | 11/2011 |
| DE | 202013009698 U1 | 11/2013 |
| DE | 102016201540 A1 | 8/2017 |
| DE | 202018104980 U1 | 9/2018 |
| EP | 0039578 A1 | 11/1981 |
| EP | 0616275 A3 | 9/1998 |
| EP | 1037264 A2 | 9/2000 |
| EP | 1258324 A2 | 11/2002 |
| EP | 1442846 A1 | 8/2004 |
| EP | 1721593 A1 | 11/2006 |
| EP | 2198810 A1 | 6/2010 |
| EP | 2548543 B1 | 1/2015 |
| EP | 2942162 A2 | 11/2015 |
| EP | 2168548 B1 | 10/2016 |
| FR | 2651220 A1 | 3/1991 |
| GB | 686237 A | 1/1953 |
| GB | 2278041 A | 11/1994 |
| JP | S34-015764 | 10/1959 |
| JP | S36-005228 | 5/1961 |
| JP | S44-000603 | 1/1969 |
| JP | S50-009803 | 1/1975 |
| JP | S50-006043 | 3/1975 |
| JP | S52-013252 A | 2/1977 |
| JP | S52-134985 A | 11/1977 |
| JP | S56-140510 A | 11/1981 |
| JP | S58-113586 A | 7/1983 |
| JP | S58-45724 B2 | 10/1983 |
| JP | S60-177883 U | 11/1985 |
| JP | S62-193784 A | 8/1987 |
| JP | S62-200600 A | 9/1987 |
| JP | H01-295772 A | 11/1989 |
| JP | H02-51083 U | 4/1990 |
| JP | H03-85398 U | 8/1991 |
| JP | H04-44296 U | 4/1992 |
| JP | H05-004177 A | 1/1993 |
| JP | H05-023989 A | 2/1993 |
| JP | H06-213266 A | 8/1994 |
| JP | H06-315879 A | 11/1994 |
| JP | H07-001366 A | 1/1995 |
| JP | H07-5129 Y2 | 2/1995 |
| JP | H07-060679 A | 3/1995 |
| JP | H07-112377 A | 5/1995 |
| JP | H07-031291 U | 6/1995 |
| JP | H07-246578 A | 9/1995 |
| JP | H08-126984 A | 5/1996 |
| JP | H09-11176 A | 1/1997 |
| JP | H1156931 | 3/1999 |
| JP | H11-130279 A | 5/1999 |
| JP | 2002-161547 A | 6/2002 |
| JP | 2003-103480 A | 4/2003 |
| JP | 2003-194104 A | 7/2003 |
| JP | 2004-041279 A | 2/2004 |
| JP | 2004-105261 A | 4/2004 |
| JP | 2004-195576 A | 7/2004 |
| JP | 2005-118938 A | 5/2005 |
| JP | 2005-237504 A | 9/2005 |
| JP | 2005-334999 A | 12/2005 |
| JP | 2006-007337 A | 1/2006 |
| JP | 2006-016916 A | 1/2006 |
| JP | 2006-028953 A | 2/2006 |
| JP | 2006-051558 A | 2/2006 |
| JP | 2006-167223 A | 6/2006 |
| JP | 3909770 B2 | 4/2007 |
| JP | 2007-130234 A | 5/2007 |
| JP | 2007-252514 A | 10/2007 |
| JP | 2007-307216 A | 11/2007 |
| JP | 2008-143449 A | 6/2008 |
| JP | 2009-023828 A | 2/2009 |
| JP | 2009-167673 A | 7/2009 |
| JP | 2009-178253 A | 8/2009 |
| JP | 2009-219650 A | 10/2009 |
| JP | 2009-240488 A | 10/2009 |
| JP | 2009-268839 A | 11/2009 |
| JP | 2010-098130 A | 4/2010 |
| JP | 2010-110381 A | 5/2010 |
| JP | 2010-110465 A | 5/2010 |
| JP | 2010-142351 A | 7/2010 |
| JP | 2010-263761 A | 11/2010 |
| JP | 2011-067941 A | 4/2011 |
| JP | 2011-156171 A | 8/2011 |
| JP | 2011-193899 A | 10/2011 |
| JP | 2011-230260 A | 11/2011 |
| JP | 2012-501739 A | 1/2012 |
| JP | 2012-125279 A | 7/2012 |
| JP | 2012-176476 A | 9/2012 |
| JP | 2013-022091 A | 2/2013 |
| JP | 2013-090693 A | 5/2013 |
| JP | 2013-123786 A | 6/2013 |
| JP | 2013-142445 A | 7/2013 |
| JP | 5267730 | 8/2013 |
| JP | 2013-208293 A | 10/2013 |
| JP | 2013-220496 A | 10/2013 |
| JP | 2013-248699 A | 12/2013 |
| JP | 2014-054273 A | 3/2014 |
| JP | 2014-073222 A | 4/2014 |
| JP | 2014-200853 A | 10/2014 |
| JP | 2015-112649 A | 6/2015 |
| JP | 2015-212010 A | 11/2015 |
| JP | 2015-214019 A | 12/2015 |
| JP | 2016-539017 A | 12/2016 |
| JP | 2018-167375 A | 11/2018 |
| JP | 2020-037164 A | 3/2020 |
| JP | 6748374 B2 | 9/2020 |
| KR | 2005-0037754 A | 4/2005 |
| KR | 2007-0057209 A | 6/2007 |
| KR | 2010-0112670 | 10/2010 |
| KR | 2012-0105194 A | 9/2012 |
| KR | 10-1219795 | 1/2013 |
| KR | 2013-0001409 A | 1/2013 |
| KR | 2013-0045777 A | 5/2013 |
| KR | 2018-0128731 A | 12/2018 |
| KR | 2019-0108386 A | 9/2019 |
| SE | 515372 C2 | 7/2001 |
| WO | WO 94/29605 | 12/1994 |
| WO | WO 2003/002309 A1 | 1/2003 |

(56) References Cited

FOREIGN PATENT DOCUMENTS

| | | |
|---|---|---|
| WO | WO 2003/081762 A1 | 10/2003 |
| WO | WO 2007/144629 A2 | 12/2007 |
| WO | WO 2009/143377 A2 | 11/2009 |
| WO | WO 2010/025409 A1 | 3/2010 |
| WO | WO 2010/027968 A2 | 3/2010 |
| WO | WO 2012/042471 A1 | 4/2012 |
| WO | WO 2016/049622 A1 | 3/2016 |
| WO | WO 2017/148499 A1 | 9/2017 |
| WO | WO 2017/159504 A1 | 9/2017 |
| WO | WO 2018/118004 A1 | 6/2018 |
| WO | WO 2018/211869 A1 | 11/2018 |
| WO | WO 2018/215705 A1 | 11/2018 |
| WO | WO 2019/060791 A1 | 3/2019 |
| WO | WO 2020/175949 A1 | 9/2020 |

OTHER PUBLICATIONS

Albu-Schaffer et al., A Unified Passivity Based Control Framework for Position, Torque and Impedance Control of Flexible Joint Robots, Institute of Robotics and Mechatronics, 2007, vol. 26, 17 pages, Germany.

Aliens (Movie), Starring Sigourney Weaver, Directed by James Cameron, Written by James Cameron, David Giler, Walter Hill, Dan O'Bannon, and Ronald Shuset, Released 1985 by Twentieth Century Fox, Scenes at Playtime 88:26:31-00:26:59 & 00:27:40-00:28:05 & 02:08:25-02:10:39 Non-Patent Literature documentation; Aliens(1986)—IMDb; downloaded Sep. 27, 2014; 4 pages; http://www.imdb.com/title/tt10090605/.

Amikabir University of Technology, Manipulator Dynamics (Power Point), Computer Engineering and Information Technology Department, to the best of applicant's knowledge article was available before the application filing date, 44 pages.

Bao et al., A unified modeling and control design for precision transmission system with friction and backlash, Advances in Mechanical Engineering, 2016, vol. 8(5), 11 pages date.

Barras, Stabilization of a Biped Robot with its arms—A Practical Approach, http://biorob.epfl.ch/files/contents/sites/biorob/filed/users/170220/public/Report.pdf; May 2010, 33 pages, EPFL Biorobotics Laboratory (BioRob), Switzerland.

Bauman, Utah Firm Markets on Big Gorilla of an Arm, Deseret News; Jan. 27, 1993, 2 pages, Deseret News Publishing Company, Salt Lake City, Utah.

Claeyssen et al., Magnetostrictive actuators compared to piezoelectric actuators, Proceedings of SPIE—The International Society for Optical Engineering 4763, Mar. 2003, 6 pages.

David et al., Study of an External Passive Shock-absorbing Mechanism for Walking Robots, 8th IEEE International Conference on Humanoid Robots, Dec. 1-3, 2008, pp. 435-440, Institute of Electrical and Electronics Engineers, Piscataway, New Jersey.

Desai et al., Robust Swing Leg Placement under Leg Disturbances, 2012 IEEE International Conference on Robotics and Biomimetics, Dec. 11-14, 2012, pp. 265-270, China.

Digital World Tokyo, Giant Robot Grabbing Hands Grab All They Can, www.digitalworldtokyo.com/index.php/digital_tokyo/articles/giant_robot_grabbing_hands_grab_all_they_can/, Jul. 17, 2007, 3 pages.

Elliott et al., The Biomechanics and Energetics of Human Running using an Elastic Knee Exoskeleton, Jun. 2013, 7 pages, IEEE International Conference on Rehabilitation Robotics, Seattle, Washington.

Elliott et al., Design of a Clutch-Spring Knee Exoskeleton for Running, Journal of Medical Devices, Sep. 2014, 11 pages, vol. 8, The American Society of Mechanical Engineers, New York City, New York.

Endo et al., A quasi-passive model of human leg function in level-ground walking, 2006 IEEE/RSJ International Conference on Intelligent Robots and Systems, Oct. 9-15, 2006, pp. 4935-4939, Institute of Electrical and Electronics Engineers, Piscataway, New Jersey.

Filippeschi et al., Survey of Motion Tracking Methods on Inertial Sensors: A Focus on Upper Limb Human Motion, www.mdpi.com/journal/sensors, 2017, 40 pages, Sensors, Switzerland.

Gauthier et al., Magnetic Shape Memory Alloy and Actuator Design, Conference: 5th International Workshop on Microfactories (IWMF'06), Oct. 2006, 5 pages, Besançon, France.

Grabowski et al., Exoskeletons for Running and Hopping Augmentation, Journal of Applied Physiology, http://biomech.media.mit.edu/portfolio_page/load-bearing-exoskeleton-for-augmentation-of-human-running/. 2009, 4 pages, vol. 107, No. 3, American Physiological Society, United States.

Hauser et al., JammJoint: A Variable Stiffness Device Based on Granular Jamming for Wearable Joint Support, IEEE Robotics and Automation Letters, Apr. 2017, 7 pages, vol. 2, Issue 2, Institute of Electrical and Electronics Engineers, Piscataway, New Jersey.

Huber et al., The selection of mechanical actuators based on performance indices, Oct. 8, 1997, pp. 2185-2205, vol. 453 Issue 1965, The Royal Society, London.

Hunter et al., Fast Reversible NiTi Fibers For Use in Microrobotics, Proceedings. IEEE Micro Electro Mechanical Systems, Jan. 30-Feb. 2, 1991, pp. 166-170, Institute of Electrical and Electronics Engineers, Piscataway, New Jersey.

Industrial Magnetics, Inc., PowerLift® Magnets; www.magnetics.com/product.asp?ProductID=1; as accessed Nov. 6, 2012, 2 pages; Boyne City, Michigan.

Jacobsen et al., Design of the Utah/M.I.T. Dextrous Hand, IEEE International Conference on Robotics and Automation, 1986, pp. 1520-1532, Institute of Electrical and Electronics Engineers, Piscataway, New Jersey.

Jacobsen et al., Development of the Utah Artificial Arm, IEEE Transactions on Biomedical Engineering, Apr. 1982, pp. 249-269, vol. BME-29, No. 4, Institute of Electrical and Electronics Engineers, Piscataway, New Jersey.

Jacobsen et al., Research Robots for Application in Al, Teleoperation and Entertainment, Proceedings of the International Fluid Power Exposition and Technical Conference, Mar. 24-24, 1992, pp. 1-19, Chicago, Illinois.

Jacobsen et al., Research Robots for Applications in Artificial Intelligence, Teleoperation and Entertainment; The International Journal of Robotics Research; Apr.-May 2004, pp. 319-330, vol. 23, No. 4-5, Sage Publications, Thousand Oaks, California.

Jacobsen, Science, Robotics, and Superheroes, Presented at Department of Science University of Utah Science at Breakfast, Mar. 17, 2010, 16 pages.

Jafari et al., A Novel Actuator with Adjustable Stiffness (AwAS), Oct. 18-22, 2010, 6 pages, IEEE/RSJ International Conference on Intelligent Robots and Systems, Taiwan.

Jansen et al., Exoskeleton for Soldier Enhancement Systems Feasibility Study, Sep. 2000, 44 pages, Oak Ridge National Laboratory, Oak Ridge, Tennessee.

Kaslin et al., Towards a Passive Adaptive Planar Foot with Ground Orientation and Contact Force Sensing for Legged Robots, IEEE International Conference on Intelligent Robots and Systems, Oct. 1-5, 2018, pp. 2707-2714, Institute of Electrical and Electronics Engineers, Piscataway, New Jersey.

Kazerooni, Berkeley Lower Extremity Exoskeleton (BLEEX), to the best of applicant's knowledge article was available before the application filing date, 3 pages, University of California, Berkeley, Berkeley, California.

Kim, Development of a small 6-axis force/moment sensor for robot's fingers, Measurement Science and Technology, Sep. 30, 2004, 2 pages, Issue 11, Institute of Physics and IOP Publishing Limited.

Kim et al, A Force Reflected Exoskeleton-Type Masterarm for Human-Robot Interaction, IEEE Transactions on Systems, Man and Cybertentics—Part A: Systems and Humans, Mar. 2005, pp. 198-212, vol. 35, No. 2, Institute of Electrical and Electronics Engineers, Piscataway, New Jersey.

Kulick, An Unpowered Exoskeleton Springs Into Action: Researchers Increase Walking Efficiency, http://www.cmu.edu/me/news/archive/2015/collins-clutch.html, Apr. 1, 2015, 2 pages, Carnegie Mellon University Mechanical Engineering, Pittsburgh, Pennsylvania.

(56) References Cited

OTHER PUBLICATIONS

Laliberte et al., Underactuation in Space Robotic Hands, Proceeding of the 6th International Symposium on Artificial Intelligence and Robotics & Automation in Space, Jun. 18-22, 2001, 8 pages, Canadian Space Agency, Canada.
Liu et al., Cat-inspired Mechanical Design of Self-Adaptive Toes for a Legged Robot, IEEE International Conference on Intelligent Robots and Systems, Oct. 9-14, 2016, pp. 2425-2430, Institute of Electrical and Electronics Engineers, Piscataway, New Jersey.
Liu et al., Concept and Design of a Lightweight Biped Robot for Walking on Rough Terrain, IEEE International Conference on Robotics and Biomimetics, 2017, 6 pages, Institute of Electrical and Electronics Engineers, Piscataway, New Jersey.
Magnetic Base, www.ask.com/wiki/magnetic_base; page last updated Sep. 12, 2012, 2 pages, retrieved from www.ask.com/wiki/magnetic_base.
Miao et al., Mechanical Design of Hybrid Leg Exoskeleton to Augment Load-Carrying for Walking, International Journal of Advanced Robotic Systems, Mar. 28, 2013, 11 pages, vol. 10, Intech open science open minds, Europe.
Mirfakhrai et al., Polymer artificial muscles, materialstoday, Apr. 2007, pp. 30-38, vol. 10 No. 4, Elsevier, Netherlands.
Mombaur et al., HEiKA-EXO: Optimization-based development and control of an exoskeleton for medical applications, http://typo.jwr.uni-heidelberg.de/groups/orb/research/heika-exo/, Optimization in Robotics & Biomechanics, Oct. 20, 2014, 3 pages, Germany.
Moosavian et al., Dynamics Modeling and Tip-Over Stability of Suspended Wheeled Mobile Robots with Multiple Arms, 2007 IEEE/RSJ International Conference on Intelligent Robots and Systems, Oct. 29-Nov. 2, 2007; pp. 1210-1215, Institute of Electrical and Electronics Engineers, Piscataway, New Jersey.
Newport Corporation, Heavy-Duty Magnetic Base, 300 lb (1334 N) Holding Force, ¼-20 Thread, http://search.newport.com/?q=*&x2=sku&q2=200, as accessed Apr. 23, 2011, 1 page, Irvine, CA.
Oak Ridge National Laboratory, Foot Force-Torque Sensor Novel Sensor for Measuring Forces and Torques at the Foot, www.ornl.gov, to the best of applicant's knowledge article was available before the application filing date, 1 page, Oak Ridge National Laboratory, Oak Ridge, Tennessee.
Omega, Load Cell Designs, www.omega.com/literature/transactions/volume3/load3.html, Nov. 1, 2005, 3 pages.
Ostling, Wearable Robots, Technology Review, Jul./Aug. 2004, pp. 70-73, Elizabeth Bramson-Boudreau, Cambridge, Massachusetts.
Ott et al., Admittance Control using a Base Force/Torque Sensor, Department of Mechano-Informatics, 2009, 6 pages, University of Tokyo, Japan.
Pan, Improved Design of a Three-degree of Freedom Hip Exoskeleton Based on Biomimetic Parallel Structure, Jul. 2011, 132 pages, University of Ontario Institute of Technology, Canada.
Pelrine et al., Electrostriction of polymer dielectrics with compliant electrodes as a means of actuation, Sensors and Actuators A: Physical, Jan. 1998, pp. 77-85, vol. 64 Issue 1, Elsevier, Netherlands.
Pelrine et al., High-field deformation of elastomeric dielectrics for actuators, Materials Science and Engineering, Nov. 28, 2000, pp. 89-100, vol. 11 Issue 2, Elsevier, Netherlands.
Pelrine et al., Dielectric Elastomer Artificial Muscle Actuators: Toward Biomimetic Motion, Proceedings of SPIE—The International Society for Optical Engineering, Jul. 2002, pp. 126-137, vol. 4695, SPIE, Bellingham, WA.
Pin, Wearable Robotics Presented to New Horizons in Science Briefing, Oct. 2003, 34 pages, Knoxville, Tennessee.
Pratt et al., The RoboKnee: An Exoskeleton for Enhancing Strength and Endurance During Walking, International Conference on Robotics & Automation, Apr. 2004, 6 pages, IEEE, New Orleans, LA.
Robotics Research Group, Degrees of Freedom, www.robotics.utexas.edu/rrg/learn_more/low_ed/dof/, Oct. 25, 2006, 2 pages, University of Texas.
Roetenberg et al., Xsens MVN: Full 6DOF Human Motion Tracking Using Miniature Inertial Sensors, XSENS—Inertial Motion Capture, Jan. 2009, 9 pages, XSENS Technologies.
Rouse et al., Clutchable Series-Elastic Actuator: Design of a Robotic Knee Prosthesis for Minimum Energy Consumption, 2013 IEEE 13th International Conference on Rehabilitation Robotics (ICORR), Jun. 24-26, 2013, 6 pages, Institute of Electrical and Electronics Engineers, Piscataway, New Jersey.
Schuler et al., Dextrous Robot Arm, in Proceedings of the $8^{th}$ ESA Workshop on Advanced Space Technologies for Robotic and Automation 'ASTRA 2004' ESTEC, Nov. 2-4, 2004, 8 pages, Noordwijk, The Netherlands.
Searchmap Blog, Scientists Develop Mechanical Spring-Loaded Leg Brace to Improve Walking, http://www.searchmap.eu/blog/scientists-develop-mechanical-spring-loaded-leg-brace-to-improve-walking/, Apr. 1, 2015, 5 pages, Searchmap Blog.
Seppala, These exoskeleton heels could help stroke victims walk again, https://www.engadget.com/2015/04/02/feet-exoskeletons/, Apr. 2, 2015, Engadget, San Francisco, California.
Shamaei et al., Estimation of Quasi-Stiffness of the Human Knee in the Stance Phase of Walking. Mar. 22, 2013, 10 pages, vol. 8 Issue 3, PLOS One, San Francisco, California.
Siddharth et al., Design and Analysis of a 1-DOF Walking Mechanism, http://siddharthswaminathan.in/files/WalkingMechanism.pdf, Nov. 2012, 7 pages, India.
Smith et al., Integrated thin-film piezoelectric traveling wave ultrasonic motors, Sensors and Actuators A: Physical, Dec. 2012, pp. 305-311, vol. 188, Elsevier, Netherlands.
Song et al, Kinematics Analysis and Implementation of a Motion-Following Task for a Humanoid Slave Robot Controlled by an Exoskeleton Master Robot, International Journal of Control, Automation and Systems, Dec. 2007, pp. 681-690, vol. 5, No. 6, Korean Institute of Electrical Engineers, South Korea.
Suitx, Phoenix Medical Exoskeleton, https://www.suitx.com/phoenix-medical-exoskeleton, 3 pages, to the best of the applicant's knowledge article was available before the application filing date, US Bionics, Inc., Berkeley, California.
Suleiman, Engineering an affordable exoskeleton, Phys.org, https://phys.org/news/2014-06-exoskeleton.html, Jun. 12, 2014, 5 pages, Science X Network.
Szczesna et al., Inertial Motion Capture Costume Design Study, 2017, 21 pages, Sensors, Switzerland.
Tmsuk, Rescue Robot "T-53" release Control Technologies to Control the Synchronous Operation of the Arm, http://robot.watch.impress.co.jp/cda/news/2007/07/18/564.html, as accessed Sep. 1, 2011 5 pages, Robot Watch website.
Ueda et al., Large Effective-Strain Piezoelectric Actuators Using Nested Cellular Architecture With Exponential Strain Amplification Mechanisms, IEEE/ASME Transactions on Mechatronics, Oct. 2010, pp. 770-782, vol. 15 Issue 5, Institute of Electrical and Electronics Engineers, Piscataway, New Jersey.
Vanderborght et al., Variable impedance actuators: A review, Robotics and Autonomous Systems, Dec. 2013, 14 pages, vol. 61, Issue 12, Elsevier, Netherlands.
Walsh, Biomimetic Design of an Under-Actuated Leg Exoskeleton for Load-Carrying Augmentation, Massachusetts Institute of Technology, Feb. 2006, 97 pages, Massachusetts.
Walsh et al., A Quasi-Passive Leg Exoskeleton for Load-Carrying Augmentation, International Journal of Humanoid Robotics, Mar. 8, 2007, 20 pages, vol. 4, No. 3, World Scientific Publishing Company.
Wang et al., A highly-underactuated robotic hand with force and joint angle sensors, 2011 IEEE/RSJ International Conference on Intelligent Robots and Systems, Sep. 25-30, 2011, 6 pages, Institute of Electrical and Electronics Engineers, Piscataway, New Jersey.
Yeates, Utah-built robot safeguards the workplace, http://www.ksl.com?nid=148&sid=17654421&autostart=y; Oct. 13, 2011, 3 pages, KSL Broadcasting, Salt Lake City, Utah.
Yip et al., High-Performance Robotic Muscles from Conductive Nylon Sewing Thread, 2015 IEEE International Conference on Robotics and Automation (ICRA), May 26-30, 2015, 6 pages, Seattle, Washington.

(56) References Cited

OTHER PUBLICATIONS

Zubrycki et al., Novel haptic glove-based interface using jamming principle, Proceedings of the 10$^{th}$ International Workshop on Robot Motion and Control, Jul. 6-8, 2015, 6 pages, IEEE, Poland.

\* cited by examiner

COMBINING SENSOR OUTPUT DATA TO PREVENT UNSAFE OPERATION OF AN EXOSKELETON

BACKGROUND

Robotic systems, such as exoskeletons and humanoid robots, are becoming more and more robust and powerful. In the case of exoskeletons, in which there is a human operator donning and operating the exoskeleton, these can inherently pose a safety risk to the human operator donning the exoskeleton, such as if one or more components or systems of the exoskeleton fails or malfunctions leading to unintended operation scenarios. In the case of both exoskeletons and humanoid robots, these can pose safety risks to others in the vicinity of the operating exoskeleton or humanoid robot as a result of similar failures of malfunctions. In addition, exoskeletons and other humanoid robots are becoming more and more prevalent in their use as technologies and efficiencies improve. Historically, many exoskeletons (full body or partial body) have been utilized in the rehabilitation industry, and consequently are quite safe because of their limited output torque to joints, and because of the medical personnel supervision over a patient using such rehabilitation-type of exoskeletons. However, in scenarios involving high-performance exoskeletons designed to significantly amplify human capabilities to perform at levels or to achieve various tasks that would otherwise be difficult or impossible or inefficient for a human to carry out alone or unaided, safety to the operator and others must be paramount and of the upmost importance from design to implementation of the functionality of the exoskeleton. Simply said, due to their intended purpose to amplify human capabilities (e.g., strength, endurance, agility, speed, and other aspects), such high-performance exoskeletons comprise operational functionality that, if not properly constrained, can overpower the operator donning the exoskeleton, thus presenting significant potential risks to the operator of serious injury or death.

SUMMARY

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The present disclosure sets forth an exoskeleton operable to prevent unsafe operation of the exoskeleton. The exoskeleton can comprise a plurality of support structures, and a plurality of joint mechanisms each rotatably coupling two of the plurality of support structures to define a joint of the exoskeleton rotatable about an axis of rotation. The exoskeleton can comprise a plurality of sensors comprising a first sensor configured to generate sensor output data associated with a first joint mechanism of the plurality of joint mechanisms, and a second sensor configured to generate sensor output data associated with a second joint mechanism of the plurality of joint mechanisms. The exoskeleton can comprise a controller configured to: receive the sensor output data generated by the first and second sensors; combine the sensor output data generated by the first and second sensors; and determine whether the combination of the sensor output data from the first and second sensors satisfies an error condition in relation to at least one defined criterion, wherein the existence of an error condition is indicative of an anomalous operating state of the exoskeleton.

The present disclosure sets forth an exoskeleton operable to prevent unsafe operation of the exoskeleton. The exoskeleton can comprise a plurality of support structures, and a plurality of joint mechanisms each rotatably coupling two of the plurality of support structures to define a joint of the exoskeleton rotatable about an axis of rotation. The exoskeleton can comprise a plurality of force sensors each configured to generate force sensor output data associated with a respective joint mechanism in response to user movement, and a controller, having one or more processors, configured to: generate a first command signal, based on the force sensor output data from a first sensor, for impending operational control of a first joint mechanism, and generate a second command signal, based on the force sensor output data from a second sensor, for impending operational control of a second joint mechanism; combine the first and second command signals; and determine whether the combination of the first and second command signals satisfies an error condition in relation to at least one defined criterion, wherein the existence of the error condition is indicative of an anomalous operating state of the exoskeleton.

The present disclosure sets forth a method for safe operation of an exoskeleton. The method can comprise operating an exoskeleton comprising at least two joint mechanisms, and operating an anomalous operating state detection system of the exoskeleton. The anomalous operating state detection system can comprise a controller and can comprise a plurality of sensors configured to generate sensor output data associated with the at least two joint mechanisms. The controller can be configured to combine sensor output data of at least two sensors of the plurality of sensors to determine whether the combination of the sensor output data satisfies an error condition in relation to at least one defined criterion, wherein the existence of the error condition is indicative of an anomalous operating state of the exoskeleton. The controller can be configured to execute a remedial measure based on the existence of the error condition to prevent unsafe operation of the exoskeleton.

The present disclosure sets forth a computer implemented method to prevent unsafe operation of an exoskeleton. The method can comprise facilitating operation of an exoskeleton comprising a plurality of joint mechanisms. The exoskeleton can comprise a plurality of sensors operable to generate sensor output data. The method can comprise receiving sensor output data generated by a first sensor of the plurality of sensors, and the sensor output data from the first sensor can be associated with a first joint mechanism of the plurality of joint mechanisms. The method can comprise receiving sensor output data generated by a second sensor of the plurality of sensors, and the sensor output data from the second sensor can be associated with a second joint mechanism of the plurality of joint mechanisms. The method can comprise combining the sensor output data from the first and second sensors, and determining whether the combination of the sensor output data from the first and second sensors satisfies an error condition in relation to at least one defined criterion, wherein the existence of the error condition is indicative of an anomalous operating state of the exoskeleton.

The present disclosure sets forth a computer implemented method to prevent unsafe operation of an exoskeleton. The method can comprise operating an exoskeleton comprising a plurality of joint mechanisms that define respective joints of the exoskeleton rotatable about respective axes of rotation. The exoskeleton can comprise a plurality of sensors operable to generate sensor output data. The method can comprise generating a first command signal, based on sensor output data from a first sensor of the plurality of sensors, for impending operational control of a first joint mechanism of the plurality of joint mechanisms. The method can comprise generating a second command signal, based on sensor output data from a second sensor of the plurality of sensors, for impending operational control of a second joint mechanism of the plurality of joint mechanisms. The method can comprise combining the first and second command signals, and determining whether the combination of the first and second command signals satisfies an error condition in relation to at least one defined criterion, wherein the existence of the error condition is indicative of an anomalous kinematic movement of the exoskeleton.

The present disclosure sets forth an anomalous operating state detection system of an exoskeleton, which can comprise a plurality of sensors operable with an exoskeleton and configured to generate sensor output data associated with at least two joint mechanisms of the exoskeleton. The system can comprise at least one processor, and a memory device including instructions that, when executed by the at least one processor, cause the system to: combine sensor output data from the plurality of sensors; determine whether the combination of the sensor output data from the plurality of sensors satisfies an error condition in relation to at least one defined criterion, wherein the existence of the error condition is indicative of an anomalous operating state of the exoskeleton; and execute a remedial measure based on the existence of an error condition to prevent unsafe operation of the exoskeleton.

The present disclosure sets forth one or more non-transitory computer readable storage media storing instructions that, when executed by one or more processors, cause the one or more processors to: receive sensor output data generated by a first sensor of a plurality of sensors of an exoskeleton, the sensor output data from the first sensor being associated with a first joint mechanism of the exoskeleton; receive sensor output data generated by a second sensor of the plurality of sensors, the sensor output data from the second sensor being associated with a second joint mechanism of the exoskeleton; combine the sensor output data from the first and second sensors; and determine whether the combination of the sensor output data from the first and second sensors satisfies an error condition in relation to at least one defined criterion, wherein the existence of the error condition is indicative of an anomalous operating state of the exoskeleton.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
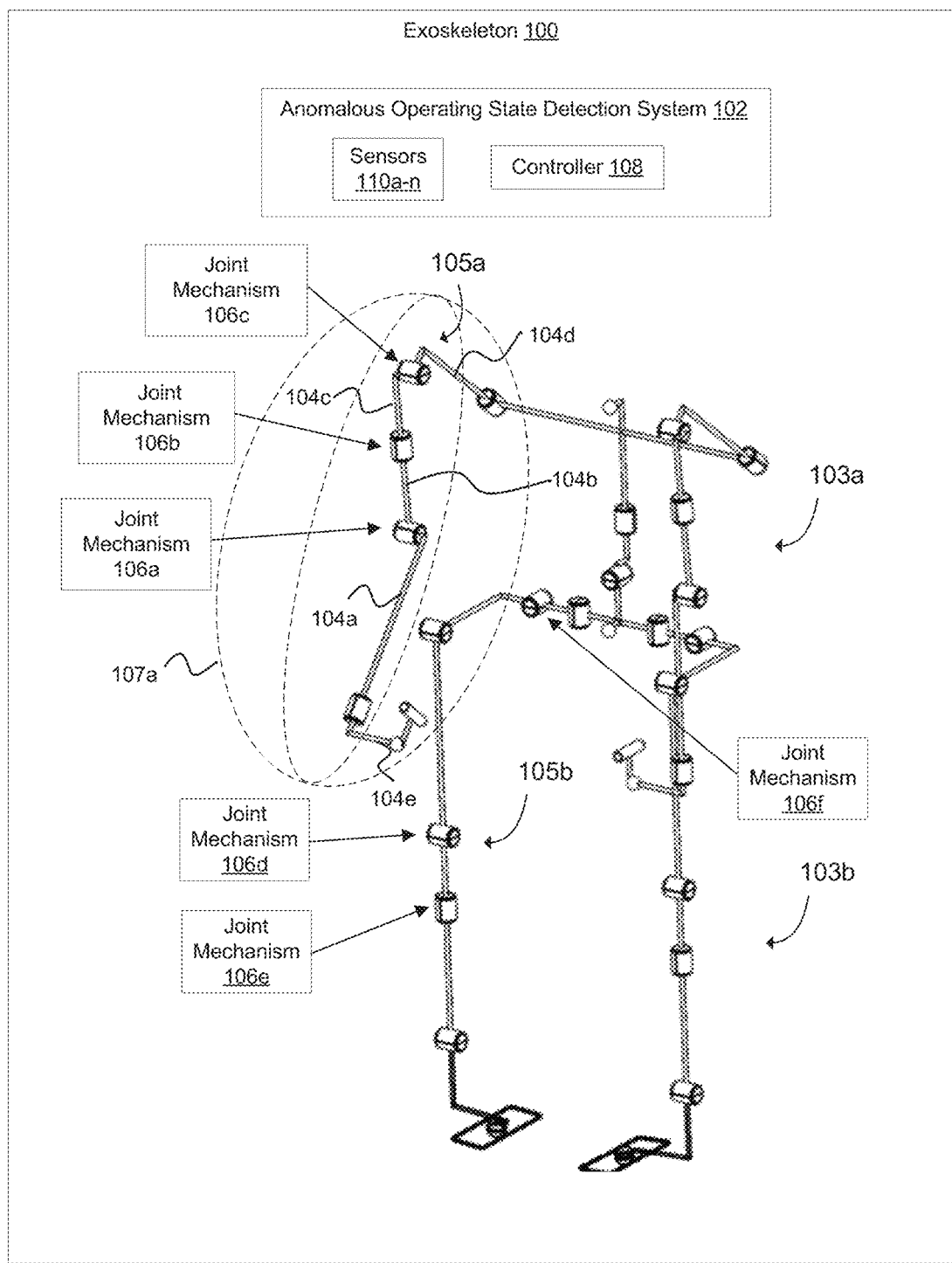
FIG. 1 schematically illustrates an exoskeleton having an anomalous operating state detection system, in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

To further describe the present technology, examples are now provided with reference to the figures.

The term "joint mechanism" is referred to herein as a rotating mechanism that comprises a rotating joint of the exoskeleton. More specifically, a joint mechanism can comprise structural components or elements of the exoskeleton that are directly or indirectly rotatably connected or coupled to one another, and that rotate relative to one another about an axis of rotation, thus forming or defining a joint of the exoskeleton. Several different types of joint mechanisms having differing structural arrangements of different types of structural components or elements rotatable relative to one another are contemplated herein, and as such, those specifically described and shown in the drawings are not intended to be limiting in any way. In addition to the structural components or elements that are rotatable relative to one another, a joint mechanism can further comprise one or more objects, devices, and/or systems (e.g., actuator(s), sensor(s), clutch(es), transmission(s), and any combination of these), some of which can comprise or support the rotatably coupled structural components or elements of the joint (e.g., a rotary actuator having structural components or elements in the form of input and output members rotatable relative to one another that can couple to support structures of the exoskeleton, and that is operable to power the joint), or some of which facilitate rotation between two or more coupled structural components or elements (e.g., an actuated joint mechanism comprising a linear actuator operable to rotate relative to one another rotatably coupled structural components or elements in the form of support structures to provide a powered or actuated joint), or some of which indirectly rotatably couple or facilitate the rotatable coupling of the structural components or members (e.g., structural components or elements rotatably coupled together via a clutch or clutch mechanism). A joint mechanism can comprise a powered (i.e., actuated) joint or a non-powered (i.e., non-actuated or passive) joint.

In one example, a "joint mechanism" can comprise adjacent structural components or elements in the form of limb support structures that form all or part of the limbs of the exoskeleton, each having coupling portions that are configured to interface and fit with one another, and that are rotatably coupled together at a point of contact between the limb support structures, thus forming or defining a joint, wherein the limb support structures are able to rotate relative to one another about an axis of rotation of the joint mechanism (i.e., the joint axis of rotation) (e.g., a passive, non-powered exoskeleton joint in the form of or defined by two limb type support structures rotatably coupled together at respective coupling portions, such that they are rotatable relative to each other). In this example, the joint mechanism comprises a portion of the adjacent limb support structures, namely the respective coupling portions of the limb support structures.

In another example, a "joint mechanism" can comprise structural components or elements in the form of input and output members of a system or device at the point of contact between the structural components or elements (such as those part of an actuator or of a clutch device or of a brake device, or an elastic element (e.g., spring or quasi-passive elastic actuator) or of a combination of these operating together), where the input and output members are rotatably coupled together via the actuator or clutch device or brake device, or spring element, or any of these in combination, thus forming or defining a joint, and where the input and output members are able to rotate relative to one another about an axis of rotation of the joint mechanism (i.e., the joint axis of rotation) (e.g., an actuated or powered exoskeleton joint in the form of or defined by an actuator comprising input and output members of a motor indirectly rotatably coupled together, such that they are rotatable relative to each other). In this example, the joint mechanism, and particularly the input and output members of the joint mechanism, can be further coupled to respective limb type support structures, such that the limb type support structures are further caused to rotate with the input and output members, respectively, and relative to one another, about the axis of rotation of the joint mechanism.

In a specific example, a "joint mechanism" can comprise some or all of the components described in the joint mechanism 106 of FIG. 6, which is further discussed below, and which is further exemplified in the specific joint mechanisms shown and described below as pertaining to FIGS. 7-11. In the example of FIGS. 7-8B, for instance, the input and output members (see FIG. 8B, 236*a*, 236*b*) are part of the "joint mechanism" (see FIGS. 7-8B, 206*a*), but the connecting limb type support structures (FIG. 7, 204*a*, 204*b* are not part of the "joint mechanism" 206*a* as these are additional structural members coupled to the input and output members.

Figure 2:
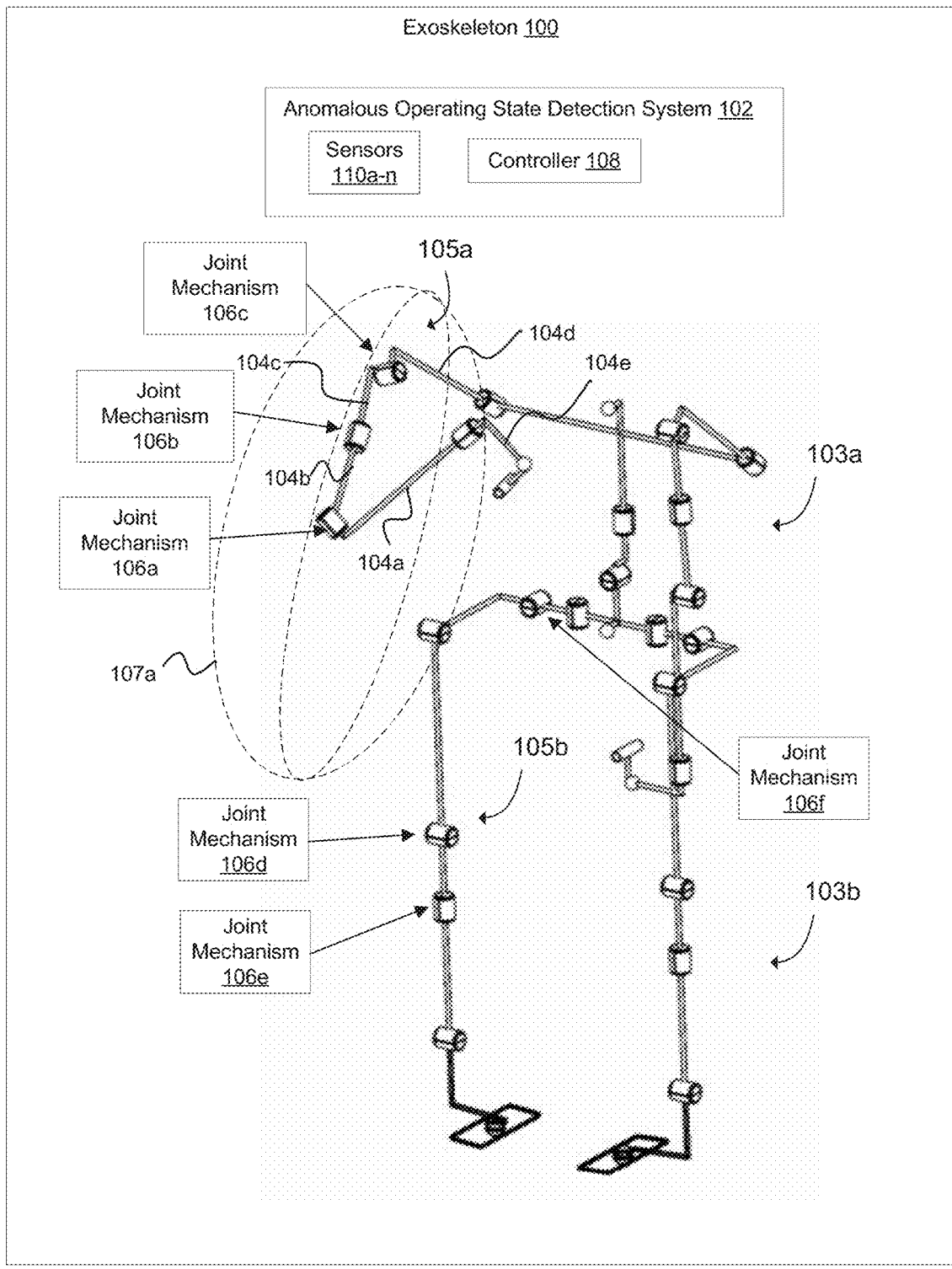
FIG. 2 schematically illustrates the exoskeleton of FIG. 1 that has detected an anomalous operating state associated with an upper body limb structure, in accordance with an example of the present disclosure.
Figure 3:
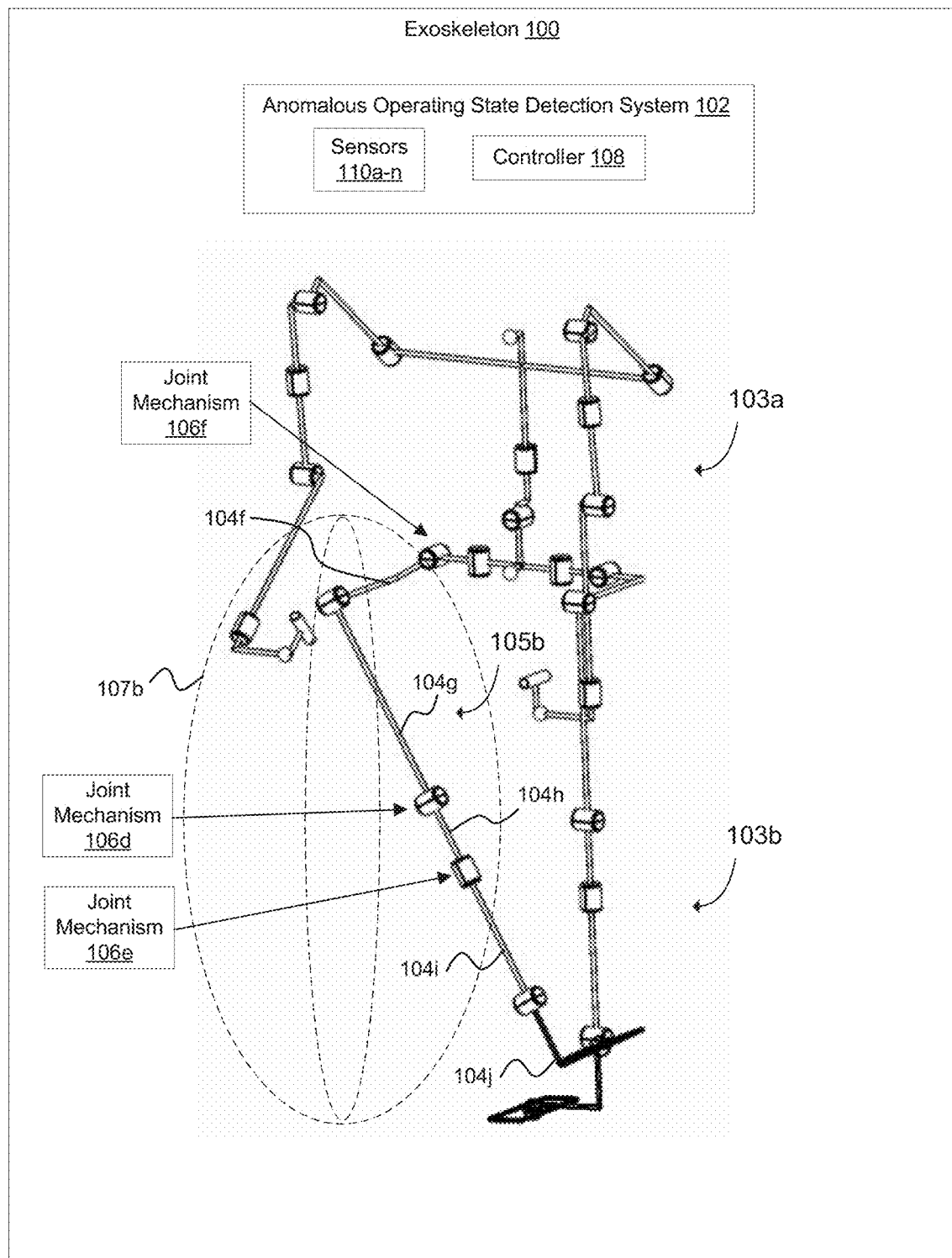
FIG. 3 schematically illustrates the exoskeleton of FIG. 1 that has detected an anomalous operating state of a lower body limb, in accordance with an example of the present disclosure.
Figure 4:
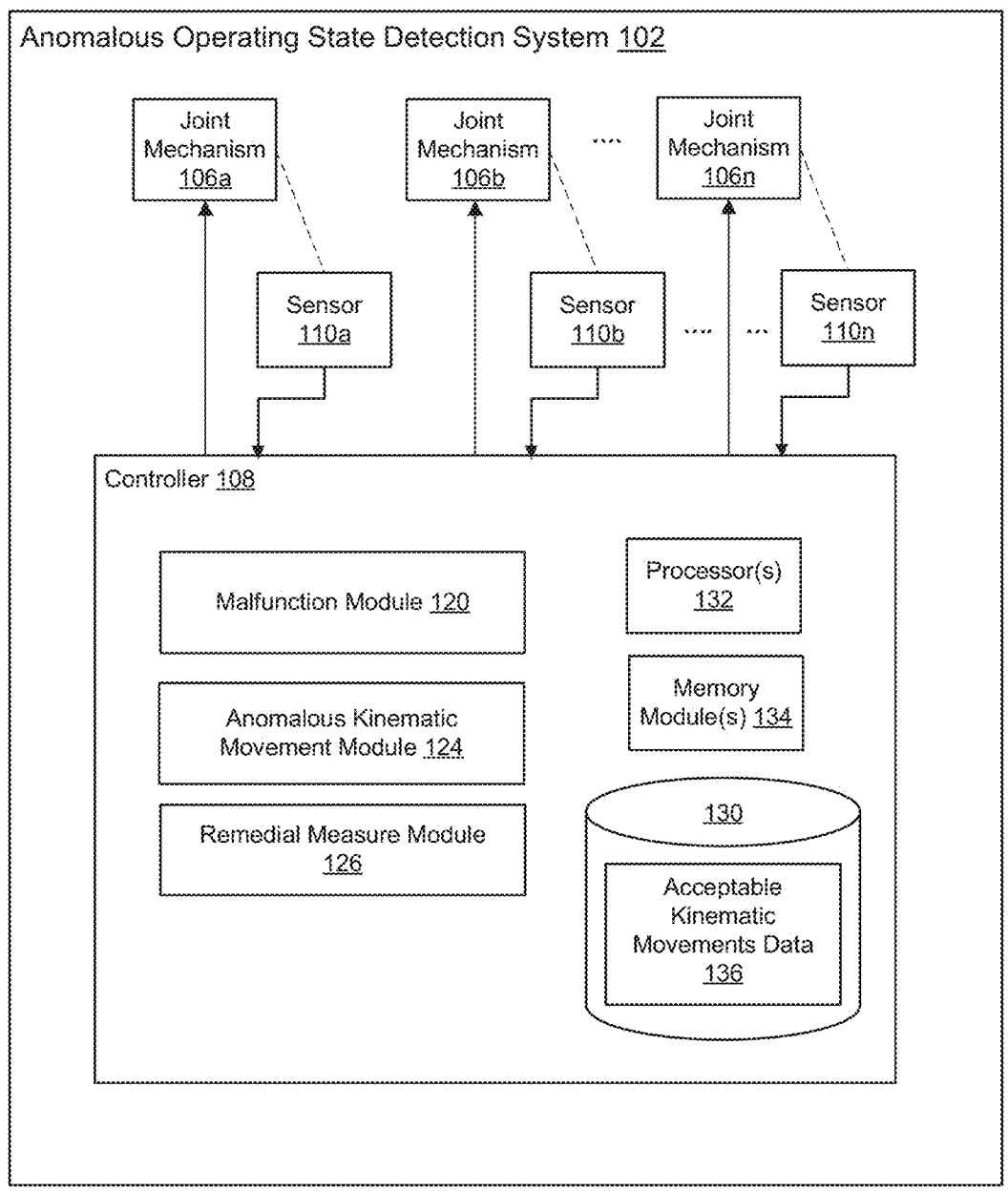
FIG. 4 is a block diagram that illustrates example components included in the exoskeleton of FIG. 1, and an anomalous operating state detection system of the exoskeleton of FIG. 1, in accordance with an example of the present disclosure.

FIGS. 1-3 illustrate a representative exoskeleton 100, and FIG. 4 is a block diagram illustrating an anomalous operating state detection system 102 of the exoskeleton 100, in accordance with an example of the present disclosure. Note that the exoskeleton 100 is a wireframe that is schematically representative of support structures, as well as respective joints of a plurality of joint mechanisms of a full body exoskeleton. Alternatively, an exoskeleton contemplated in the present disclosure may be a lower or upper body exoskeleton. FIG. 7 illustrates an example upper and lower body exoskeleton. For additional discussion, see U.S. patent application Ser. No. 17/114,460 filed Dec. 7, 2020, which is incorporated by reference herein in its entirety.

The plurality of sensors 110 may include joint position sensor(s) 150*a* (e.g., Hall effect sensor), a thermal sensor 150*b*, motion sensor(s) 150*c* (e.g., IMUs), current sensor(s) 150*d* (e.g., phase current sensor), motor rotor position sensor 150*e*, torque sensor 150*f*, and/or other sensor(s) 150*g*. As discussed in U.S. patent application Ser. No. 17/114,460 filed Dec. 7, 2020, which is incorporated by reference herein, and also discussed below, one or more of the sensors 150*a-g* can be recruited as a substitute sensor in the event of a determined discrepancy between sensor output data of the sensors 150*a-g*. For instance, see the description of FIGS. 7-11 below for a detailed example regarding recruiting sensors in the event of a discrepancy between sensors to detect a potential malfunction of a sensor or other component so that the controller may take a remedial measure to prevent unsafe operation of the exoskeleton. Accordingly, the command signals referenced in the present disclosure may be generated by the controller 108 based on sensor output data from one or more of the sensors 150*a-g* that are associated with the joint mechanism 106.

The exoskeleton 100 can comprise a plurality of sensors 110*a-n* configured to generate sensor output data associated with at least one operational function of the exoskeleton 100, as will be appreciated from the below discussion regarding the sensors of FIGS. 6-11, for instance. The sensors 110*a-n* can be part of the anomalous operating state detection system 102, as further detailed below. The sensors 110*a-n* can be coupled to various components of the exoskeleton 100 in a suitable manner, as further exemplified below, for generating and providing sensor output data via sensor output signals transmitted to a control system or controller 108 of the sensor suite discrepancy system 102 of the exoskeleton 100. The sensors 110*a-n* may include various types of sensors having various purposes for operational function of the exoskeleton 100. For instance, a force moment sensor (e.g., 6-axis load cell) can be associated with one or more joint mechanisms 106*a-n* and can be provided as part of a contact displacement system to sense movement of a user to effectuate movement of the exoskeleton 100 (e.g., drive systems of each joint mechanism 106*a-n*) that at least partially corresponds to movement in accordance with the anatomy and the degrees of freedom of the user when the exoskeleton 100 is being worn by the user, as further discussed below. See FIGS. 6-11, and the below discussion, for further details on the contact displacement system using force moment sensors at or near certain joint mechanisms for control thereof.

Thus, the control system or controller 108 can be a bimodal or multi-modal controller that has the ability to control the operation of the exoskeleton responsive to user inputs. One such example of a contact displacement system is further described with reference to U.S. Pat. No. 8,849,457 B2, issued Sep. 30, 2014, which is incorporated by reference herein, and further described below regarding FIGS. 6-11. However, it should be appreciated that an exoskeleton of the present disclosure may implement other suitable means for sensing user movement to effectuate movement of the exoskeleton according to the user movement.

Other sensors of the suite of sensors 110*a-n* may include a variety of different sensor types incorporated for different purposes associated with operating the exoskeleton 100. For instance, as further discussed below, the suite of sensors 110*a-n* may include a variety of joint position sensors, motor rotor position sensors, joint torque sensors, thermal or temperature sensors, current sensors, and motion sensors such as Inertial Measurement Units (IMUs). Thus, a particular exoskeleton can support or incorporate dozens of sensors for a variety of different purposes, such as gravity compensation functions, feedback, and others, as exemplified herein.

Further to this overview, the controller 108 can be configured detect an anomalous operating state of the exoskeleton 100 to prevent an unsafe operation of the exoskeleton 100, such as to avoid injury to the user/wearer, and/or to others that may be in the vicinity of the exoskeleton 100 during operation. An anomalous operating state can comprise an anomalous kinematic movement, a malfunction of the exoskeleton 100, or any combination of these. As a general example, a malfunction of the exoskeleton 100 can include one or more of a faulty or defective sensor, actuator, transmission, controller, processor, bearing, or other component or system, which can be one or more of a number of such components that may not be working properly. Accordingly, the controller 108 can detect such malfunction(s) and the effectuate or cause performance a remedial measure, ideally before such malfunction becomes a significant problem that can cause injury to persons or property. Examples of malfunctions are further discussed below.

As a general example, an "anomalous kinematic movement" can be defined as any unsafe or undesirable movement of the exoskeleton 100 based on the information provided by two or more sensors 110*a-n* as associated with two or more joint mechanisms 106*a-n*. That is, before the controller 108 transmits generated command signal(s) to actuator(s) of one or more joint mechanisms 106*a-n* to effectuate a particular rotational movement about the one or more joint mechanisms 106*a-n* (i.e., impending operational control of one or more joint mechanisms), the controller 108 will first determine whether such impending operational control is "safe or unsafe" to prevent an unsafe kinematic movement of the exoskeleton 100 that may result in injury. Such "safe or unsafe" kinematic movements can be based on known safe or unsafe movements that are programmed or stored into, or accessible by, the controller 108 based on acceptable exoskeleton movements. For instance, an unsafe movement could be an arm of an exoskeleton performing a kinematic movement that results in the user being undesirably impacted by the exoskeleton arm, such as being struck in the face, leg, or other part of the user's body by a portion of the exoskeleton. Another unsafe movement could be a kinematic movement that results in both legs of the exoskeleton being lifted upwardly at the same time, for instance, which may unbalance the exoskeleton to the point that it falls over and potentially injures the user.

Before the exoskeleton performs such known, unsafe movements, the controller 108 can effectuate a remedial measure (examples below) to prevent such unsafe movements. This can be achieved by the controller 108 monitoring two or more joint mechanism 106*a-n* as they related to each other in terms of their current rotational positions and positions in space, and in terms of impending or future rotational position if the two or more joint mechanisms 106*a-n* were actuated, as exemplified below regarding the detailed discussion of FIGS. 1-3.

The controller 108 can achieve the aforementioned detection of an "anomalous operating state" of the exoskeleton 100 in different ways. In a first example, the controller 108 can be configured to monitor and receive the sensor output data generated by two or more sensors 110*a-n* to determine an anomalous operating state. In a second example, the controller 108 can be configured to monitor two or more command signals generated by the controller 108 that are based on processed sensor output data, wherein the controller can then determine whether any one of the command signals (to be transmitted to actuator(s)) may result in an unsafe anomalous kinematic movement. Each of these examples for detection of an anomalous operating state can be performed separately, meaning that they do not depend on each other. Alternatively, each of these means for detection of an anomalous operating state can be performed in at the same time or in parallel, which provides some level of redundancy to provide two layers of protection to prevent unsafe movements of the exoskeleton. Note that an anomalous kinematic movement may be the result of a user unintentionally commanding the exoskeleton to perform an unsafe kinematic movement, or it may be the result of a malfunction, such as one caused by a faulty or non-functioning sensor, as discussed below.

In a non-limiting example, as shown in FIG. 1, the upper body 103*a* of the exoskeleton 100 includes a right arm 105*a* having joint mechanisms 106*a-c* (and others not labeled), each one being rotatably coupled together by two or more of the relative support structures 104*a-d*. As schematically illustrated in FIGS. 1 and 2 (by dashed lines), a safety envelope 107*a* can be defined as a three dimensional zone or area about which the right arm 105*a* can or should safely operate within. If, for example, the controller 108 detects that one or more support structures and/or one or more joint mechanisms of the right arm 105*a* are outside of this safety envelope 107*a*, then that may be indicative of an anomalous operating state, such as a malfunction that requires performance of a remedial measure for safe operation. For instance, if one or more sensors (e.g., position sensors) provide erroneous data that indicates that the three dimensional position of the joint mechanism 106*a* is "physically inside of" (i.e., occupying the same space or spatial position, or even occupying at least part of the same space or spatial position) the knee joint mechanism 106*d* (also based on the sensed position of the knee joint mechanism 106*d*), this would indeed be physically impossible, and the controller 108 would be able to determine such anomalous operating state, and can then implement or initiate a remedial measure. In this example, the controller 108 has determined that the elbow joint mechanism 106*a* is outside of the pre-determined and defined safety envelope 107*a*, based on the sensed, known position of the elbow joint mechanism 106*a* and the knee joint position 106*d* relative to each other. Note that, in this example, a first joint mechanism (i.e., 106*a*) and a second joint mechanism (e.g., 106*d*) provide non-sequentially coupled joints of the exoskeleton (because a number of other joint mechanisms are coupled or situated between 106*a* and 106*d*). As can be appreciated some joint mechanisms provide sequentially coupled joints (e.g., 106*a* and 106*b* provide sequentially coupled joint mechanism). In one example, such anomalous operating state may be a malfunction of the position sensor (e.g., Hall effect sensor) supported by or associated with the elbow joint mechanism 106*a*, which may be providing inaccurate or erroneous sensor output data for a number of reasons (e.g., faulty wiring, defective encoder, faulty sensing element, broken sensor mount, or other reasons). Accordingly, the controller 108 can receive the sensor output data of two or more sensors (joint position sensors), as associated with two joint mechanisms (elbow and knee), to determine the existence of an anomalous operating state indicative of a malfunction. The manner in which the controller 108 achieves such a determination is further detailed below.

In one example of the controller 108 "looking at" (monitoring and receiving) command signals to determine the existence of an anomalous operating state (as introduced above), compare FIGS. 1 and 2. FIG. 2 shows a portion of the right arm 105*a* being outside of the safety envelop 107*a*, which, if such movement were performed by the exoskeleton, this would result in the user being struck in the face (i.e., support member 104*e* may impact the user's face if the right arm 105*a* were actuated to the position of FIG. 2). For purposes of clarity, the position of the right arm 105*a* shown in FIG. 2 illustrates its position "if it were to be actuated" in the event that the controller 108 operated/actuated one or more joint mechanisms 106*a*-*c* as commanded by the user (e.g., as a result of utilizing the aforementioned contact displacement system). That is, before the right arm 105*a* is actively actuated to the position of FIG. 2 by the controller 108, the controller 108 can detected beforehand that such movement of the exoskeleton arm would be an unsafe movement, and therefore the controller 108 can instead perform a remedial measure to prevent the unsafe movement and position of the arm as shown in FIG. 2. Such remedial measure may include not actuating the joint mechanism(s) 106*a*-*c* to such a position as shown in FIG. 2, or it may include actuating the joint mechanism(s) 106*a*-*c* to an acceptable/lesser degree so that the right arm 105*a* remains within the bounds of the safety envelope 107*a*. The manner in which the controller 108 achieves such determination and functionality is further detailed below.

In another non-limiting example, as shown in FIG. 3, the lower body 103*b* of the exoskeleton 100 includes a right leg 105*b* having joint mechanisms 106*d*-*f* (and others not labeled) rotatably coupled together by support structures 104*f*-*j* (and others not labeled). As schematically illustrated, a safety envelope 107*b* can be a three dimensional zone or area about which the right leg 105*b* can or should safely operate within. If, for example, the controller 108 detects that one or more support structures and/or one or more joint mechanisms of the right leg 105*b* are outside of this safety envelope 107*b*, then that may be indicative of an anomalous operating state, such as a malfunction or anomalous kinematic movement. Similarly as discussed above, the controller 108 can "look at" (compare or combine as discussed below) the sensor output data of two or more sensors (e.g., joint position sensors), as associated with at least two joint mechanisms (106*a*-*n*) to determine the existence of an anomalous operating state (e.g., one indicative of a malfunction), such as one where the right knee joint mechanism 106*d* is physically within the left knee joint mechanism (not labeled), which is not illustrated in FIG. 3. Indeed, FIG. 3 illustrates the other manner in which the controller 108 can detect an anomalous operating state by "looking at" two or more command signals to determine if an impending operation function of actuating joint mechanism(s) 106*d*-*f* would result in an unsafe kinematic movement, such as the right foot (structural support 104*j*) of the exoskeleton 100 impacting the user's left foot and/or the left foot structure of the exoskeleton 100. In this way, FIG. 3 is similar to the example discussed above regarding FIG. 2.

Note that each safety envelope 107*a* and 107*b* may not be a perfectly, well-defined envelope as illustrated in the drawings, and may not necessarily be known or generated by the controller 108 in the manner illustrated. Rather, the safety envelopes may be defined by the particular joint positions of two or more of all of the particular joint mechanisms 106*a*-*n* of the exoskeleton 100, and at a particular point in time of operating the exoskeleton 100. To this end, it should be appreciated that the safety envelope 107*a* (and other safety envelopes) may be constantly changing based on the rotational position of two or more joint mechanisms 106*a*-*n* as related to each other, and as relative to acceptable, safe kinematic movements of the exoskeleton 100. For instance, assume the user is running with the exoskeleton 100 with the knee joints and elbow joints moving quickly and up and down near each other. Of course, it is desirable that the elbow joint mechanisms (and user's elbows) do not impact the user's knees or the knee joint mechanisms during running. Thus, each exoskeleton limb (arms, legs) may have their own safety envelope that is dynamically changing depending on the movement and position of the joint mechanisms and that defines the safe operating area or volume about which each exoskeleton limb can and should operate within for safe operation of the exoskeleton. This is achieved by analyzing sensor output data that is already part of the exoskeleton for other purposes (e.g., appropriately actuating the joints as desired/commanded by the user), as compared to prior robotic systems that utilize special/additional sensors and a robust modeling software program that constantly analyzes and models various aspects of a robotic system.

The anomalous operating state detection system 102 exemplified in FIG. 4 can comprise the controller 108 and the plurality sensors 110*a*-*n*. Although FIG. 4 illustrates one sensor associated with each joint mechanism of the exoskeleton 100, for purposes of simplification of the examples discussed below, it will be appreciated that a plurality of sensors can be associated with each joint mechanism, as discussed below regarding FIG. 6. By "associated with" this means that the sensor(s) is used in a manner that it measures a characteristic of the respective joint mechanism, such as a joint position sensor attached to a rotational component of a particular joint mechanism, as exemplified in FIG. 7-11, for instance. The controller 108 can be considered a computing device or a control system, which can include a malfunction module 120, an anomalous kinematic movement module 124, a remedial measure module 126, a data store 130, one or more processors 132, one or more memory module(S) 134, and other system components discussed herein.

Figure 5A:
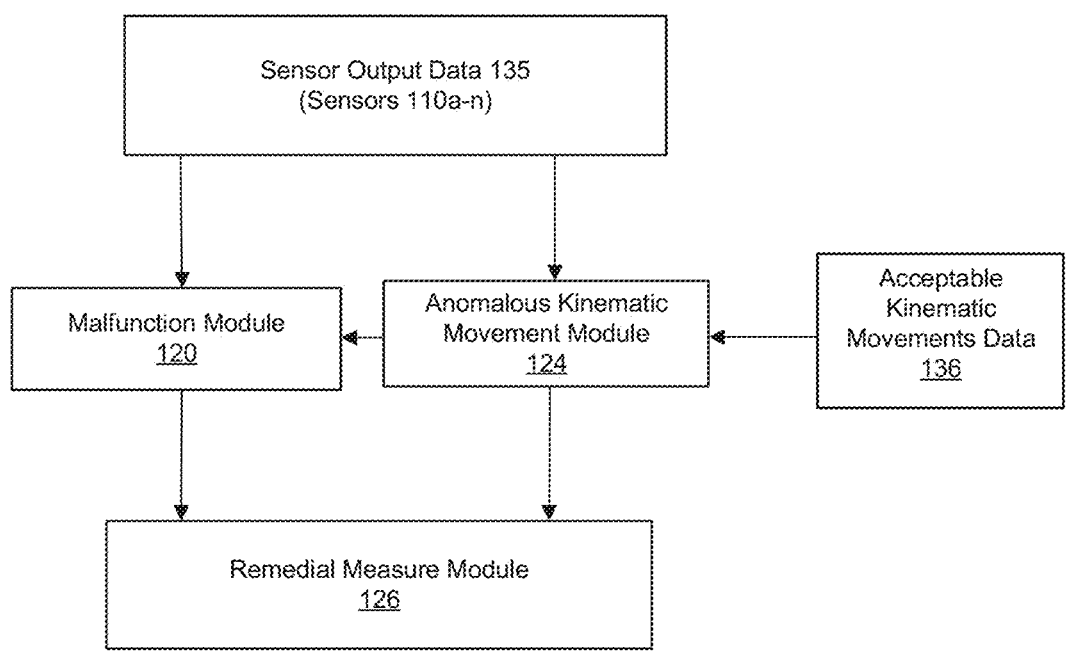
FIG. 5A is a flow diagram that illustrates an example method executed by an anomalous operating state detection system, in accordance with an example of the present disclosure.
Figure 5B:
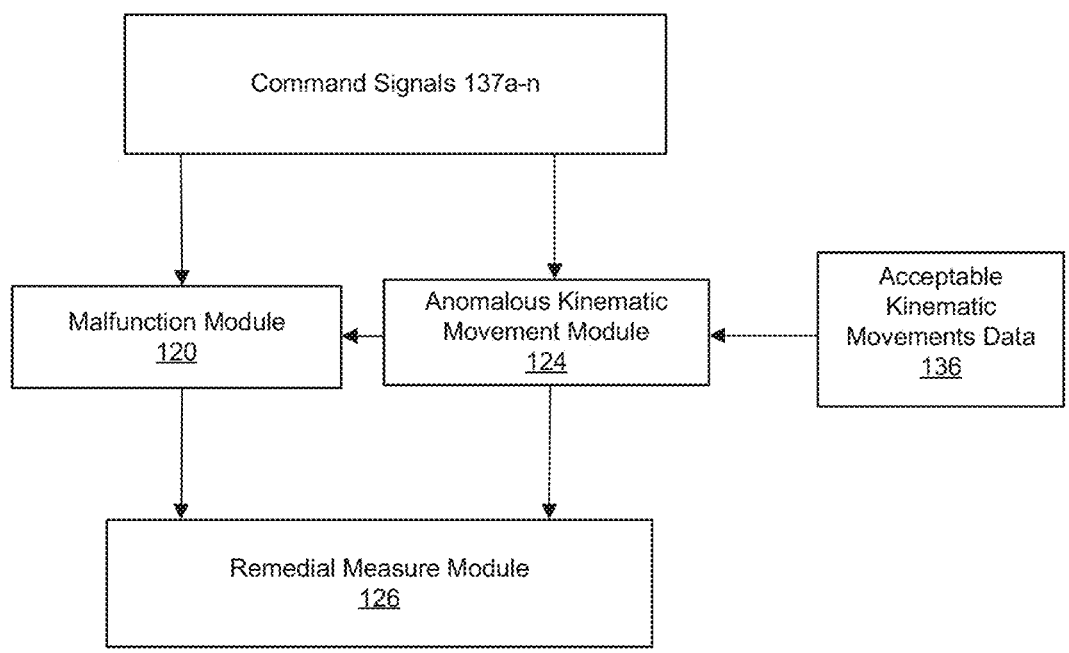
FIG. 5B is a flow diagram that illustrates an example method executed by an anomalous operating state detection system, in accordance with an example of the present disclosure.

FIGS. 5A and 5B each illustrate a flow diagram representative of a method as associated with and executed by the various modules of controller 108 of the anomalous operating state detection system 102 of FIG. 4.

The various processes and/or other functionality contained within the controller 108 may be executed on/by the one or more processors 132 that are in communication with one or more memory modules 134. The controller 108 can include a number of computing devices that are arranged, for example, in one or more server banks or computer banks, or other arrangements. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store 130 may include storage systems such as a SAN (Storage Area Network), cloud storage network, volatile or non-volatile RAM, optical media, or hard-drive type media. The data store 130 may be representative of a plurality of data stores 130 as can be appreciated. API calls, procedure calls, inter-process calls, or other commands can be used for communications between the modules.

FIG. 5A illustrates the aforementioned manner in which the controller 108 can "look at" sensor output data to determine or detect an anomalous operating state, such as a malfunction and/or an anomalous kinematic movement. Sensor output data 135 generated by at least some of the sensors 110a-n can be received and processed (by the processors(s) 132), and then the malfunction module 120 can be configured to determine whether the sensor output data 135 satisfies an error condition in relation to at least one defined criterion (or a plurality of defined criterion), whereby the existence of the error condition is indicative of an anomalous operating state of the exoskeleton. For example, if sensor output data from a joint position sensor (e.g., 110a, such as a Hall effect sensor S1 of FIG. 8A) associated with or supported by the elbow joint mechanism 106a indicates that the rotational position of the elbow joint is at 125 degrees (or equivalent radians), and if sensor output data from a joint position sensor (e.g., 110c) of the shoulder joint mechanism 106c (flexion/extension) indicates that the rotational position of the shoulder joint mechanism 106c is at 180 degrees, then this may satisfy an error condition in relation to a defined criterion or a plurality of defined criterion. That is, one example of a defined criterion can comprise an acceptable/unacceptable relationship between the rotational positon of two joints of a particular limb. For instance, it may be known (and therefore programmed in the controller as a defined criterion) that it is unsafe to have a shoulder flexed backwardly so far behind the body (i.e., 180 degrees) along with the elbow joint being bent upwardly to such a degree (i.e., 125 degrees), because it may place a large strain on the user because such limb position is beyond a comfortable or safe position (e.g., outside of the safety envelope 107a and therefore may cause injury). Because the controller 108 can be configured to never rotate the joint mechanisms 106a and 106c to such an unsafe position (being outside of the safety envelope), the controller 108 can effectively assume or know that there is a malfunctioning component. For instance, unbeknownst to the user (and the controller 108), assume that the rotational position sensor associated with the shoulder joint mechanism 106c is defective and therefore should be outputting an actual rotational position of 90 degrees (and not be outputting the inaccurate/ erroneous reading of 180 degrees). Accordingly, the malfunction module 120 has determined that the sensor output data 135 (i.e., rotational positions of the joint mechanisms 106a and 106c) indeed satisfies an error condition in relation to a particular defined criterion (i.e., the shoulder joint being positioned "too high" relative to the elbow joint position and outside the safety envelope), which therefore indicates the existence of an anomalous operating state being a malfunction of the exoskeleton (i.e., faulty or defective sensor).

In this example, the particular defined criterion can be a threshold limit or range as related to the rotational position of two or more joint mechanisms. For instance, if the rotational position the elbow joint mechanism 106a is between 90 and 130 degrees, then the shoulder joint mechanism 106c cannot exceed 100 degrees (i.e., the defined criterion), otherwise an error condition is satisfied, which may indicate a malfunction of a sensor (e.g., sensor 110c). In a more complex example, the same principle can apply to some or all of the joint mechanism 106a-n, such that each joint mechanism 106a-n must be within a particular range of rotational degrees relative to the particular rotational degrees of one or more other joint mechanisms.

In another example, a particular defined criterion (related to the determination of the malfunction module 120) can include that the fact that the sensed spatial position of any joint mechanism should never be within a certain distance from any other joint mechanism (which may indicative of a malfunction of a sensor or other component, as exemplified above regarding FIG. 1). This can also be the case with the particular position of the support members 104a-n relative to each other and relative to one or more of the joint mechanisms 106a-n. For instance, at least some of the support structures 104a-n can each support an IMU (inertia measurement unit) sensor for generating sensor output data associated with the three dimensional spatial position of the support structure. Of course, none of the sensors (e.g., IMUs) should be returning sensor output data that indicates one of the joint mechanisms (e.g., a first joint mechanism), for example one or more of the support structures of the joint mechanisms, as being "physically inside of" another joint mechanism (e.g., a second joint mechanism), such as one or more of the support structures of the other joint mechanism (i.e., at least part of the joint mechanisms occupying at least part of the same space or spatial position), because that is physically impossible, so if the controller 108 determines that the sensor output data indicates this anomalous operating state, this may be indicative of a sensor (e.g., IMU) malfunction.

The anomalous kinematic movement module 124 can be configured to combine the sensor output data 135 from at least two sensors 110a-n, and to determine whether the combination of the sensor output data from the at least two sensors 110a-n satisfies an error condition in relation to at least one defined criterion (or a plurality of defined criterion), whereby the existence of the error condition is indicative of an anomalous operating state of the exoskeleton (i.e., an anomalous kinematic movement, as introduced above). Note that the processes executed by the anomalous kinematic movement module 124 can occur in parallel with the processes executed by the malfunction module 120. As exemplified above regarding the discussion of FIG. 2, the anomalous kinematic movement module 124 can "look at" (compare or combine as discussed below) the sensor output data associated with the elbow joint mechanism 106a and the sensor output data associated with the shoulder joint mechanism 106b (thereby combining or comparing the sensor output data) to detect an anomalous operating state, which may indicate an anomalous kinematic movement that may be unsafe (which is determined before the joint mechanisms 106a and 106c are actuated). For instance, assume that a first force moment sensor associated with the joint mechanism 106a accurately generates sensor output data that indicates that the user desires to rotate his elbow to lift a load, such that the joint mechanism 106a should be actuated to have a torque output of 90 Nm. However, assume that a second force moment sensor associated with the shoulder joint mechanism 106b (medial/lateral rotation) inaccurately generates sensor output data that indicates that the user desires to medially rotate his shoulder, such that the joint mechanism 106a would be actuated to have a torque output of 25 Nm. Unbeknownst to the user and the controller 108, the second force moment sensor is defective and providing erroneous sensor data, and therefore the joint mechanism 106b should not be actuated at all, because the resulting movement would culminate in a portion of the right arm 105a being situated outside of the safety envelope 107a, and thereby would be an unsafe movement. However, before the controller 108 executes such movement of the joint mechanisms 106a and 106b (by controlling the actuator of the joint mechanism 106a), the controller 108 can "look at" the impending movement that would otherwise be effectuated by the controller 108, and can then determine that the combination of the sensor output data from the first and second force moment sensors indeed satisfies an error condition in relation to at least one defined criterion, as further exemplified here, to prevent unsafe operation of the exoskeleton.

In one example, at least some of the unsafe movements of the exoskeleton 100 can be stored and retrieved as acceptable kinematic movement data 136 of the data store 130. As mentioned above, the acceptable kinematic movement data 136 can include known unacceptable or unsafe kinematic movements that result in certain combinations of movement effectuated by two or more joint modules 106a-n that would otherwise be unsafe movements. For instance, it may be unsafe to have the lower legs of the exoskeleton spread apart too far from each other, which could cause injury to the user. Based on this, the acceptable kinematic movement data 136 can include a defined criterion being that the joint rotational position of a first hip joint mechanism (for left hip flexion/extension) cannot exceed an upper bound limit (e.g., 90 degrees) relative to the joint rotational position of a second hip mechanism (for right hip flexion/extension), because exceeding this upper bound limit may result in an unstable/unbalanced exoskeleton and/or injury to the user. This is merely one example of detecting an error condition based on at least one defined criterion, but it should be appreciated that the acceptable kinematic movement data 136 can include any number of defined criterion associated with the position of any combination of joints and/or support structures as related to each other that would be unsafe movements or positions.

Based on the existence of an error condition in regards to the discussion of FIG. 5A, as exemplified above, the remedial measure module 126 may be configured to execute one or more remedial measures to prevent unsafe operation of the exoskeleton 100, as further discussed herein.

With further reference to FIG. 5B, and as introduced above, the controller 108 can "look at" two or more command signals 137a-n to determine or detect an anomalous operating state, such as a malfunction and/or an anomalous kinematic movement. As also mentioned above regarding the contact displacement system in response to user movements/inputs, sensor output data generated by force moment sensors at some of the joint mechanism 106a-n (e.g., at least two joint mechanisms) can be received by the controller 108 and then processed according to known signal processing techniques for purposes of generating command signals that are then transmitted to the actuators (e.g., a certain voltage sent to an EM motor) of the respective joint mechanisms as part of a closed loop control system to appropriately operate the exoskeleton. However, before such command signals are transmitted to the respective joint mechanisms for rotational actuation (or other control feature such as braking the joint), the controller 108 can "look at" or compare two or more command signals, each for controlling at least one operational aspect at least one joint mechanism, to determine if the resulting actuation of the at least one joint mechanisms would constitute an unsafe kinematic movement that would situate one or more parts of the exoskeleton outside of a particular safety envelope (e.g., 107a, 107b), for instance.

Further to the example discussed regarding FIG. 5A, and in regards to FIG. 5B, assume the controller 108 has generated a first command signal 137a for impending operational control of the elbow joint mechanism 106a to actuate its EM motor with a supplied voltage that results in an output of 90 Nm (i.e., to lift a payload). Indeed, the impending operational control of the elbow joint mechanism 106a includes impending or subsequent control of the elbow joint mechanism 106a that would occur only if the command signal 137a were in fact transmitted to the EM motor to rotate the joint (or transmitted to a local encoder or controller of the joint mechanism). Further assume that the controller 108 has also generated a second command signal 137b to be transmitted to the shoulder joint mechanism 106b to actuate its EM motor with a voltage that results in an output of 25 Nm (i.e., "impending operational control" of the shoulder joint mechanism 106b). However, because such command signals 137a and 137b would actuate the respective joint mechanisms 106a and 106b outside of the safety envelope 107a, which would constitute an unsafe movement, the controller 108 causes execution of a remedial measure to prevent such unsafe movement of the exoskeleton 100 (instead of transmitting the command signals 137a and 137b to the joint mechanisms 106a and 106b). Thus, the controller 108 has combined or compared the command signals 137a and 137b and determined that the command signals 137a and 137b, when looked at together, would otherwise result in an anomalous kinematic movement that should not be performed. Based on this determination, the controller 108 has prevented an otherwise unsafe action or movement before it occurs to protect the safety of the user, the exoskeleton, and others around the exoskeleton.

In this example of FIG. 5B, the particular defined criterion can be a threshold limit or range as related to the rotational position of the joint mechanisms 106a and 106b (if the command signals 137a and 137b were transmitted to the joint mechanisms 106a and 106b for actuation). For instance, if the future rotational position the elbow joint mechanism 106a is going to be between 90 and 130 degrees, then the shoulder joint mechanism 106c should not be actuated to exceed 100 degrees when actuated from its current/known position, otherwise an error condition is satisfied. In a more complex example, the same principle can apply to some or all of the joint mechanism 106a-n, such that a future position of two or more joint mechanism 106a-n must be within a particular range of rotational degrees relative to the particular rotational degrees of one or more other joint mechanisms. In this manner, the joint mechanisms 106a-n of the exoskeleton 100 will not be actuated to unsafe positions relative to each other, relative to the user, and relative to particular support structures, so that the joint mechanisms 106a-n can operate safety and in harmony prior to any impending actuation or movement that may be unsafe.

Based on the existence of an error condition in regards to the discussion of FIGS. 5A and 5B, as exemplified above, the remedial measure module 126 may be configured to execute one or more remedial measures to prevent unsafe operation of the exoskeleton 100. In one example of a remedial measure, the controller 108 may transmit a command signal to the actuator of a joint mechanism for effectuating some amount of acceptable/safe rotation about the joint mechanism. For instance, if an impending output rotation of 45 degrees of the elbow joint mechanism 106a would place a portion of the right arm 105a outside of the safety envelope 107a, the controller 108 may instead transmit an appropriate command signal that would only cause 40 degrees of actual rotation so that the right arm 105a stays within the particular safety envelope 107a.

As another example of a remedial measure, the controller 108 may transmit a command or other signal to a clutch or brake device (e.g., 144 of FIG. 6, or see clutches of FIGS. 9-11) for an appropriate/safe function, such as entirely disengaging the clutch or brake device, partially engaging the clutch or brake device (while also actuating the actuator), or fully engaging the clutch or brake device (to "freeze" up the joint). Note that the controller 108 may perform this remedial measure for some or all of the other possible brakes or clutches of some or all of the joint mechanisms of the exoskeleton. Examples of clutches or brakes are provided below regarding FIGS. 6-11.

The controller (e.g., 108, 208) may be configured to execute or perform a remedial measure using a remedial measure module 128 of the controller, which may be based on the selection of the preferred substitute sensor effectuated by the preferred sensor selector module 126 (see e.g., the discussion below regarding FIGS. 7-10).

In some examples, the remedial measure module 128 may provide at least one notification to indicate to the user (and/or to others) of the possibility of a defect or malfunction of the exoskeleton. The at least one notification can be a visual notification, an audible notification, a haptic notification, or any combination of these. For example, the notification can be provided as an audio signal to the user, it can be displayed on a screen visible to the user, it can comprise a vibration of one or more components of the exoskeleton sensed by the user, or others as will be recognized by those skilled in the art. Based on such notification, the user can then discontinue use of the exoskeleton, or return it to a docking station, or actively switch to another control policy.

In another example, instead of, or at the same time as controlling one or more brake or clutch devices, the remedial measure module 128 can ensure that command signals are not transmitted to some or all of the actuators of the joint mechanism 106a-n.

In yet another example, the remedial measure module 128 may cause one or more joint mechanisms to be autonomously actuated to a "safe position", such as a generally upright position of the exoskeleton so that the user can safely step out of the exoskeleton to allow it to be diagnosed and fixed. This is "autonomous" because it is independent of any system that functions to effectuate movement of the exoskeleton based on user control of the exoskeleton (e.g., a contact displacement user actuation system). Thus, the remedial measure module 128 may be configured to ignore or shut off or override the contact displacement system of the exoskeleton, and instead cause autonomous movement of the exoskeleton independent of movement of the user by actuating the joint mechanisms to a pre-defined, safe position. That is, in this mode the user merely "follows" automatic movement of the exoskeleton until it is in a safe location and/or position so that the user can step out of the exoskeleton. This may be useful to allow the user to be safely returned to a docking station, for instance, so that diagnostics/maintenance can be performed on the exoskeleton based on the possible defect or malfunction detected and reported by the controller. The remedial measure module 128 may also control one or more brake or clutch devices once the exoskeleton is autonomously positioned in a desired safety position, and then shut off any command signals to all of the motors of the joint mechanisms to ensure the exoskeleton is not accidentally actuated unsafely.

Figure 6:
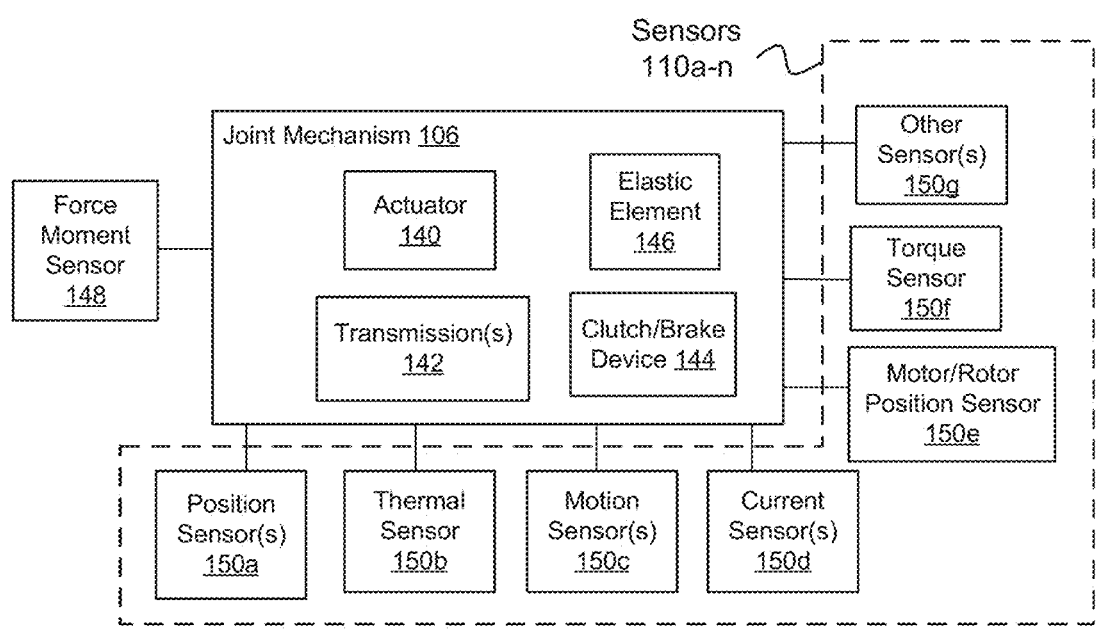
FIG. 6 is a block diagram that illustrates example components included in a joint mechanism of an exoskeleton, in accordance with an example of the present disclosure.
Figure 7:
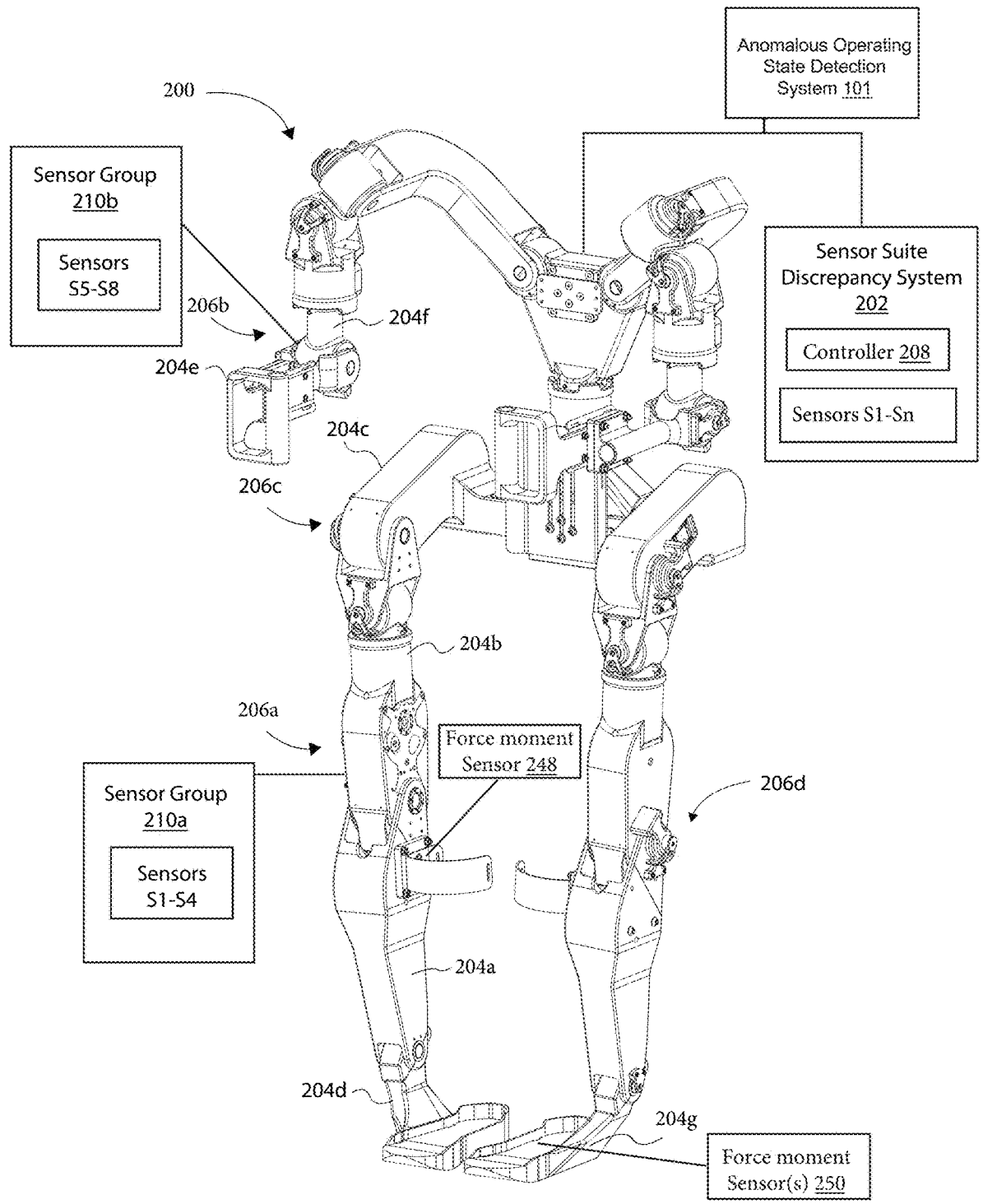
FIG. 7 is an isometric view of an exoskeleton, in accordance with an example of the present disclosure.

In one example illustrated in FIG. 6, a particular joint mechanism 106, such as any one of the joint mechanisms 106a-n, may include some or all of the components shown (see also FIGS. 7-11 for structural features of example joint mechanisms). For instance, the joint mechanism 106 may include an actuator 140, such as a pneumatic, electric, or hydraulic actuator. One or more transmissions 142 may be operatively coupled to the actuator 140, such as gear train(s), belt(s), etc. The joint mechanism 106 may further include a clutch or brake device 144, such as friction disks or plates for restricting or limiting rotation about the joint (which may be a remedial measure, discussed below). The joint mechanism 106 may further comprise an elastic element 146, such as a rotary air spring, torsion spring, or other suitable elastic element operable to store and release energy. Note that a particular joint mechanism may be passive (i.e., not having an actuator), such as a joint mechanism having a clutch or brake device and an elastic element (e.g., FIGS. 8A-10), whereby the clutch or brake device is controllable via the controller 108 to engage or disengage application of the elastic element, and configured to fully "freeze" or brake the joint, in one example of a remedial measure. The joint mechanism 106 can include some or all of the features of the tunable actuator joint modules discussed in U.S. patent application Ser. No. 15/810,108, filed Nov. 12, 2017, which is incorporated by reference herein, and as further exemplified in FIGS. 7-11.

Figure 8A:
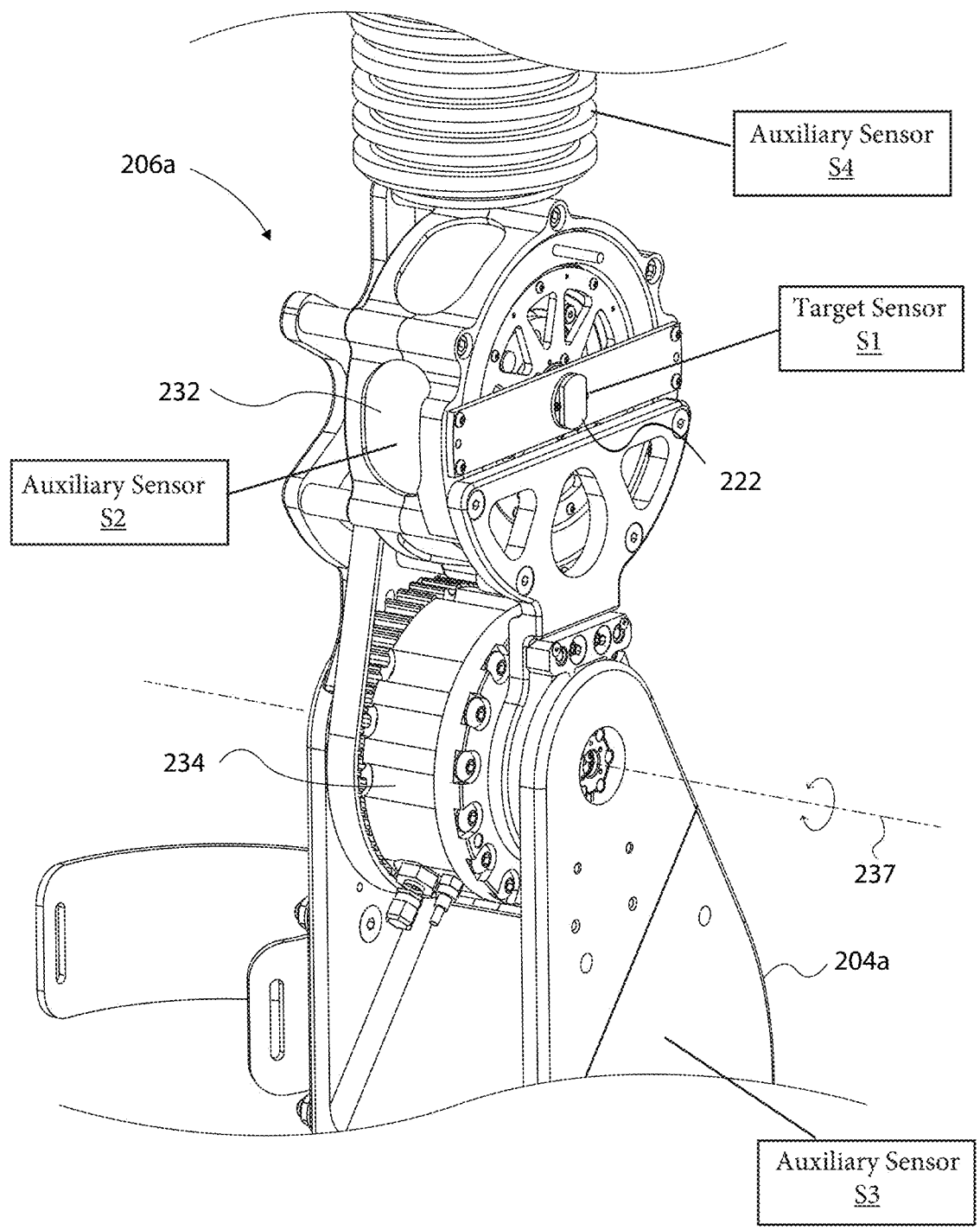
FIG. 8A is an isometric view of a joint mechanism of the exoskeleton of FIG. 7, in accordance with an example of the present disclosure.
Figure 8B:
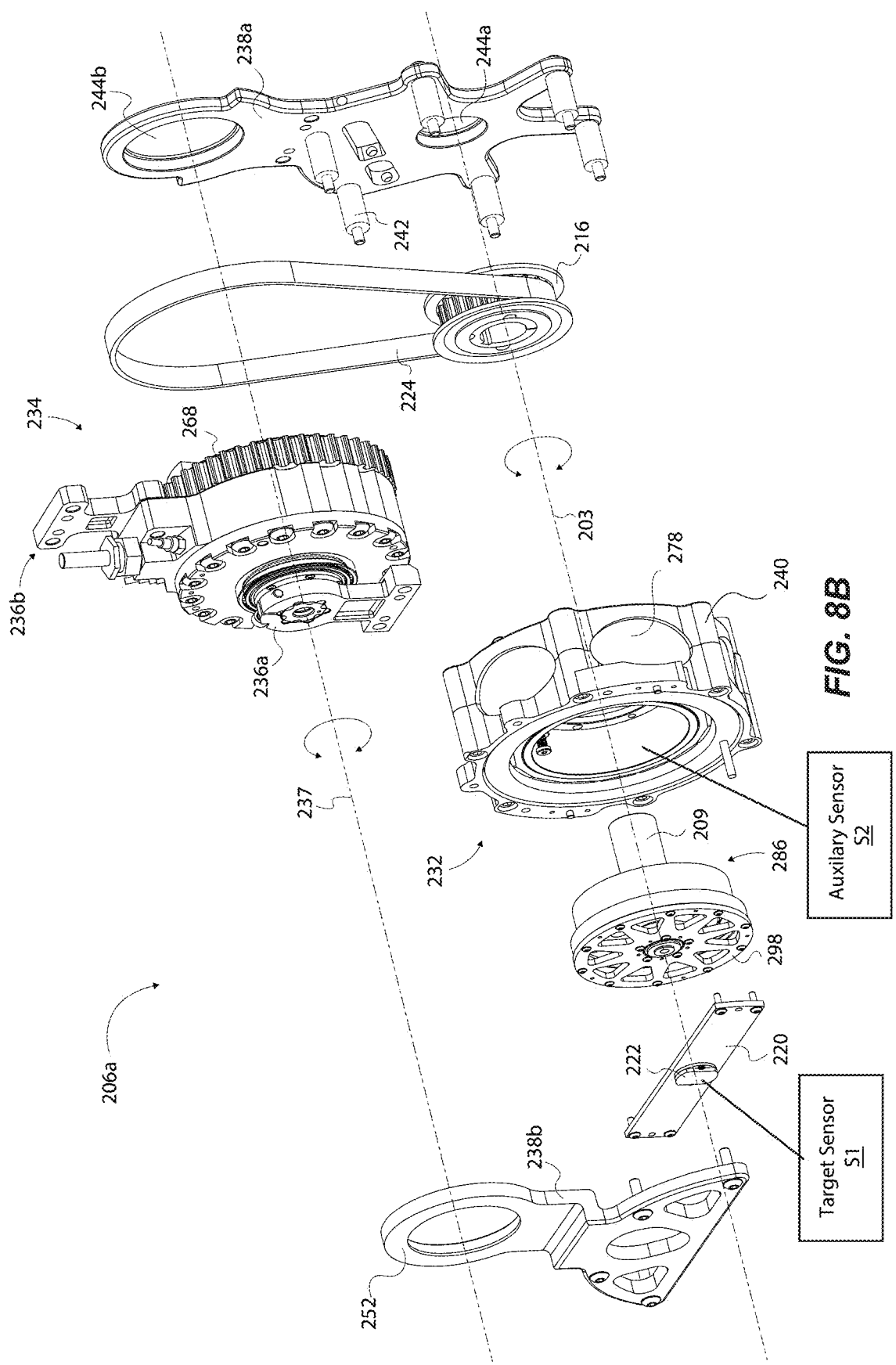
FIG. 8B is a partially exploded view of the joint mechanism of FIG. 7A.

As mentioned above, a force moment sensor 148 may be coupled to a support structure (or strap or other component) adjacent the joint mechanism 106, and positioned to be in contact with a human element of a user wearing the exoskeleton 100, for instance (see e.g., FIGS. 7 and 8A). The force moment sensor 148 may be part of a contact displacement system, in which the sensor 148 transmits output signals to the controller 108 in response to user movement so that the controller 108 can effectively control functions of the joint mechanism 106, as discussed above and further below regarding FIGS. 7-11.

The plurality of sensors 110 may include joint position sensor(s) 150a (e.g., Hall effect sensor), a thermal sensor 150b, motion sensor(s) 150c (e.g., IMUs), current sensor(s) 150d (e.g., phase current sensor), motor rotor position sensor 150e, torque sensor 150f, and/or other sensor(s) 150g. As discussed in U.S. patent application Ser. No. 17/114,460 filed Dec. 7, 2020, which is incorporated by reference herein, and also discussed below, one or more of the sensors 150a-g can be recruited as a substitute sensor in the event of a determined discrepancy between sensor output data of the sensors 150a-g. For instance, see the description of FIGS. 7-11 below for a detailed example regarding recruiting sensors in the event of a discrepancy between sensors to detect a potential malfunction of a sensor or other component so that the controller may take a remedial measure to prevent unsafe operation of the exoskeleton. Accordingly, the command signals referenced in the present disclosure may be generated by the controller 108 based on sensor output data from one or more of the sensors 150a-g that are associated with the joint mechanism 106.

FIG. 6 illustrates an exoskeleton 200 having a sensor discrepancy detection system 202, in accordance with an example of the present disclosure. Note that the exoskeleton 200 can have the same features and functionality as the exoskeleton 100 described above, such as have the anomalous operating state detection system 102 (labeled here as 101, and which can include controller 208 and sensors S1-Sn, similarly as shown and described in the example of FIG. 1). Further note that the exoskeleton 200 can further include the various modules and their functionality as described in FIGS. 4-5B (e.g., malfunction module, anomalous kinematic movement module, remedial measure module). The exoskeleton 200 can comprise a plurality of support structures 204a-n (not all labeled) and a plurality of joint mechanisms 206a-n (not all labeled) rotatably coupling together the support structures 204a-n in accordance with pre-determined desired or required degrees of freedom within the exoskeleton 100 that correspond to the various degrees of freedom of a human operator. As will be appreciated by those skilled in the art, an exoskeleton can be configured in a number of different ways and with a number of degrees of freedom. As such, the exoskeleton configurations described herein, and shown in the drawings are not intended to be limiting in any way. In the example shown, each joint mechanism 206a-n rotatably couples two or more adjacent support structures 204a-n to define a joint rotatable about an axis of rotation that facilitates movement of the exoskeleton 200 in one or more degrees of freedom corresponding to one or more degrees of freedom of a human operator. For instance, the joint mechanism 206a can rotatably couple support structures 204a and 204b, and can be operable to rotate about an axis of rotation associated with knee flexion/extension of the exoskeleton 200 that corresponds to knee flexion/extension of a human operator. The joint mechanism 206a can have an actuator, such as an electromagnetic motor, as part of a drive system for actuating the joint, such as exemplified in FIGS. 8A and 8B and further discussed below.

The exoskeleton 200 and the sensor discrepancy detection system 202 can comprise a suite of sensors S1-Sn configured to generate sensor output data associated with at least one operational function of the exoskeleton 200. The sensors S1-Sn can be coupled to various portions or aspects of the exoskeleton 200, as further exemplified herein, for producing sensor output data transmitted via sensor output signals to a control system or controller 208 of the sensor discrepancy detection system 202 of the exoskeleton 200. In one example, a force moment sensor 248 (e.g., 6-axis load cell) associated with the joint mechanism 206a can be provided as part of a contact displacement system to sense movement of a user to effectuate movement of the exoskeleton 200 that at least partially corresponds to movement in accordance with the degrees of freedom of the user when the exoskeleton 200 is being worn or donned by the user, similarly as discussed above regarding FIGS. 1-5. The force moment sensor 248 can be coupled to the support structure 204a proximate a shin/leg strap of the exoskeleton 200. Note that each joint mechanism 206a-n can include or be associated with a force moment sensor coupled to a portion of the exoskeleton to be in contact with (or proximate) a human element of a user wearing the exoskeleton 200.

Notably, a plurality of sensors S1-S4 of the suite of sensors S1-Sn can be identified as a sensor group 210a associated with the joint mechanism 206a. FIGS. 8A and 8B further illustrate possible sensors S1-S4 and their possible positions on the exoskeleton 200 as being associated with the joint mechanism 206a. Note that the joint mechanism 206a is shown inverted in FIG. 8B. Connections between the various sensors and the controller are omitted to avoid obscuring the invention. However, it will be appreciated by those skilled in the art that suitable wired or wireless connections are provided to communicate sensor data from each sensor to the controller. A suitable power source (not shown) can be provided for powering operations of the exoskeleton. The power source can provide a source of electrical power for electronic components, such as the sensors, the controller, or other components. The power source can comprise a battery, a fuel-based power generator or a tethered connection to an external power source. For exoskeletons that use pneumatic or hydraulic actuators, the exoskeleton can also include a source of pressurized air or hydraulic fluid, as well as associated fluid lines, valves, busses, etc. The power source and the source of pressurized air can be carried on-board the exoskeleton or can be provided from a remote base unit by means of a tether arrangement.

As introduced above, the controller 208 can be configured to determine a discrepancy between sensor output data of two or more sensors of a group of sensors, such as sensors S1-S4 of the sensor group 210a, and can be configured to recruit at least one sensor S1-S4 of the sensor group 210a as a substitute sensor to account or compensate for discrepant sensor output data of one of the sensors S1-S4. For instance, a target sensor S1 can comprise a joint position sensor 222 (e.g., Hall effect sensor of FIG. 8A) that transmits rotational position data via sensor output signals to the controller 208 for processing to facilitate determination of a rotational position of the joint defined by the joint mechanism 206a. As schematically shown in FIGS. 8A and 8B, an auxiliary sensor S2 can be supported by or coupled to the joint mechanism 206a, such as a torque or force sensor, motor rotor position sensor, or other possible auxiliary sensor discussed herein. Another auxiliary sensor S3 can be supported by or coupled to the first support structure 204a, such as an inertial-based motion sensor (e.g., an IMU). An auxiliary sensor S4 can be supported by or coupled to the second support structure 204b, and can comprise a second inertial-based motion sensor, such as an inertial measurement unit (IMU). Note that support structure 204b is hidden from view in FIG. 8A, but see FIG. 7 showing the second support structure 204b that could support the auxiliary sensor S4. Further details of the sensors S1-S4 of the sensor group 210a are further discussed below, following the below details of the joint mechanism 206a.

The joint mechanism 206a can include the same features of the tunable actuator joint module 109a discussed in U.S. patent application Ser. No. 15/810,108, filed Nov. 12, 2017, which is incorporated herein, and also detailed below. More specifically, the joint mechanism 206a can be configured to recover energy during a first gait movement and then release such energy during a second gait movement to apply an augmented torque to rotate the knee joint about the degree of freedom in parallel with a torque applied by a primary actuator of the joint mechanism 206a, similarly as discussed in incorporated U.S. patent application Ser. No. 15/810,108. The joint mechanism 206a comprises a primary actuator 232 and an elastic element, such as a quasi-passive elastic actuator 234, structurally coupled to each other and operable with one another to provide torque to the joint. An input member 236a and an output member 236b (coupled to the quasi-passive elastic actuator 234) can rotate relative to one another about an axis of rotation 237 to achieve a flexion/extension degree of freedom of the exoskeleton 200 corresponding to a degree of freedom of a human joint, namely the flexion/extension of the knee joint. Note that the input and output members 236a and 236b may be the respective first and second support structures 204a and 204b of FIG. 7, but are shown in FIG. 8B as generic members coupled to the input and output of the joint mechanism 206a for purposes of illustration.

The primary actuator 232 (e.g., a geared electric motor) is operable to apply a torque to the output member 236b for rotation about the axis of rotation 237, and the quasi-passive elastic actuator 234 (e.g., a rotary pneumatic actuator) is selectively operable to generate a braking force, or to apply an augmented torque to the output member 236b along with the torque applied by the primary actuator 232 to actuate the joint, such as during a certain portion of a gait movement. As further discussed in incorporated U.S. patent application Ser. No. 15/810,108, the quasi-passive elastic actuator 234 is operable or controllable by a control system (e.g., a valve assembly) to selectively store energy or to selectively generate a braking force (in an elastic state or a semi-elastic state) upon a first rotation of the input member 236a, and to selectively release that energy (while still in the elastic or semi-elastic state) during a second or subsequent rotation of the input member 236a. Such functionality may be effectuated by the controller 208 in concert with the valve assembly.

With respect to the elastic state of the quasi-passive actuator 234 as it operates to store and release energy, in one aspect, the first rotation of the input member 236a can be achieved via active actuation of the primary actuator to actuate the tunable joint module and to cause rotation of the joint module (and any structural supports coupled thereto). In another aspect, the first rotation of the input member 236a can be achieved passively, namely by exploiting any available gravitational forces or external forces acting on the robotic system suitable to effectuate rotation of the input member 236b within the tunable actuator joint module (e.g., such as a lower exoskeleton being caused to perform a sitting or crouching motion, which therefore affects rotation of the various tunable joint modules in the exoskeleton). The exploiting of such gravitational forces by the quasi-passive actuator in parallel with a primary actuator provides the tunable joint module with compliant gravity compensation. Once the energy is stored, it can be released in the form of an augmented torque to the output member 236b, or it can be used to brake or restrict further rotation.

The quasi-passive elastic actuator 234 can further be configured, upon a third or subsequent rotation(s), to neither store nor release energy, the quasi-passive elastic actuator 234 being caused to enter an inelastic state. In this inelastic state, the input and output members 236a and 236b are caused to enter a "free swing" mode relative to each other, meaning that negligible resistance exists about the quasi-passive elastic actuator 234 (this is so that the actuator 234 does not exhibit a joint stiffness value that would restrict rotation of the input member 236a relative to the output member 236b, such as would be desired during a leg swing phase of a gait cycle of the robotic device). In this manner, the quasi-passive elastic actuator 234 is switchable between the elastic state and the inelastic state, such that the quasi-passive elastic actuator 234 applies an augmented toque (in the elastic state) in parallel with a torque applied by the primary actuator 234. This combined torque functions to rotate the output member 236b relative to the input member 236a in a more efficient manner as less torque is required by the primary actuator to perform the specific gait phase, thereby reducing the power requirements/demands of the primary actuator 234, as further detailed below.

As further illustrated in FIG. 8B, the quasi-passive elastic actuator 234 can be structurally mounted to the primary actuator 232 by a first mounting plate 238a and a second mounting plate 238b, each positioned on either side so as to constrain the primary actuator 232 and the quasi-passive elastic actuator 234 234 in a "sandwich" state. The first mounting plate 238a is mounted to a housing mount 240 of the primary actuator 232 via a plurality of fasteners 242 (with spacers there between). The first mounting plate 238a comprises a primary aperture 244a that rotatably supports a collar bearing of the primary actuator 232, and comprises a secondary aperture 244b that rotatably receives a collar bearing supported by the quasi-passive elastic actuator 234.

The primary actuator 232 can comprise a housing mount 240 to house and structurally support the primary actuator 232. The primary actuator 232 comprises a motor 278, such as a high-performance Permanent Magnet Brushless DC motor (PM-BLDC). The motor described above and shown in the drawings is not intended to be limiting in any way. Indeed, other motors suitable for use within the primary actuator 232 are contemplated herein, as are various other types of actuators, such as hydraulic actuators. The motor 278 can comprise a central void that receives a gear train or transmission, such as a planetary transmission 286. A rotatable transfer wheel 298 can be fastened to the rotor of the motor 278 to transfer rotation from the rotor of the motor 278 to a sun gear of the transmission 286 about the axis of rotation 203. Upon applying an electric field to the motor 278 (i.e., from the controller 208), the rotor rotates about axis 203, which causes the transfer wheel 298 to rotate, which thereby causes the sun gear to rotate, which causes an output shaft 209 to rotate primary pulley 216. The primary pulley 216 is rotatably coupled to a transmission belt 224, which is rotatably coupled to a gear ring 268 that ultimately causes rotation of the joint via a vane device coupled to the output member 236a (see U.S. patent application Ser. No. 15/810,108 incorporated herein for further details on the vane device and valve assembly).

In one example, a sensor plate 220 can be fastened to an outer side of the housing 240, and has an aperture that supports the position sensor 222 (i.e., target sensor S1, in this example). The position sensor 222 is adjacent the transfer wheel 298, which has an aperture through to the sun gear (of the transmission 286) that facilitates the position sensor 222 to determine the rotational position of the sun gear. The sensor output data produced by the position sensor 222 can be transmitted via an output signal to the controller 208 for processing to determine the rotational position of the joint. The position sensor 222 can be any suitable sensor, such as a 13-bit Hall effect sensor, magnetic encoder, optical encoder, resolver, potentiometer, etc. It should be appreciated by those having skill in the art that the type of joint position sensor used may dictate the possible location on the joint mechanism that such sensor is mounted to. As discussed above, the particular rotational position of the knee joint mechanism is relevant for determining and controlling actuation of the joint via control of the motor 278 based on the contact displacement system.

The motor 278 can comprise a stator and rotor rotatable relative to each other (in a typical fashion for commercially available frameless brushless motors), and the auxiliary sensor S2, such as a motor rotor position sensor, can be operably coupled to or proximate to the motor 278 for producing sensor output data associated with a rotational position of the rotor relative to the stator. For instance, based on the sensed rotational position of the rotor using the auxiliary sensor S2, the controller 208 can execute a transformation calculation that transforms the sensor output data from the sensor S2 into a format or value that can be an estimate of the rotational position of the joint defined by the joint mechanism 206a (in the event the target sensor S1 provides data that "fails" testing processes, as exemplified below). Such transformation of the sensor output data associated with the auxiliary sensor S2 can produce "transformed sensor output data" that can be compared against the sensor output data of the target sensor S1. Such calculation may need to take into consideration the gear reduction provided by a transmission (e.g., planetary transmission 286, and/or belt 224). For instance, if a particular transmission provides a 40:1 gear reduction from the output of the motor, then the position recorded at the motor is merely divided by a factor of 40 when calculating the transformed sensor output data. Such calculation may also need to take into consideration the torque being applied by the motor in instances where a compliant transmission is used, such as a transmission (e.g., a belt) having an elastic element with a particular stiffness value (K value), because a certain amount of stretch or elasticity would need taken into consideration when calculating the position of the joint using force and torque values (i.e., F=Kx). Other transmissions or couplers may have a particular stiffness value that may need taken into consideration when determining such joint position. For example, in the case where the transmission mechanism has a stiffness value of K and the transmission gear reduction is N:1, the joint position, $\theta_J$ can be estimated using rotor position, $\theta_M$ as: $\theta_J = \theta_M/N \pm T_J/K$ where the sign of the joint position correction due to the application of a non-zero torque to a compliant joint depends on the joint position sign convention.

The data provided by the rotor position sensor can be used: (1) to control the commutation of the motor phases, and (2) for closed-loop position/velocity control of the rotor in control policies such as software stop limits, for instance. If a rotor position sensor malfunctions, it can render the motor unusable as a power source, or it may generate random commutations sequences, or it may make the joint simply unresponsive. Note that, if the problem is detected, the motor can still be used as a controlled passive brake, for instance.

As noted above, the rotor position sensor can be used as an auxiliary sensor to a target sensor (e.g., joint position sensor). Inversely, the rotor position sensor can be considered as "a target sensor", and other sensors can be considered as "auxiliary sensors" that act as a "back-up" or substitute sensor if the rotor position sensor is malfunctioning. For instance, a joint position sensor can be used as an auxiliary sensor to the rotor position sensor being the target sensor.

Note that the relation between rotor position and joint position depends on multiple parameters including: (1) transmission ratio; (2) transmission compliance; (3) backlash; (4) transmission internal friction; (5) transmission non-linearities and position dependent systematic error (e.g. periodic position error observed in harmonic drive gears); and (6) other parameters. This said, a good estimate of the joint position $\theta_J$ could be computed using an equation of the form: $\theta_J = f_{tr}(\theta_M, T_J, T_M, \theta_M)$, where $f_{tr}$ is a function that encapsulate the characteristics of the transmission, including but not limited to: gear ratio (NGR), compliance, friction, backlash, periodic systematic error (e.g. cyclic error observed in Harmonic Drive transmissions), to list the most important, $\theta_M$, is to rotor position, $T_J$, is the joint torque (the torque applied by the transmission to the joint, and as a rule it may be the total joint torque minus the torque contributed by the elastic element coupled to the output joint), $T_M$, is the rotor (motor torque) and $\theta_M$ is the rotor speed (also referred to as $W_M$).

The structure and operation of a motor rotor position sensor is well known in the art, and therefore will not be discussed in great detail. However, note that the motor rotor position sensor has a primary sensing functionality of producing data associated with the rotational position of the rotor relative to the stator (or other component), which is different than the primary sensing functionality of the target sensor S1, for instance. Nonetheless, the motor rotor position sensor, as an auxiliary sensor to the target sensor, can generate sensor output data that can be transformed by the sensor suite discrepancy detection system 202 for purposes of allowing the motor rotor position sensor to function as a possible substitute sensor for the target sensor.

In one example, the controller 208 may include available software libraries tailored for "sensorless" control of the motor (i.e., rotor position state estimator) to measure the rotor position of the motor. The implementation of a rotor position state estimator could: provide the means for an actuator to continue operating in the event of a malfunction of the rotor position sensor where the rotor position sensor is relied upon as a complimentary sensor to the joint position sensor; allow joint position to be estimated by taking into account characteristics of a transmission (e.g., the transmission(s) discussed herein); allow rotor speed to be computed and used on one mechanism to determine if the primary joint position and rotor position sensors are working properly; and as a by-product of the state estimation algorithm to provide an estimate of the motor phase resistance, which, in turn, could be used to estimate motor coil temperature. Thus, the use of state estimator algorithms and software for sensorless motor control can serve as another "back-up" mechanism for a joint position sensor if it is defective or malfunctioning, thereby providing sensor redundancy.

In another example, another possible auxiliary sensor (of the sensor group 210a) can comprise a torque sensor operatively coupled to one or more components of the joint mechanism 206a in a suitable manner for producing sensor output data associated with a torque applied to the joint by the motor. For instance, a joint torque sensor can be coupled to the shaft 209, or to the sun gear of the transmission 286, or at or near the input or output members of the joint mechanism 206a, or to any other rotational component that generates or experiences a torque of the exoskeleton for purposes of sensing torque. Thus, the primary sensing functionality of the torque sensor is to produce data regarding a torque value generated or experienced by a component of the joint mechanism 206a to appropriated close the loop on a torque command, such as in the case of its use with a force moment sensor (e.g., a 6-axis load cell) as part of a contact displacement system, as mentioned above. Note that the same or additional torque sensor(s) may also be used for gravity compensation purposes of the exoskeleton itself, and also during tasks such as acquiring and lifting a load. A joint torque sensor may also be used to control the compliance and/or impedance characteristics of a joint, and/or to allow a joint to respond in a preset way to external forces applied to the exoskeleton. However, as noted above, in the event the target sensor S1 (e.g., position sensor 222) "fails", sensor output data produced by the torque sensor can be combined with information from other sensors such as a pair of IMUs installed on adjacent structural members rotatably couple to form a joint and can be transformed and used to estimate the rotational position of the joint, wherein the torque sensor and complementary sensors used together operate as a possible substitute sensors for the target sensor S1, as further exemplified herein.

Each joint mechanism can include a joint torque sensor that is used a means to implement closed-loop joint level torque control, such as for control policies that include contact displacement, payload compensation, and gravity compensation, for instance. If a torque sensor malfunctions, this can result in a joint mechanism that improperly responds, or possible loses control due to large, unwanted torque commands being generated and executed by actuators of the joint mechanisms (and the controller may need to execute a remedial measure to prevent unsafe operation, as discussed above). Thus, appropriately sensing or estimating joint torque is a safety-critical operation for safe operation of the exoskeleton. Similar to the description above, in one example the joint torque sensor can be considered a target" sensor, while other sensors can be considered "auxiliary sensors" that are used to estimate joint torque in the event that the joint torque sensor malfunctions. For instance, the total torque applied at a particular joint can be estimated by using (1) the magnetic flux versus rotor angle (which is a parameter that may be characterized independently and measured current flowing in three phases of the motor to estimate electromagnetic torque generated by the motor), (2) measured and/or estimated contribution from the brake and/or elastic element operating in parallel with the (geared) motor, and (3) model of the transmission, including friction, backlash, and other non-linearities.

Note that a number of other auxiliary sensors can be included within the sensor group 210a as associated with the joint mechanism 206a, and coupled to or about various components of the joint mechanism 206a, as also discussed above regarding FIG. 5. For instance, a temperature or thermal sensor can be coupled to the motor 278 for sensing a temperature of the motor coils, which can be used by the controller 108, 208 to prevent motor coils from being damaged as a result of overheating. A suitable thermal sensor may be a resistance temperature sensor (RDT), a thermocouple sensor, etc., which can be coupled at or near a coil of the motor 278, or to the housing 240, or even to a battery pack of the exoskeleton. The operating temperature of the motor 278 can be determined by measuring the electrical resistance of the motor coils, taking advantage of the fact that the resistance of the coils increases in a deterministic way as their temperature increases. This is monitored because if the temperature sensor is not responding, the sensed resistance can be used instead of the temperature sensor. This can be important for safe operation of the motor, because if it is running at temperatures above those that are normal (i.e., "too hot") this can be an indication of a problem with the joint mechanism 206a and could result in damages to a motor that in turn con render a motor (or a joint actuator) unusable, so that the controller 208 can function to operate the exoskeleton in a safety mode, such as shutting off power to the motor and engaging a clutch or brake, and/or limiting the maximum torque that a motor can produce, thereby reducing heat generated due to Joule heating (i.e. resistive heating) of the motor coils.

As also noted above, auxiliary sensors such as one or more inertial-based motion sensors can be coupled to the joint mechanism 206a and/or to the support structures 204a and 204b rotatably coupled together by the joint mechanism 206a (or another support structure of the exoskeleton 200). For instance, motion sensors such as single axis or multi axis accelerometers, gyroscopes, magnetometers, IMUs, etc. can be utilized as auxiliary sensors that have a primary sensing functionality of sensing position, velocity, and/or motion of relevant support structures of the exoskeleton, but that can be recruited by the controller 208 to estimate a rotational position of the joint upon transformation of their sensor data. For instance, based on the sensed spatial orientation of the first support structure 204a (as sensed by the IMU auxiliary sensor S3), and based on the sensed spatial orientation of the second support structure 204b (as sensed by the IMU auxiliary sensor S4), the controller 208 can determine the rotational position of the joint defined by the joint mechanism 206a. More specifically, each IMU measures its orientation and that of the structural member to which it is coupled, so the controller can monitor and measure the change in the orientation for each IMU from the prior orientation to determine the rotational position of a joint (e.g., 206a) situated between a pair of adjacent IMUs (e.g., one IMU, S3) on support structure 204a and the other IMU, S4 on support structure 204b). One method to calculate joint position from a pair of IMUs can include a 4D quaternion method (a 4-tuple that is a concise representation of rotations) calculated based on the data collected by each IMU. Specifically, the unit magnitude quaternion $q_{S3,S4} = q_{S3}^* \otimes q_{S4}$, describes the joint angle and the direction of the joint axis of rotation, and where $\otimes$ is the quaternion multiplication, $q_{S3}^*$ is the conjugate of the unit magnitude quaternion generated from data from IMU S3, and $q_{S4}$ The joint angle $\alpha_j = (\alpha - \alpha_0)$, can be calculated from the real part of the quaternion for the joint, $q_{S3,S4}$, using the formula $$\cos\left(\frac{\alpha}{2}\right) = \text{Real}(q_{S3,S4}),$$

and where, $\alpha_o$ is a constant that depends on the convention used to define the zero angle of the joint. The inverse can be appreciated in a similar manner, namely that a group of position sensors can be used in the determination whether one or more IMUs is defective or faulty. For instance, data generated a joint position sensor on joint mechanism 206a and a joint position sensor on joint mechanism 206c can be used by the controller to "check" whether an IMU (i.e., on the support structure linking such joint mechanisms) is accurately calculating its orientation (represented as a quaternion, as Euler angles, as a rotation matrix, or other representation of rotation and orientation) or is faulty.

Such calculation or transformation of the sensor output data associated with the auxiliary sensors S3 and S4 can generate "transformed sensor output data" that can be compared against the sensor output data of the target sensor S1, for purposes of estimating joint rotational position. Note that such calculation may need to take into consideration the kinematic makeup or construction of the exoskeleton, including the distance and spatial position of the IMUs relative to the axis of rotation 237 of the joint mechanism 206a for knee rotation, for instance. The structure and functionality of motion sensors, such as IMUs, is well known, and therefore will not be discussed in great detail herein. Those having skill in the art can readily appreciate the incorporation of one or multiple inertial-based motion sensor(s) with an exoskeleton, and the well-known operations for receiving and processing data produced by motion sensors.

Note that other IMUs (i.e., those which can be considered as auxiliary sensors of other pre-determined or defined sensor groups) of the exoskeleton that are supported on other support structures (e.g., other than 204a and 204b) can be used to determine or estimate joint rotation position of one or more joints. For instance, an IMU supported by support structure 204c, with its sensor output data transformed, can be used along with joint position sensors on the robot hip, knee, and ankle joints to "simulate" the output of a possibly defective IMU (e.g., auxiliary sensor S3) supported by the support structure 204a. This is merely one example of using other sensor(s) as substitutes for a possible faulty sensor. Thus, it should be appreciated that sensors supported away from (i.e., not necessarily directly associated with) any one specific joint or joint mechanism can be used, such as an IMU supported by a support structure that is not directly coupled to the joint mechanism in question.

Further to this concept, in one example, all of the IMUs of the exoskeleton can be used to map the exoskeleton, along with the joint position sensors (e.g., 222) of each joint mechanism, to determine if one or more of the IMUs is faulty so that the faulty IMU can be discarded and not used by the controller. Based on a frame of reference of the kinematics of the exoskeleton, and in the event a particular IMU does not "agree" with other IMUs, for instance, this may indicate a defect or malfunction with the particular IMU, so that data produced by this IMU can be ignored or not used in processing operations and for control of the exoskeleton, such as one or more joint mechanisms of the exoskeleton. A similar principle applies for other groups of the same sensor, such as a group of joint position sensors associated with a limb of the exoskeleton. More specifically, a consecutive number of joint position sensors associated with flexion/extension of the respective wrist, elbow, and shoulder joints of a limb may be utilized to determine whether one of the joint position sensors (or another sensor) is faulty or defective by comparing the sensor output data of such sensors against each other. This is because, based on the known geometry of the exoskeleton arm, the controller can discern the expected torque at an elbow joint (flex/extend) based on the sensed torque of the shoulder joint (flex/extend), and perhaps based on the sensed position of the shoulder and elbow joints. Thus, if the expected torque at the elbow joint is much greater or lower than the value the torque sensor is actually outputting, then the controller may determine that the torque sensor at the elbow joint is faulty or defective. This is merely one non-limiting example of how a group of sensors can be used in combination by the controller to indicate whether one or more sensors is faulty.

In another example, a possible auxiliary sensor of the sensor group 210a can comprise one or more current sensors, such as one or more total current sensors, which can be included for generating data associated with a transmitted current to the motor (or other type of actuator). The current sensors can be supported at or near a battery pack of the exoskeleton, and/or at network bus branches of the controller 208. Another type of current sensor includes a motor phase current sensor, such as a sensing resistor, Hall effect sensor, etc., which can be used to generate data associated with the phase current transmitted to the motor during commutation of the motor. Therefore, in one exemplary embodiment, the data generated by a motor phase current sensor can be used to approximate joint torque by allowing the controller to estimate the electromagnetic torque, $T_M$, produced by the motor as $T_M=K_T(\theta_M)*I_{ph}$, where, $K_T(\theta_M)$ is the motor torque constant at rotor position, $\theta_M$ and $I_{ph}$, is the phase current, or using another observer for the electromagnetic torque produced by the electric motor, and also by taking into account, as needed to achieve the desired level of accuracy, the characteristics of the transmission (gear ratio N, friction, backlash, and other parameters that may be used to describe the characteristics transmission). More specifically, if the output of the torque sensor "disagrees" with the motor phase current sensor, the controller can conclude that the torque sensor has failed. Alternatively, the controller 208 can switch from one control policy (e.g., based on a contact displacement system) to another control policy (e.g., admittance control) as one example of a remedial measure, whereby the admittance control policy may not rely on joint torque sensors for control, but can rather rely on joint position sensor to determine or estimate rotational joint position. The controller 208 may instead switch to a third control policy of a plurality of control policies that are available and running in the background concurrently. The "switching" between control policies (as a remedial measure) is further described in U.S. patent application Ser. No. 17/114,458, filed on Dec. 7, 2020, which is incorporated herein by reference in its entirety.

In one example, a motor phase current sensor, used to measure phase current to an electric motor of the joint mechanism, can be considered a "target sensor" in that auxiliary sensors can be used as "back-up" in the event of a malfunction of the motor phase current sensor (such malfunction can cause an incorrect torque value to be produced by the motor). More specifically, because phase currents (i.e., three phase current sensors) need to sum up to zero when the motor is spinning, the controller can constantly calculate the phase current sum and ensure it is zero. When the data from the three phase current sensor do not sum to zero, the controller can analyze the phase/amplitude relationships of the three phases to determine with of the three sensors failed. That failed sensor can then be ignored, because the missing phase current could be calculated by calculating the value that is necessary to sum the two correct phase currents to zero. In another example of a state estimator designed to allow the motor torque to be controlled by controlling phase voltage, thereby bypassing, in the process, the need for phase current sensing.

As indicated above, the structure and functionality of inertial-based motion sensors, such as IMUs, is well known, and therefore will not be discussed in great detail herein. Those having skill in the art can readily appreciate the incorporation of a motion sensor with an exoskeleton, and the well-known operations for receiving and processing data produced by motion sensors.

In yet another example, one or more auxiliary sensors (and also possible target sensors) may include voltage sensors and current sensors. For instance, a voltage to RT and electronic bus sensor (i.e., a target sensor) provides voltage measurement for high-power branch sensors to supplement the current information load. If this sensor malfunction, data from a high-power branch sensor can be compared against RT controller's voltage sensor.

In another example, a battery module current primary sensor (i.e., a target sensor) provides current measurement for a battery module to control the amount of power delivered by the battery and the rate of charging. A comparison between the battery management controller and the high-power branch sensors could detect a malfunctioning sensor in the battery module when the battery is discharging. When the battery is being charged, the battery current can be compared with the charger current. A malfunctioning sensor could wrongly turn off the batter, fail to isolate a short, or act slowly in protecting the battery during power delivery or charging. In this manner, a battery shutting off during a loaded robotic task could become a safety hazard, so proper battery current sensing is needed for safe operation of the exoskeleton. As an "auxiliary sensor" in this example, the charger current/sum of limb current value can be used to estimate the current of the battery module.

In another example, if a battery module voltage sensor is malfunctioning, the control power voltage or limb power voltage can be used to estimate the voltage of the battery module.

Both at the joint level and the controller level, joint speed plays a key role in control policies for controlling the joint mechanisms of the exoskeleton. In one example, joint speed of a particular joint can be computed by numerically differentiating data provided by the joint position sensor (e.g., a target sensor) associated with the joint. In another example, joint speed can be computed numerically by using rotor position sensor data, as further detailed below. Regardless of how joint speed is computed for a particular joint, it may have an impact on particular control policies, including at the joint level using recurrence controller policies where joint speed is used to control stability of the joint mechanism. It may also include a control policy associated with software limit stops algorithms where damping uses joint speed as an input parameter. It may also include a control policy associated with damping and stopping a joint when a "large command" is generated for controlling the joint that may otherwise cause the exoskeleton to collide with the operator, surrounding bystanders, and/or objects in the area. It may also include a control policy by the high-level controller safety processes, such as when mapping trajectory of end-points (e.g., end effectors) and create software defined exclusion zones. In any scenario, fault or malfunction or computational error of joint speed by the controller may reveal a problem with the target sensor used to computed joint speed, which may result in an unsafe operation or movement of the exoskeleton that the controller may need to remedy prior to executing the unsafe movement, such as described above in the example of FIGS. 1-6.

More particularly, in one example joint speed can be computed using an auxiliary sensor, such as a rotor position sensor that provides rotor speed information $\theta_M$ along with characteristics of the transmission. The speed of the rotor can be calculated by comparing differing rotor positions over time, which may be 15 to 120 times larger than that of the speed of the joint; this depends on the transmission ratio of a transmission of a particular joint mechanism.

In another example, the IMUs (e.g., as auxiliary sensors) can be used as a means to convert the exoskeleton into a full body motion capture device to compute joint speed of one or more joints (in the event of malfunction of one or more target sensors, such as joint position sensors). To estimate individual joint speed, the data needed would include either (1) data from IMUs located on adjacent support structures (as also discussed above), or (2) IMU data on other nearby support structures (i.e., not adjacent IMUs), along with position sensor data and kinematics information required to compute angular speed of the two support structures about the axis of rotation of the joint of interest. Because some IMUs are sampled at 250 samples/second, if the IMU data from adjacent support structures is available to each link controller, joint speed computation using IMUs could be performed at the level of the joint controllers (i.e., using firmware running on individual link controllers) and the result (i.e., joint speed) can be used, not only as part of a control policy of the central controller, but also as part of the joint level control. Additionally, computing joint speed using IMU data at the level of the local controllers on each joint mechanism allows comparison of data obtained from the target sensor (e.g., joint position sensor) and auxiliary sensors, and selection of an alternative sensor in the event of malfunction of the target sensor, which is performed at the local controller level of each joint mechanism.

Similarly, rotor speed can be calculated and used as a part of joint level control policies in which computed damping or software stops are applied directly to the rotor by controlling the rotor. Rotor speed can be computed by numerically differentiating rotor position sensor data, which may provide a higher quality signal for joint speed than that obtained from the joint position sensor. Joint position sensor, along with characteristics of the transmission, can be implemented as an "auxiliary sensor" that can estimate rotor speed. Similarly, as discussed above, the controller 208 may include available software libraries tailored to "sensorless" control of the motor (i.e., rotor speed state estimator) to measure the rotor speed of the motor. Thus, the use of state estimator algorithms and software for sensorless motor control can serve as another "back-up" mechanism for a rotor position sensor if it is defective or malfunctioning, and thereby providing sensor redundancy.

Referring back to FIG. 7, the exoskeleton 200 may include one or more force moment sensors 250, such as 8-strain gauge bridges, supported about a foot support structure 204g of the exoskeleton for determining a force moment associated with movement of the user's leg for controlling one or more joint mechanisms of the leg of the exoskeleton 200. The controller 208 can detect whether any of these strain gauge bridges is faulty by the use of a shunt calibration operation (i.e., shorting one of the bridges to obtain a reading equivalent to loading the force moment sensor) to determine if one or more bridges is faulty, or even a structural component of the force moment sensor itself. Based on the detection of any faulty strain gauge bridges, the controller 208 may be configured to control one or more joint mechanisms by utilizing at least 6 of the bridges of the force moment sensor. This is another example of redundancy because for some key axis (such as the force normal to the sole of the foot) the information sensed by the force-moment sensor (e.g. by measuring the strain experienced by structural members of the force-moment sensor as a function of load applied to the sensor) is readily redundant (i.e. the sensor is equipped with more strain sensing devices than the minimum needed to measure the force-moments) and part of this information is not necessary to estimate the force-moments applied by the operator to the exoskeleton.

In one example, the exoskeleton can include one or more ground contact sensors to measure one or more interaction force moments between the foot and/or hands and the ground and/or object. The ground contact sensors can be embedded between the sole and the base of the foot of the exoskeleton, for instance (and similarly regarding the hands of the exoskeleton). Data produced by the ground contact sensors can act as a complementary manner to detect when a load supported by the feet is low, for instance. This information can be fused with that provided by the force moment sensors on the feet in order to modulate control parameters. This can be a safety feature in terms of the controller knowing whether or not the feet of the exoskeleton make contact with the ground or leave the ground, which provides a level of redundancy for the other sensors of the exoskeleton in terms of the interaction forces, etc.

Figure 9:
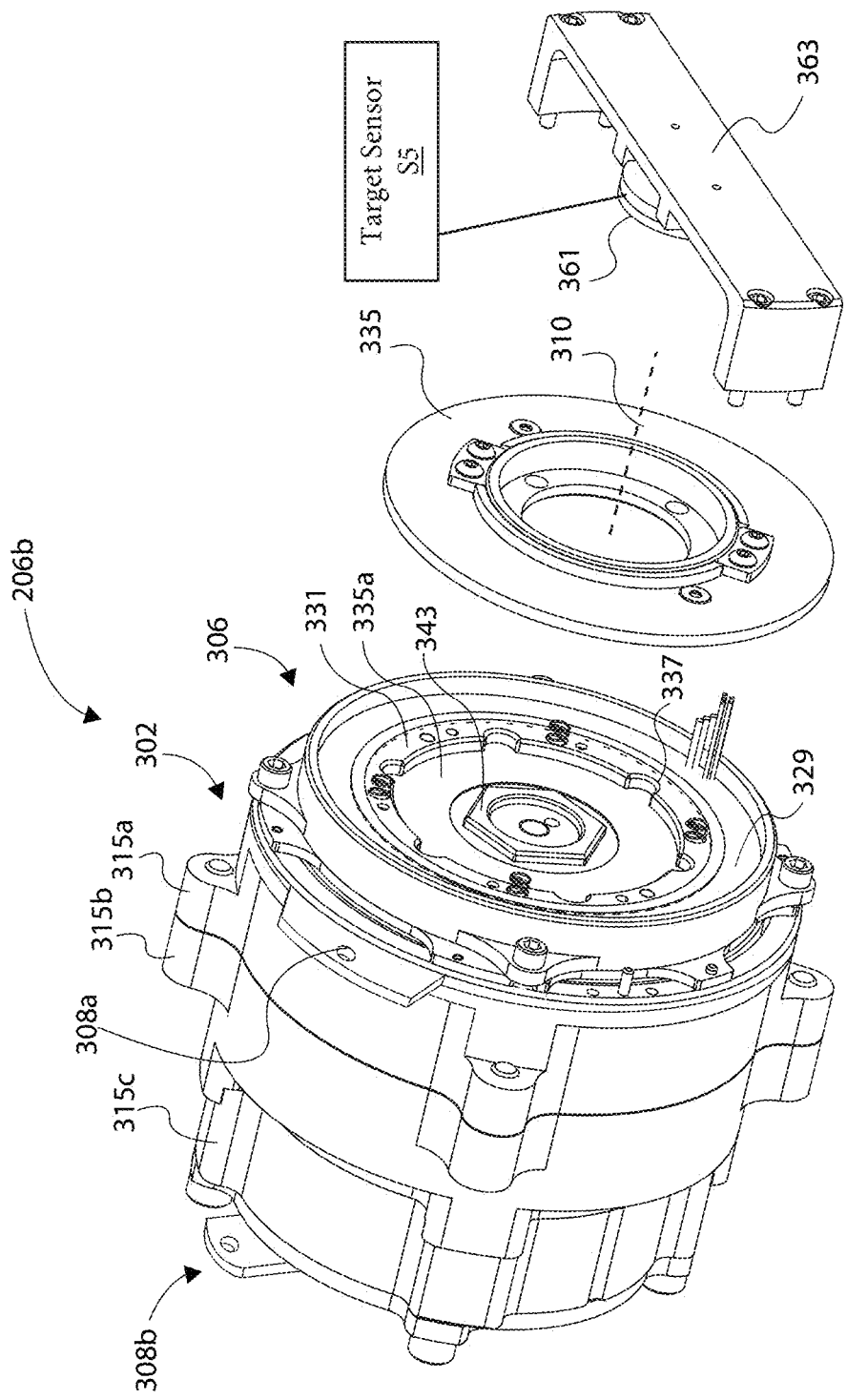
FIG. 9 is a partially exploded view of a joint mechanism of the exoskeleton of FIG. 7, in accordance with an example of the present disclosure.
Figure 10:
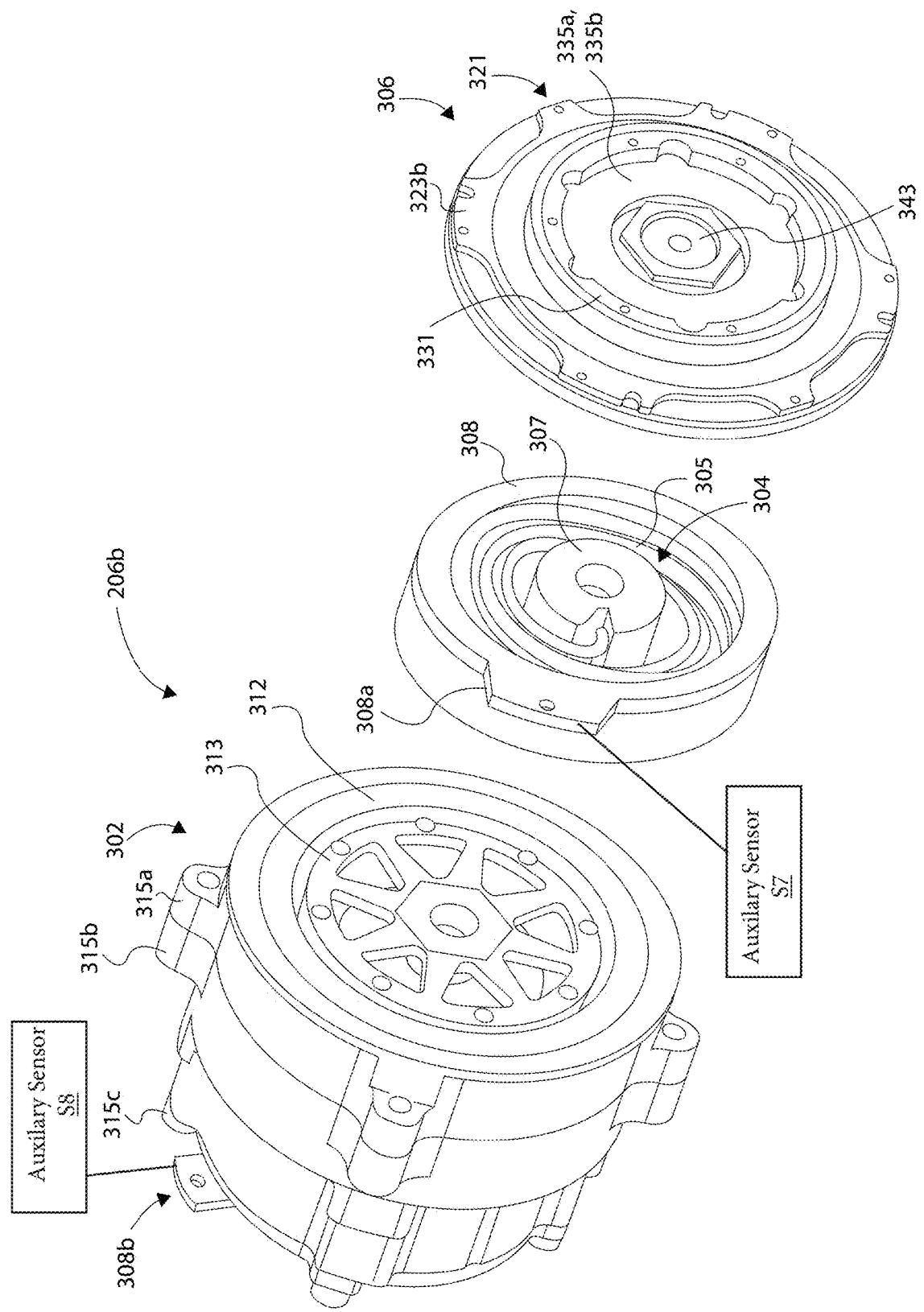
FIG. 10 is a partially exploded view of the joint mechanism of FIG. 9.
Figure 11:
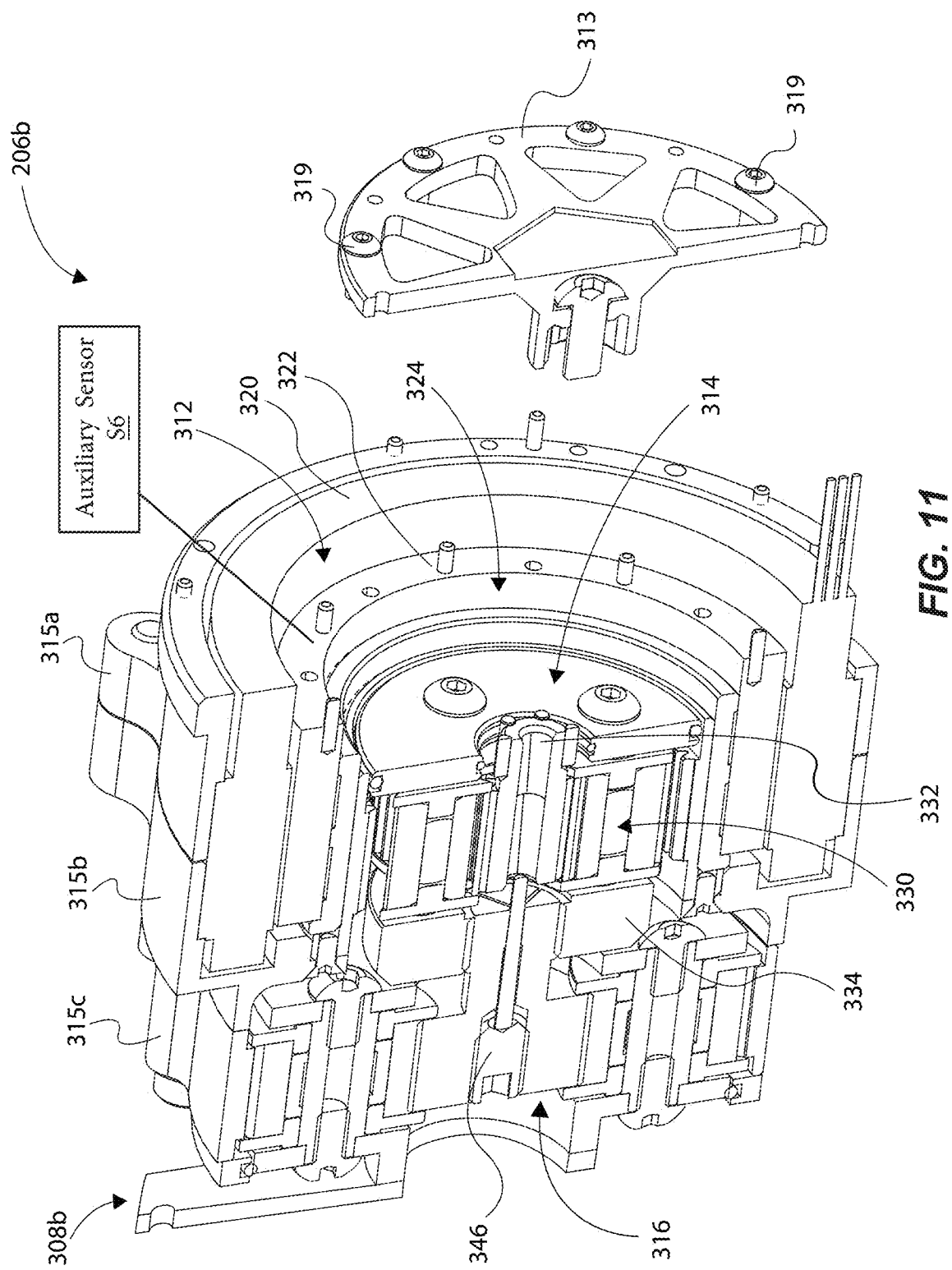
FIG. 11 is a cross sectional view exploded view of a portion of the joint mechanism of FIG. 9.

FIGS. 9-11 illustrate further details of the joint mechanism 206b introduced regarding the exoskeleton of FIG. 7, in accordance with an example of the present disclosure. Thus, again with reference to FIG. 7, the suite of sensors S1-Sn can include a plurality of sensors S5-S8 identified as a sensor group 210b associated with the joint mechanism 206a. As an overview, sensor S5 can comprise a joint position sensor 361, as shown and discussed in FIG. 9 indicated as a target sensor S5. FIG. 11 schematically illustrates auxiliary sensor S6 that can be a motor rotor position sensor, as detailed below. FIG. 10 schematically illustrates sensors S7 and S8 that can comprise auxiliary sensors that can be IMUs supported by respective support structures 204e and 204f (FIG. 7). Note that sensors S7 and S8 are schematically illustrated as being associated with respective input and output members 308a and 308b, but it will be appreciated that such sensors S7 and S8 can be supported by the support structures 204e and 204f coupled to the input and output of the joint mechanism 206b. The sensor group 210b will be further discussed below, following a description of the joint mechanism 206b.

The joint mechanism 206b can include the same features of the clutched joint module 300 discussed in U.S. patent application Ser. No. 15/810,102, filed Nov. 12, 2017, which is incorporated by reference herein, and also detailed below. Thus, the joint mechanism 206b, which defines a degree of freedom corresponding to extension/flexion of an elbow joint, can be configured to recover energy during a first movement and then release such energy during a second movement to apply an augmented torque to rotate the elbow joint about the degree of freedom in parallel with a torque applied by a primary actuator of the joint mechanism 206b, similarly as discussed in incorporated U.S. patent application Ser. No. 15/810,102. More particularly, the joint mechanism 206b can comprise a primary actuator 302, a quasi-passive elastic actuator 304 (FIG. 10), and a brake or clutch device/mechanism 306 operatively coupled to each other, and each situated or arranged along and operable about an axis of rotation 310. As further detailed below, the input member 308a and the output member 308b can be coupled to respective support structures 204e and 204f of the exoskeleton 200, which support structures are rotatable relative to each other about the axis of rotation 310 of the joint, which can correspond to a degree of freedom of a human elbow joint. Note that input and output members 308a and 308b are shown generically as members coupled to their respective components, but they can take many different forms and configurations of suitable input and output members or components that are coupleable to support structures, for instance, or can even comprise the pair of support structures rotatably coupled together by the joint mechanism 206b.

The primary actuator 302 can comprise a motor 312 (FIG. 11) and, optionally, a transmission, such as a first planetary transmission 314 and, further optionally, a second transmission, such as second planetary transmission 316. The motor 312 is operable to apply a primary torque to the output member 308b for rotation about the axis of rotation 310, and the quasi-passive elastic actuator 304 (e.g., one having an elastic component in the form of a torsional coil spring) is selectively operable to store energy during a rotation of the joint via the joint mechanism 206b, and to release energy in the form of augmented torque to be applied to the output member 308b along with the primary torque applied by the motor 312 (the two torques being combined to generate an output via the output member 308b). The brake or clutch device 306 is operable to selectively control the quasi-passive elastic actuator 304 and to generate the braking force or application of the augmented torque. Indeed, a braking force can be generated to restrict rotation of the joint in some operational scenarios, such as when the controller 208 operates the joint mechanism 206b in a safety mode discussed below, or an augmented torque can be generated and applied in combination with a primary torque to assist in rotation of the output member and the joint, as discussed below.

The joint mechanism 206b can comprise a first support frame 315a, a second support frame 315b, and a third support frame 315c fastened together to retain and support the various components discussed herein, such as the motor 312, the planetary transmissions 314 and 316, the brake or clutch device 306, etc. As further detailed below, the elastic element or quasi-passive elastic actuator 304 is operable to selectively store energy or generate a braking force (when in an elastic or semi-elastic configuration or mode or state) upon a rotation of the input member 308a (e.g., where the rotation is either actively carried out using the primary actuator, or passively carried out, such as rotation of a joint under the influence of gravity of some other externally applied force that induces rotation) when the brake or clutch device 306 is in the engaged or semi-engaged state, and is operable to selectively release energy (also when in the elastic or semi-elastic configuration or mode or state) upon a rotation (in the same or a different direction as the rotation for storing the energy) of the input member 308a, when the brake or clutch device 306 is in the engaged or semi-engaged state, to apply the augmented torque to the output member 308b in parallel with a primary torque applied by the primary actuator 302, in this case the motor 312.

The quasi-passive elastic actuator 304 is further operable in the inelastic state to neither store nor release energy during rotation of the joint (inelastic configuration) when the clutch mechanism 306 is selectively caused to be in the disengaged state. In this inelastic state, the input member 308a is in "free swing" relative to the output member 308b, meaning that negligible resistance is applied within the joint module 300 via the quasi-passive elastic actuator 304 (so that the quasi-passive elastic actuator 304 does not have a stiffness value that would restrict rotation of the input member 308a relative to the output member 308b). The brake or clutch device 306 can also move from an engaged or semi-engaged state to a disengaged state to dissipate any stored energy (i.e., dissipate any braking force generated, such as when the braking force is no longer needed), or if the controller (108, 208) is performing a remedial measure. Thus, the quasi-passive elastic actuator 304 is selectively switchable between the elastic state, the semi-elastic state, and the inelastic state via operation of the brake or clutch device 306.

In examples, "semi-engaged" can mean that the brake or clutch device is engaged, but not fully engaged nor disengaged, such that some slippage occurs within the brake or clutch. For example, in the case of the brake or clutch device having a plurality of plates, such as input and output plates, the semi-engaged state would mean that the plates are under a compression force sufficient to compress the plates together some degree, but that some relative movement (i.e., slippage) occurs between the plates (i.e., they are not completely locked up such that they rotate together and movement between them is not completely restricted) and a friction force is generated between them (e.g., a usable braking force). The term "engaged state" as used herein can include the semi-engaged state as these are also meant to describe at least a partially engaged state of the brake or clutch device, as well as to describe the brake or clutch device where the amount of slippage and thus the amount of the braking force (or augmented torque) is controllable and variable between the disengaged state where negligible braking force is generated and fully engaged where the clutch models a rigid connection member.

In examples where the quasi-passive actuator is caused to enter a "semi-elastic state" or mode of operation, the quasi-passive elastic actuator can be actuated to partially compress the elastic or spring component of the quasi-passive elastic actuator to store, and be enabled to release, an amount of energy or be enabled to generate a magnitude of a braking force that is less than what would otherwise be achieved if the quasi-passive elastic actuator were in a fully elastic state. Stated another way, "semi-elastic" describes that state in which there is a less than 1:1 transfer of energy or forces, due to rotation of the joint, to the quasi-passive elastic actuator coupled between the input and output members (e.g., because the brake or clutch device is in the semi-engaged state). "Semi-elastic," as used herein, is not intended to refer to the inherent elastic property (i.e., the elasticity) of the elastic component of the quasi-passive elastic actuator, but merely to a degree of compression of the elastic component.

In one example, the motor 312 can comprise a high-performance Permanent Magnet Brushless DC motor (PM-BLDC). The motor 312 can comprise a stator 320 and rotor 322 (FIG. 10) rotatable relative to each other (in a typical fashion for commercially available frameless brushless motors). Thus, the motor 312 of the primary actuator 302 comprises a cylindrical void 324 about the central area of the rotor 322. Advantageously, the first planetary transmission 314 can be positioned (at least partially) within the cylindrical void 324 of the motor 312, which provides a low-profile, compact geared motor configuration because the first planetary transmission 314 and the motor 312 are packaged together, as shown and described. A transfer wheel 313 can be coupled to the rotor 322 via fasteners 319, so that rotation of the rotor 322 causes rotation of the transfer wheel 313 about the axis of rotation 310. A sun gear 332 can be disposed centrally between four planet gears 330 and along the axis of rotation 310, with the sun gear 332 comprising teeth operable to engage the teeth of each of the four planet gears 330 that rotate around the sun gear 332 and about an outer housing 326. The outer housing 326 can be fastened to the second support frame 315b to hold it stationary. At the output of the first planetary transmission 314, the planet gears 330 are coupled to a carrier plate 334, which is coupled to a sun gear 346 of the second planetary transmission 316. Thus, the output of the second planetary transmission 316 is coupled to the output member 308b.

In response to the motor 312 receiving a control or command signal from the controller 208, the rotor 322 drives/rotates the transfer wheel 313, which rotates/drives the sun gear 332, which drives/rotates the carrier plate 334 (via planet gears 330). The carrier plate 334 then drives/rotates the sun gear 346 of the second planetary transmission 316, which ultimately drives/rotates the output member 308b via the output of the second planetary transmission 316. Accordingly, the present example provides a 16:1 final drive transmission from the motor 312 to the output member 308b.

As introduced above, the quasi-passive elastic actuator 304 is operable to apply an augmented torque to rotate the output member 308b along with the primary torque applied by the primary actuator 302, or to generate a braking force within the joint mechanism 206b. Thus, the quasi-passive elastic actuator 304 is switchable between an elastic configuration, a semi-elastic configuration, and an inelastic configuration via operation of the brake or clutch device 306 for selectively controlling application of the augmented torque applied by the quasi-passive elastic actuator 304.

In one example, the quasi-passive elastic actuator 304 can comprise an elastic element in the form of a torsional coil spring 305. One end of the torsional coil spring 305 can be coupled to a transfer shaft 307 and can be wound clockwise therefrom, and the other end can be coupled to the input member 308a (or to an intermediate component coupled between the torsional coil spring 305 and a suitable input member). The input member 308a can comprise an annular ring surrounding the torsional coil spring 305, or it can take other suitable forms as being coupled between the torsional coil spring 305 and a robotic support member. An output end of the transfer shaft 307 can be coupled to the transfer wheel 313, such that rotation of the transfer shaft 307 (e.g., an applied augmented torque) causes rotation of the transfer wheel 313, as detailed below. Note that the torsional coil spring 305 is only shown in FIG. 9, but it will be appreciated that it can be disposed between the transfer wheel 313 and the brake or clutch device 306 shown in the other FIGS. 8 and 10.

The brake or clutch device 306 can comprise an electromagnetic clutch configured to operate in series with the quasi-passive elastic actuator 304. The brake or clutch device 306 can comprise the same or similar features discussed in U.S. patent application Ser. No. 15/810,102, incorporated herein. However, the brake or clutch device 306 can comprise a plurality of input plates 335a (e.g., four total) retained by the plate retention component 331 to restrict movement of the input plates 335a relative to a clutch housing 321. A plurality of output plates 335b (e.g., four total, hidden from view) can each be slidably or frictionally interfaced (i.e., sandwiched between) with adjacent input plates 335a in an alternating manner. The output plates 335b can each have a curvilinear perimeter that is slidably supported within curved inner surfaces of the plate retention component 331. Thus, rotation of the output plates 335b causes concurrent rotation of the clutch output shaft 343. The clutch output shaft 343 is coupled to the transfer shaft 307 that is coupled to the quasi-passive elastic actuator 304, such that rotation of the clutch output shaft 343 causes rotation of the transfer shaft 307 (which is coupled to the transfer wheel 313 discussed above). The output plates 335b can be comprised of a non-ferromagnetic material while the input plates 335b can be comprised of a ferromagnetic material. Upon receiving a clutch control signal (e.g., from the controller 208), an electromagnetic actuator 329 of the brake or clutch device 306 is activated to apply an electromagnetic field in a direction that tends to axially urge the input plates 335a along the axis of rotation 310, which thereby compresses the output plates 335b between the respective input plates 335a, such that the plates 335a and 335b are restricted from movement relative to the plate retention component 331 (which is attached to the clutch housing 321, and which is attached to the first support frame 315a). This is the engaged state of the brake or clutch device 306. Such restricted movement of the plates 335a and 335b thereby restricts movement of the clutch output shaft 343, which engages or otherwise activates the quasi-passive elastic actuator 304. Therefore, upon rotation of the input member 308a (either via the primary actuator or via application of an external force), and while the brake or clutch device 306 is in this engaged state, the quasi-passive elastic actuator 304 will therefore store energy or release energy (being in the elastic configuration), as described above, and depending upon the rotation of the input member 308a (e.g., clockwise rotation of FIG. 10 stores energy, while counterclockwise rotation releases energy, but opposing directions are not to be limiting as the storage and release of energy can occur in the same rotational direction).

The electromagnetic actuator 329 can be selectively operated and controlled by the controller 208 to apply a variable magnetic field and a variable compression force, such that the brake or clutch device 306 operates between a disengaged state, a semi-engaged state, and a fully engaged state to generate a variable braking force or a variable augmented torque. Indeed, in another aspect, with the brake or clutch device 306 operating in a semi-engaged state, movement between the input plates 335a and the output plates 335b can be partially restricted by the actuator 329 applying a smaller compression force to the input and output plates 335a, 335b, such that some movement between the input plates 335a and the output plates 335b is facilitated or caused to occur. In the engaged or the semi-engaged state, the brake or clutch device 306 and the quasi-passive elastic actuator 304 can function as a brake, or in other words, can provide a braking force operable to dissipate energy within the joint mechanism, or these can function to apply an augmented torque to the output member. The degree or magnitude of the compression force applied by the actuator 329 to the input and output plates 335a, 335b can be dynamically controlled in real-time by controlling or varying the amount of force generated and applied by the actuator 329.

Conversely, upon receiving a clutch control signal from the controller 208, the electromagnetic actuator 329 can be caused to place the brake or clutch device 306 in the disengaged state. That is, a clutch control signal is received by the electromagnetic actuator 329, such that the applied electric field is removed, thereby releasing compression pressure applied by the input plates 335b. This allows the output plates 335b to freely rotate relative to the input plates 335a. This permits relatively "free swing" rotation of the input member 308a relative to the output member 308b, therefore placing the quasi-passive elastic actuator 304 in its inelastic state. Thus, the quasi-passive elastic actuator 304 exerts negligible resistance in this "free swing" mode, when the brake or clutch device 306 is disengaged, so that the input and output members 308a and 308b can freely rotate relative to each other with minimal resistance. Furthermore, once stored, the energy can be dissipated at any time without being used either as a braking force or to apply an augmented torque, by disengaging the brake or clutch device 144.

When the brake or clutch device 306 is in the engaged or semi-engaged state, and the quasi-passive elastic actuator 304 is in the elastic or semi-elastic state, the augmented torque can be applied by the torsional coil spring 305. This augmented torque can be translated via the transfer shaft 307 to the sun gear 332 of the first planetary transmission 314, and so on (as described above), to rotate the output member 308b. For example, assume the torsional coil spring is wound in the clockwise direction from the transfer shaft 307 (as shown), so that, upon a first clockwise rotation of the input member 308a about the axis of rotation 310, the torsional coil spring 305 stores energy. Such rotational movement can be the result of an elbow movement of an exoskeleton during a certain task (e.g., downward movement of "push-ups" of an operator wearing an exoskeleton). Upon further rotation, or in the event of the disengagement of the brake or clutch device, such as in the counterclockwise direction or depending upon the engaged state of the brake or clutch device, the quasi-passive elastic actuator 304 can release its stored energy, thereby transferring an augmented torque to rotate the output member 308b (as detailed above) or to apply a braking force. Concurrently, and upon such rotation, the motor 312 of the primary actuator 302 can be operated to apply a primary toque (along with the augmented torque) to rotate the output member 308b about axis of rotation 310 to actuate the joint mechanism 206b. Because the primary torque applied by the motor 312 is supplemented with the augmented torque applied by releasing stored/recovered energy via the quasi-passive elastic actuator 304, the electric motor 312 can be selected from a group of smaller (e.g., less power dissipation) motors than would otherwise be needed, which contributes to the compact configuration of the joint mechanism 206b, as also discussed above.

In one example discussed above, brake or clutch device 306 can be controlled as a binary device (i.e., the brake or clutch device 306 is either on/engaged or off/disengaged) when applying a compression force to compress the plates together, and when removing the compression force to release compression between the plates. Alternatively, the brake or clutch device 306 can be configured and controlled as an analog device, meaning a variable electromagnetic force can be applied by the electromagnetic actuator 329 to compress the plates together to a varying degree to generate a braking force and to facilitate gradually storing energy or dissipating/releasing stored energy in a more controlled manner for damping or braking purposes. In one example operational scenario, the brake or clutch device 306 can be fully engaged or semi-engaged such that the quasi-passive elastic actuator 304 at least partially stores energy. This stored energy can function to generate a braking force that can restrict rotation of the output member (e.g., such as in the case where the primary actuator is inactive and not producing a primary torque, yet rotation of the joint is still desired or needed (e.g., rotation of the joint under the influence of gravity or in response to some externally applied force to the exoskeleton)), or it can be released as an augmented torque to assist the primary actuator. Furthermore, in the event of the release of the energy as an augmented torque, when the quasi-passive elastic actuator 304 is releasing energy in the elastic or semi-elastic states (e.g., during a stance extension), the actuator 329 can be operated to cause slight compression of the plates together to generate a gradual "braking force" about the plates so that the augmented torque can be discharged or applied in a controlled, gradual manner.

As further explanation, and to further illustrate, the multi-plate configuration of the brake or clutch device 306 can act as a brake. This is achieved by controlling the compression force applied to the input and output plates 335a and 335b, thus providing a beneficial energy saving mode of operation, and/or providing a safety mode of operation if the controller (e.g., 108, 208) has detected a malfunction or anomalous kinematic movement, as exemplified in FIGS. 1-6. That is, in the event of a detection of a malfunction or defect of the exoskeleton, the controller 208 can operate the exoskeleton in a safety mode, which can include engaging or partially engaging the brake or clutch device 306, as further discussed below.

Similarly, as discussed above regarding the plurality of sensors S1-S4 of FIGS. 7A-8B, the plurality of sensors S5-S8 of the suite of sensors S1-Sn can be identified as a sensor group 210b associated with the joint mechanism 206b. As introduced above, the controller 208 can be configured (i.e., programmed) to determine a discrepancy between sensor output data of two or more sensors S5-S8 of the sensor group 210b, and configured to recruit at least one sensor S5-S8 of the sensor group 210b as a substitute sensor for discrepant sensor output data. For instance, a target sensor S5 can comprise the joint position sensor 361 (e.g., Hall effect sensor) configured to produce and transmit data via sensor output signals to the controller 208 for processing to facilitate determination of a rotational position of the joint defined by the joint mechanism 206b. Similarly as discussed above regarding joint mechanism 206a, the auxiliary sensor S6 (FIG. 11) can comprise a motor rotor position sensor positioned proximate the rotor 322 of the motor 312, which can be used as a substitute if the target sensor S5 fails, as further discussed herein. Likewise, the auxiliary sensors S7 and S8 can each comprise an IMU, which can be used as substitutes if the target sensor S5 fails, as further discussed herein.

It should be appreciated that the sensor group 210b associated with the elbow joint mechanism 206b can comprise any number of other auxiliary sensors, such as described above regarding other possible auxiliary sensors of sensor group 210a associated with the knee joint mechanism 206a.

Figure 12:
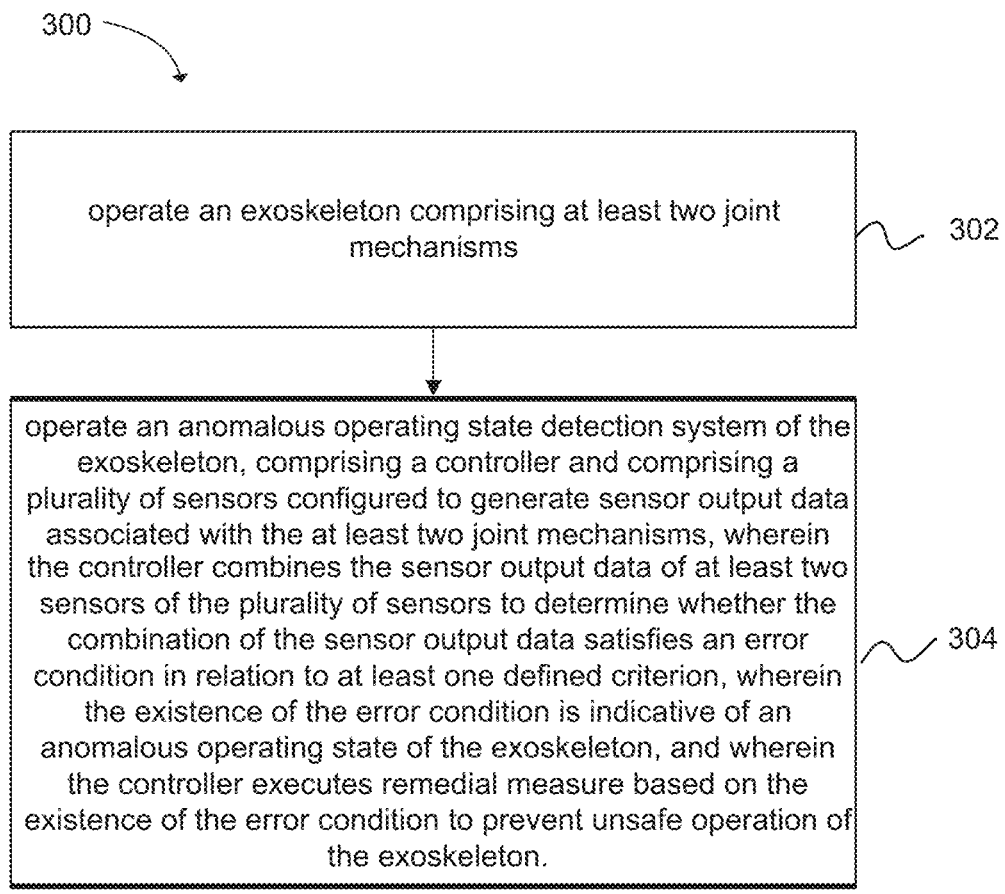
FIG. 12 is a flow diagram that illustrates an example method to prevent unsafe operation of an exoskeleton, in accordance with an example of the present disclosure.

FIG. 12 provides a flow diagram of a method 300 for safe operation of an exoskeleton, in accordance with an example of the present disclosure. As in block 302, the method can comprise operating an exoskeleton (e.g., 100, 200) comprising at least two joint mechanisms (e.g., 106a-n, 206a-d). As in block 304, the method can comprise operating an anomalous operating state detection system (e.g., 102, or as applied to FIG. 7) of the exoskeleton, comprising a controller (e.g., 108, 208), having at least one processor, and comprising a plurality of sensors (e.g., 110a-n, S1-Sn of FIG. 7) configured to generate sensor output data associated with the at least two joint mechanisms. As in block 306, the method can comprise facilitating combining, using the at least one processor of the controller, sensor output data of at least two sensors of the plurality of sensors to determine whether the combination of the sensor output data satisfies an error condition in relation to a defined criterion (or a plurality of defined criterion), wherein the existence of the error condition is indicative of an anomalous operating state of the exoskeleton, as in the examples of FIGS. 1-11. As in block 308, the method can comprise facilitating combining, using the at least one processor of the controller, at least two commands signal based on the sensor output data of the at least two sensors to determine whether the combination of the at least two command signals satisfies an error condition in relation to at least one defined criterion, wherein the existence of the error condition is indicative of an impending anomalous kinematic movement of the exoskeleton, as in the examples of FIGS. 1-11. As in block 310, the method can comprise facilitating execution of, using the at least one processor of the controller, a remedial measure based on the existence of the error condition to prevent unsafe operation of the exoskeleton, as in the examples of FIGS. 1-11.

Figure 13:
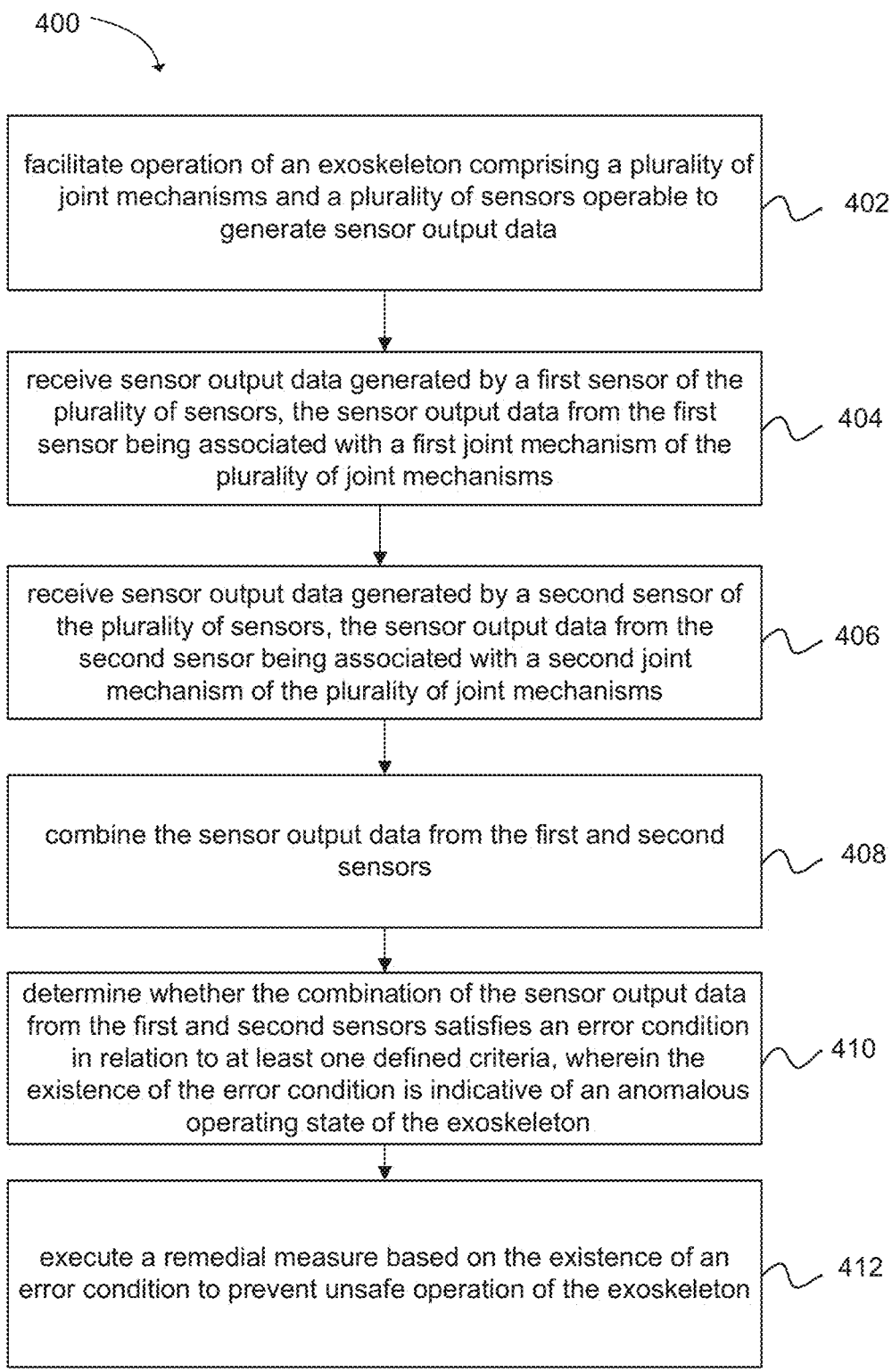
FIG. 13 is a flow diagram that illustrates an example method to prevent unsafe operation of an exoskeleton, in accordance with an example of the present disclosure.

FIG. 13 provides a flow diagram of a method 400 for safe operation of an exoskeleton, in accordance with an example of the present disclosure. As in block 402, the method can comprise facilitating operation of an exoskeleton (e.g., 100, 200) comprising a plurality of joint mechanisms (e.g., 106a-n, 206a-d) that define respective joints of the exoskeleton rotatable about respective axes of rotation. The exoskeleton can comprise a plurality of sensors (e.g., 110a-n, S1-Sn) operable to generate sensor output data (e.g., 135). As in block 404, the method can comprise receiving sensor output data generated by a first sensor (e.g., 110a, S1) of the plurality of sensors, and where the sensor output data from the first sensor is associated with a first joint mechanism (e.g., 106a, 206a) of the plurality of joint mechanisms. As in block 406, the method can comprise receiving sensor output data generated by a second sensor (e.g., 110b, S2) of the plurality of sensors, and where the sensor output data from the second sensor is associated with a second joint mechanism (e.g. 106b, 206b) of the plurality of joint mechanisms. As in block 408, the method can comprise combining the sensor output data from the first and second sensors, as discussed above regarding FIG. 5A, for instance. As in block 410, the method can comprise determining whether the combination of the sensor output data from the first and second sensors satisfies an error condition in relation to at least one defined criterion, wherein the existence of the error condition is indicative of an anomalous operating state of the exoskeleton, as in the examples of FIGS. 1-11. As in block 412, the method can comprise executing a remedial measure based on the existence of an error condition to prevent unsafe operation of the exoskeleton, as in the examples of FIGS. 1-11.

Figure 14:
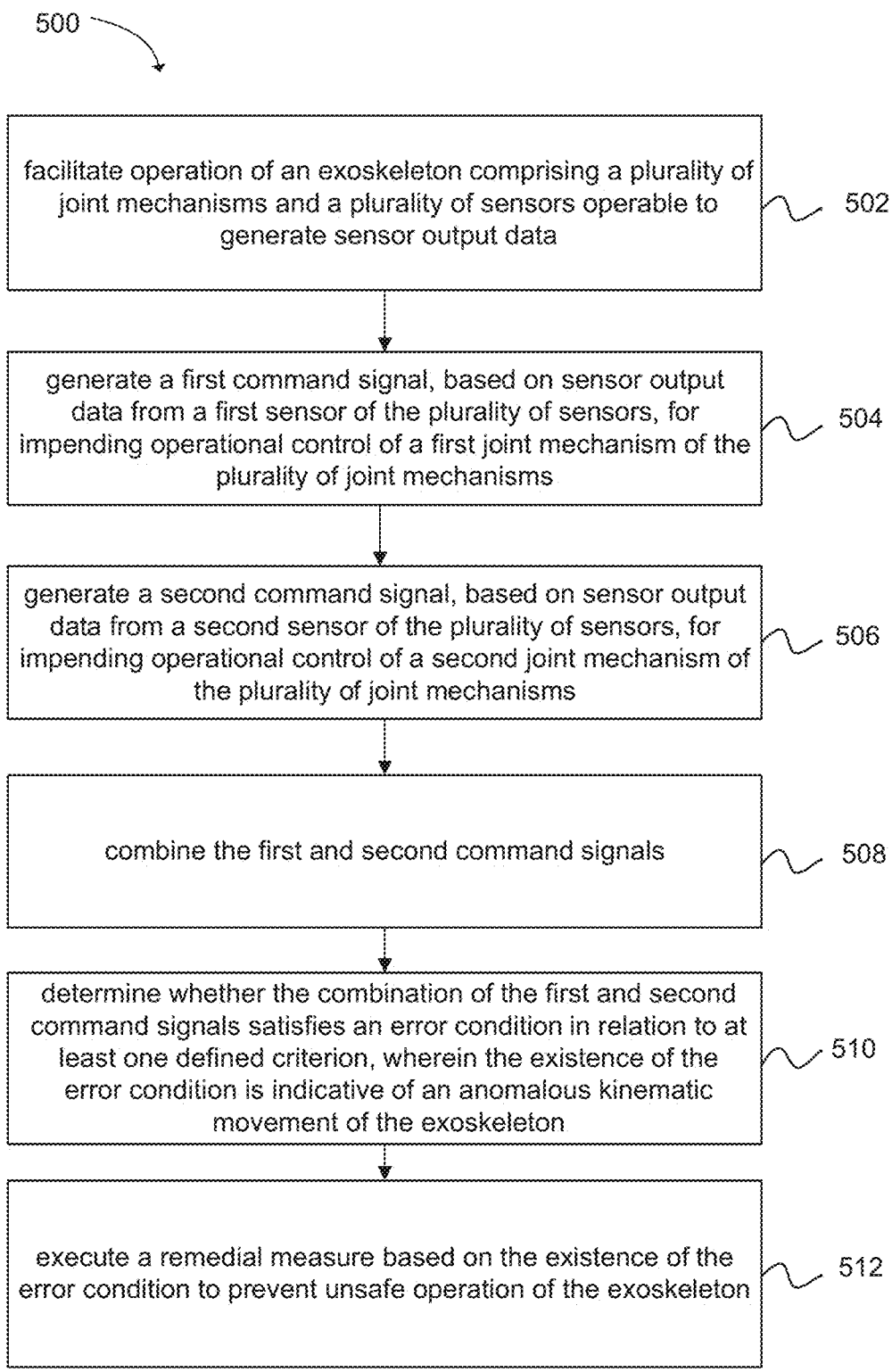
FIG. 14 is a flow diagram that illustrates an example method to prevent unsafe operation of an exoskeleton, in accordance with an example of the present disclosure.

FIG. 14 provides a flow diagram of a method 500 for safe operation of an exoskeleton, in accordance with an example of the present disclosure. As in block 502, the method can comprise facilitating operation of an exoskeleton (e.g., 100, 200) comprising a plurality of joint mechanisms (e.g., 106a-n, 206a-d) that define respective joints of the exoskeleton rotatable about respective axes of rotation, and the exoskeleton can comprise a plurality of sensors (e.g., 110a-n, S1-Sn) operable to generate sensor output data (e.g., 135). As in block 504, the method can comprise generating a first command signal (e.g., 137a), based on sensor output data from a first sensor (e.g., 110a, S1) of the plurality of sensors, for impending operational control of a first joint mechanism (e.g., 106a, 206a) of the plurality of joint mechanisms. As in block 506, the method can comprise generating a second command signal (e.g., 137b), based on sensor output data from a second sensor (e.g., 110b, S2) of the plurality of sensors, for impending operational control of a second joint mechanism (e.g., 106b, 206b) of the plurality of joint mechanisms. As in block 508, the method can comprise combining the first and second command signals, as exemplified regarding FIG. 5B. As in block 510, the method can comprise determining whether the combination of the first and second command signals satisfies an error condition in relation to at least one defined criterion, wherein the existence of the error condition is indicative of an anomalous kinematic movement of the exoskeleton, as in the examples of FIGS. 1-11. As in block 512, the method can comprise executing a remedial measure based on the existence of the error condition to prevent unsafe operation of the exoskeleton, as in the examples of FIGS. 1-11.

Figure 15:
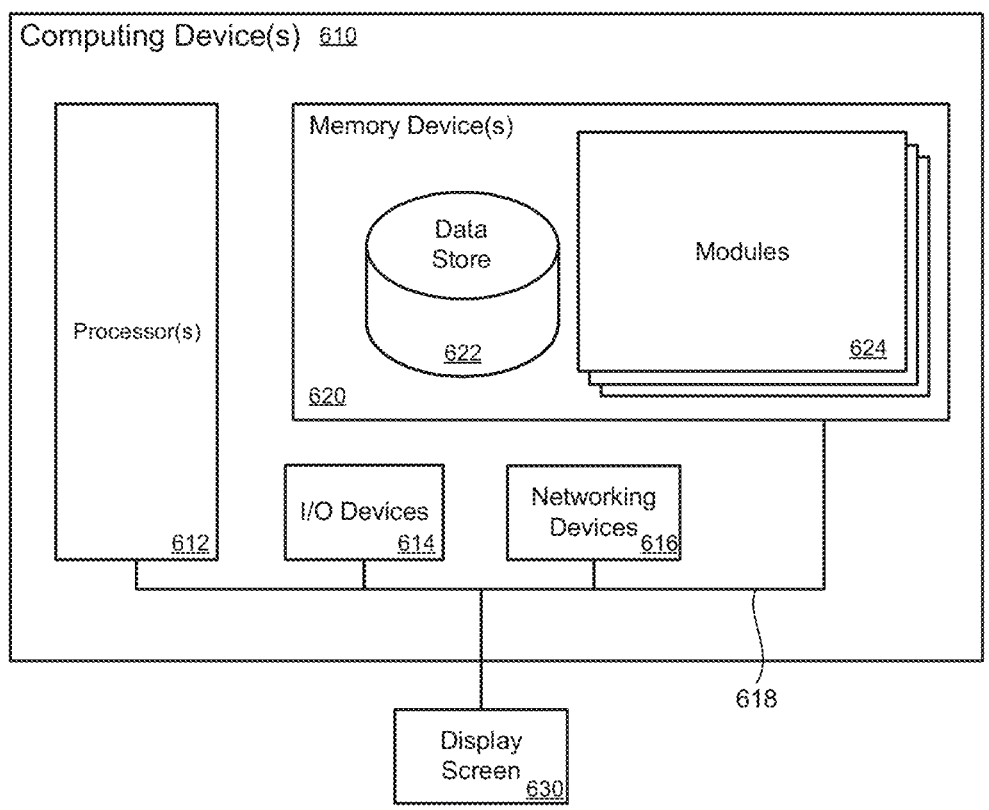
FIG. 15 is block diagram illustrating an example of a computing device that can be used to execute a method to prevent unsafe operation of an exoskeleton, in accordance with an example of the present disclosure.

FIG. 15 illustrates a computing device 610 on which modules of this technology can execute. A computing device 610 is illustrated on which a high level example of the technology can be executed. The computing device 610 can include one or more processors 612 that are in communication with memory devices 620. The computing device 610 can include a local communication interface 618 for the components in the computing device. For example, the local communication interface 618 can be a local data bus and/or any related address or control busses as can be desired.

The memory device 620 can contain modules 624 that are executable by the processor(s) 612 and data for the modules 624. The modules 624 can execute the functions described earlier. A data store 622 can also be located in the memory device 620 for storing data related to the modules 624 and other applications along with an operating system that is executable by the processor(s) 612.

Other applications can also be stored in the memory device 620 and can be executable by the processor(s) 612. Components or modules discussed in this description that can be implemented in the form of software using high-level programming languages that are compiled, interpreted or executed using a hybrid of the methods.

The computing device can also have access to I/O (input/output) devices 614 that are usable by the computing devices. Networking devices 616 and similar communication devices can be included in the computing device. The networking devices 616 can be wired or wireless networking devices that connect to the internet, a LAN, WAN, or other computing network.

The components or modules that are shown as being stored in the memory device 620 can be executed by the processor(s) 612. The term "executable" can mean a program file that is in a form that can be executed by a processor 612. For example, a program in a higher level language can be compiled into machine code in a format that can be loaded into a random access portion of the memory device 620 and executed by the processor 612, or source code can be loaded by another executable program and interpreted to generate instructions in a random access portion of the memory to be executed by a processor. The executable program can be stored in any portion or component of the memory device 620. For example, the memory device 620 can be random access memory (RAM), read only memory (ROM), flash memory, a solid state drive, memory card, a hard drive, optical disk, floppy disk, magnetic tape, or any other memory components.

The processor 612 can represent multiple processors and the memory device 620 can represent multiple memory units that operate in parallel to the processing circuits. This can provide parallel processing channels for the processes and data in the system. The local communication interface 618 can be used as a network to facilitate communication between any of the multiple processors and multiple memories. The local communication interface 618 can use additional systems designed for coordinating communication such as load balancing, bulk data transfer and similar systems.

While the flowcharts presented for this technology can imply a specific order of execution, the order of execution can differ from what is illustrated. For example, the order of two more blocks can be rearranged relative to the order shown. Further, two or more blocks shown in succession can be executed in parallel or with partial parallelization. In some configurations, one or more blocks shown in the flow chart can be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more blocks of computer instructions, which can be organized as an object, procedure, or function. Nevertheless, the executables of an identified module need not be physically located together, but can comprise disparate instructions stored in different locations which comprise the module and achieve the stated purpose for the module when joined logically together.

Indeed, a module of executable code can be a single instruction, or many instructions and can even be distributed over several different code segments, among different programs and across several memory devices. Similarly, operational data can be identified and illustrated herein within modules and can be embodied in any suitable form and organized within any suitable type of data structure. The operational data can be collected as a single data set, or it can be distributed over different locations including over different storage devices. The modules can be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein can also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. An exoskeleton operable to prevent unsafe operation of the exoskeleton, comprising:
    a plurality of joint mechanisms;
    a plurality of sensors comprising a first sensor configured to generate sensor output data associated with a first joint mechanism of the plurality of joint mechanisms, and a second sensor configured to generate sensor output data associated with a second joint mechanism of the plurality of joint mechanisms; and
    a controller configured to:
        receive the sensor output data generated by the first and second sensors;
        combine the sensor output data generated by the first and second sensors; and
        determine whether the combination of the sensor output data from the first and second sensors satisfies an error condition indicative of an anomalous operating state of the exoskeleton.

2. The exoskeleton as in claim 1, wherein the first and second sensors each comprise a force sensor operable to generate force sensor output data in response to movement of a user wearing the exoskeleton.

3. The exoskeleton as in claim 1, wherein the first and second sensors each comprise a position sensor operable to generate joint position sensor output data for determining a rotational position of the respective first and second joint mechanisms.

4. The exoskeleton as in claim 3, wherein a third sensor comprises a position sensor supported by a third joint mechanism of the plurality of joint mechanisms, the third sensor configured to generate joint position sensor output data for facilitating determination of a rotational position of the third joint mechanism, wherein the controller is configured to compare the joint position sensor output data of the first, second, and third sensors with each other to determine the existence of an error condition.

5. The exoskeleton as in claim 1, wherein each joint mechanism comprises a brake or clutch device for selectively restricting rotation of the respective joint mechanism, the controller configured to transmit a command signal to the brake or clutch device of at least one joint mechanism to execute a remedial measure based on the existence of an error condition.

6. The exoskeleton as in claim 1, wherein the controller is further configured to execute a remedial measure based on the existence of an error condition, wherein the remedial measure is associated with a safety mode of operation of the exoskeleton, wherein the remedial measure comprises at least one of sending a notification to a user of the exoskeleton, engaging a brake or clutch device of the at least one joint mechanism, or causing the exoskeleton to autonomously perform an action associated with the safety mode independent of user control.

7. The exoskeleton of claim 1, wherein the anomalous operating state comprises an anomalous kinematic movement of the exoskeleton.

8. The exoskeleton of claim 1, wherein the anomalous operating state comprises a malfunction of the exoskeleton.

9. The exoskeleton of claim 1, wherein the first and second joint mechanisms provide sequentially coupled joints of the exoskeleton.

10. The exoskeleton of claim 1, wherein the first and second joint mechanisms provide non-sequentially coupled joints of the exoskeleton.

11. The exoskeleton of claim 1, wherein the first joint mechanism is part of an upper body exoskeleton of the exoskeleton, and wherein the second joint mechanism is part of a lower body exoskeleton of the exoskeleton.

12. The exoskeleton of claim 1, wherein the controller is further configured to:
    generate a first command signal, based on the sensor output data from the first sensor, for impending operational control of the first joint mechanism, and generate a second command signal, based on the sensor output data from the second sensor, for impending operational control of the second joint mechanism;
    combining the first and second command signals; and
    determining whether the combination of the first and second command signals satisfies another error condition, wherein the existence of the other error condition is indicative of another anomalous operating state of the exoskeleton.

13. An exoskeleton operable to prevent unsafe operation of the exoskeleton, comprising:
    a plurality of joint mechanisms;
    a plurality of force sensors each configured to generate force sensor output data associated with a respective one of the plurality of joint mechanisms in response to user movement;
    a controller, having one or more processors, configured to:
        generate a first command signal, based on the force sensor output data from a first sensor, for impending operational control of a first joint mechanism, and generate a second command signal, based on the force sensor output data from a second sensor, for impending operational control of a second joint mechanism;
        combine the first and second command signals; and
        determine whether the combination of the first and second command signals satisfies an error condition in relation to at least one defined criterion, wherein the existence of the error condition is indicative of an anomalous operating state of the exoskeleton.

14. The exoskeleton of claim 13, wherein the controller is configured to execute a remedial measure based on the existence of an error condition to prevent unsafe operation of the exoskeleton.

15. The exoskeleton of claim 13, wherein the controller is configured to control the first and second joint mechanisms based on the existence of an error condition to prevent unsafe operation of the exoskeleton.

16. The exoskeleton of claim 13, wherein the controller is configured to:
    generate a third command signal, based on the force sensor output data from a third sensor, for impending operational control of a third joint mechanism;
    combine the first, second, and third command signals; and determine whether the combination of the first, second, and third command signals satisfies another error condition in relation to another at least one defined criterion, wherein the existence of the another error condition is indicative of another anomalous operating state of the exoskeleton.

17. The exoskeleton of claim 13, wherein the anomalous operating state comprises an anomalous kinematic movement of the exoskeleton based on a known unsafe exoskeleton movement.

18. The exoskeleton of claim 17, wherein the known unsafe exoskeleton movement is defined by a safety envelope associated with the first and second joint mechanisms.

19. A method for safe operation of an exoskeleton, the method comprising:
operating an exoskeleton comprising at least two joint mechanisms;
operating an anomalous operating state detection system of the exoskeleton, the anomalous operating state detection system comprising a controller, having at least one processor, and comprising a plurality of sensors configured to generate sensor output data associated with the at least two joint mechanisms, wherein the controller combines the sensor output data of at least two sensors of the plurality of sensors, the at least two sensors being associated with different joint mechanisms, to determine whether the combination of the sensor output data satisfies an error condition in relation to at least one defined criterion, wherein the existence of the error condition is indicative of an anomalous operating state of the exoskeleton, and wherein the controller executes remedial measure based on the existence of the error condition to prevent unsafe operation of the exoskeleton.

20. The method as in claim 19, wherein the anomalous operating state comprises an anomalous kinematic movement of the exoskeleton.

21. The method as in claim 19 wherein the controller transmits a command signal to each of the at least two joint mechanisms for controlling an actuator of each joint mechanism.

22. The method as in claim 19, wherein the at least two joint mechanisms comprises a plurality of joint mechanisms, and wherein the controller determines a rotational joint position of each of the plurality of joint mechanisms in relation to each other based on sensor output data generated by at least some of the plurality of sensors.

23. The method as in claim 19, wherein the controller combines at least two commands signal based on the sensor output data of the at least two sensors to determine whether the combination of the at least two command signals satisfies another error condition in relation to at least one other defined criterion, wherein the existence of the error condition is indicative of an impending anomalous kinematic movement of the exoskeleton, and wherein the controller executes
a remedial measure based on the existence of the error condition to prevent unsafe rotational movement of the at least two joint mechanisms of the exoskeleton.

24. A computer implemented method to prevent unsafe operation of an exoskeleton, the method comprising:
facilitating operation of an exoskeleton comprising a plurality of joint mechanisms and a plurality of sensors operable to generate sensor output data;
receiving sensor output data generated by a first sensor of the plurality of sensors, the sensor output data from the first sensor being associated with a first joint mechanism of the plurality of joint mechanisms;
receiving sensor output data generated by a second sensor of the plurality of sensors, the sensor output data from the second sensor being associated with a second joint mechanism of the plurality of joint mechanisms;
combining the sensor output data from the first and second sensors; and
determining whether the combination of the sensor output data from the first and second sensors satisfies an error condition in relation to at least one defined criterion, wherein the existence of the error condition is indicative of an anomalous operating state of the exoskeleton.

25. The method of claim 24, wherein the anomalous operating state comprises an anomalous kinematic movement of the exoskeleton.

26. The method as in claim 24, wherein the at least one defined criterion comprises sensor output data indicating at least one of rotational positions of the first and second joint mechanisms being outside of a safety envelope, overlapping spatial positions of the first and second joint mechanisms, or an unsafe rate of change of rotational positions of the first and second joint mechanisms.

27. The method as in claim 24, further comprising executing a remedial measure based on the existence of an error condition to prevent unsafe operation of the exoskeleton.

28. The method as in claim 27, wherein executing the remedial measure comprises transmitting a command signal to an actuator of each of the first and second joint mechanisms for actuating the first and second joint mechanisms.

29. The method as in claim 27, wherein executing the remedial measure comprises sending a notification to a user of the exoskeleton.

30. The method as in claim 27, wherein executing the remedial measure comprises transmitting a control signal to a brake or clutch device of the first joint mechanism to restrict rotation about the first joint mechanism.

31. The method as in claim 24, further comprising determining the rotational joint position of each of the first and second joint mechanisms in relation to at least one other joint mechanism based on sensor output data generated by the plurality of sensors, wherein the rotational positions of the first and second joint mechanisms relative to each other and relative to at least one other joint mechanism at least partially defines the at least one defined criterion.

32. The method as in claim 24, wherein the anomalous operating state comprises impending rotational movement about the first and second joint mechanisms.

33. The method as in claim 24, wherein the at least one defined criterion is based on at least one known unsafe exoskeleton movements.

34. The method as in claim 24, wherein the first and second sensors each comprise a force sensor operable to generate force sensor output data in response to movement of a user wearing the exoskeleton.

35. The method as in claim 24, further comprising:
generating a first command signal, based on the sensor output data from the first sensor, for impending operational control of one of the at least two joint mechanisms, and generating a second command signal, based on the sensor output data from the second sensor, for impending operational control of the other one of the at least two joint mechanisms;
combining the first and second command signals; and
determining whether the combination of the first and second command signals satisfies another error condition in relation to at least one other defined criterion, wherein the existence of the another error condition is indicative of another anomalous kinematic movement of the exoskeleton.

36. The method as in claim 35, further comprising executing a remedial measure based on the existence of the another error condition to prevent unsafe operation of the exoskeleton.

37. A computer implemented method to prevent unsafe operation of an exoskeleton, the method comprising:
facilitating operation of an exoskeleton comprising a plurality of joint mechanisms that define respective joints of the exoskeleton rotatable about respective axes of rotation, the exoskeleton comprising a plurality of sensors operable to generate sensor output data;
generating a first command signal, based on sensor output data from a first sensor of the plurality of sensors, for impending operational control of a first joint mechanism of the plurality of joint mechanisms;
generating a second command signal, based on sensor output data from a second sensor of the plurality of sensors, for impending operational control of a second joint mechanism of the plurality of joint mechanisms;
combining the first and second command signals; and
determining whether the combination of the first and second command signals satisfies an error condition in relation to at least one defined criterion, wherein the existence of the error condition is indicative of an anomalous kinematic movement of the exoskeleton.

38. The method as in claim 37, further comprising executing a remedial measure based on the existence of the error condition to prevent unsafe operation of the exoskeleton.

39. The method as in claim 38, wherein executing the remedial measure comprises non-transmission of the first and second command signals to respective first and second joint mechanisms to prevent actuation thereof.

40. The method as in claim 37, wherein the first and second sensors each comprise a force sensor configured to generate force sensor data in response to user movement, such that the first and second command signals are based on the force sensor data from the first and second sensors.

41. The method as in claim 37, further comprising:
generating a third command signal, based on sensor output data from a third sensor of the plurality of sensors, for impending operational control of a third joint mechanisms of the plurality of joint mechanisms;
combining the first, second, and third command signals; and
determining whether the combination of the first, second, and third command signals satisfies another error condition in relation to the at least one defined criterion, wherein the existence of the error condition is indicative of another anomalous kinematic movement of the exoskeleton.

42. An anomalous operating state detection system of an exoskeleton, comprising:
a plurality of sensors operable with an exoskeleton and configured to generate sensor output data associated with at least two joint mechanisms of the exoskeleton;
at least one processor;
a memory device including instructions that, when executed by the at least one processor, cause the system to:
combine sensor output data from the plurality of sensors, wherein at least two sensors of the plurality of sensors are associated with different joint mechanisms;
determine whether the combination of the sensor output data from the plurality of sensors satisfies an error condition in relation to at least one defined criterion, wherein the existence of the error condition is indicative of an anomalous operating state of the exoskeleton; and
execute a remedial measure based on the existence of an error condition to prevent unsafe operation of the exoskeleton.

43. The system as in claim 42, wherein the memory device further includes instructions that, when executed by the at least one processor, cause the system to transmit a command signal, as a remedial measure, to an actuator of each of the at least joint mechanisms for actuating the at least two joint mechanisms.

44. The system as in claim 42, wherein the memory device further includes instructions that, when executed by the at least one processor, cause the system to transmit a command signal, as a remedial measure, to a brake or clutch device of each of the at least joint mechanisms for restricting rotational o the at least two joint mechanisms.

45. The system as in claim 42, wherein the memory device further includes instructions that, when executed by the at least one processor, cause the system to:
generate a plurality of command signals, based on sensor output data from the plurality of sensors sensor, for impending operational control of at least two joint mechanisms;
combine the plurality of command signals;
determine whether the combination of the plurality of command signals satisfies another error condition in relation to at least one other defined criterion, wherein the existence of the another error condition is indicative of another anomalous operating state of the exoskeleton; and
execute a remedial measure based on the existence of the another error condition to prevent unsafe operation of the exoskeleton.

46. One or more non-transitory computer readable storage media storing instructions that, when executed by one or more processors, cause the one or more processors to:
receive sensor output data generated by a first sensor of a plurality of sensors of an exoskeleton, the sensor output data from the first sensor being associated with a first joint mechanism of the exoskeleton;
receive sensor output data generated by a second sensor of the plurality of sensors, the sensor output data from the second sensor being associated with a second joint mechanism of the exoskeleton;
combine the sensor output data from the first and second sensors; and
determine whether the combination of the sensor output data from the first and second sensors satisfies an error condition in relation to at least one defined criterion, wherein the existence of the error condition is indicative of an anomalous operating state of the exoskeleton.

47. The one or more non-transitory computer readable storage media in claim 46, further comprising instructions that, when executed by the one or more processors, cause the one or more processors to execute a remedial measure based on the existence of the error condition to prevent unsafe operation of the exoskeleton.

48. The one or more non-transitory computer readable storage media in claim 46, further comprising instructions that, when executed by the one or more processors, cause the one or more processors to determine the rotational joint position of each of the first and second joint mechanisms in relation to at least one other joint mechanism of the exoskeleton based on sensor output data generated by the plurality of sensors, wherein the rotational positions of the first and second joint mechanisms relative to each other and relative to the at least one other joint mechanism at least partially defines the at least one defined criterion.

49. The one or more non-transitory computer readable storage media in claim 46, further comprising instructions that, when executed by the one or more processors, cause the one or more processors to:
generate a first command signal, based on the sensor output data from the first sensor, for impending operational control of the first joint mechanism;
generate a second command signal, based on the sensor output data from the second sensor, for impending operational control of the second joint mechanism;
combine the first and second command signals; and
determine whether the combination of the first and second command signals satisfies another error condition in relation to at least one other defined criterion, wherein the existence of the another error condition is indicative of another anomalous kinematic movement of the exoskeleton.

50. The one or more non-transitory computer readable storage media in claim 49, further comprising instructions that, when executed by the one or more processors, cause the one or more processors to execute a remedial measure based on the existence of the another error condition to prevent unsafe operation of the exoskeleton.

\* \* \* \* \*